US012635621B2

(12) United States Patent
Asai et al.

(10) Patent No.: US 12,635,621 B2
(45) Date of Patent: May 26, 2026

(54) TYING MACHINE AND METHOD FOR TYING

(71) Applicant: Max Co., Ltd., Tokyo (JP)

(72) Inventors: Masatoshi Asai, Tokyo (JP); Satoshi Osuga, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 18/575,685

(22) PCT Filed: Jul. 8, 2022

(86) PCT No.: PCT/JP2022/027093
§ 371 (c)(1),
(2) Date: Dec. 29, 2023

(87) PCT Pub. No.: WO2023/286708
PCT Pub. Date: Jan. 19, 2023

(65) Prior Publication Data
US 2024/0245013 A1 Jul. 25, 2024

(30) Foreign Application Priority Data

Jul. 15, 2021 (JP) ................................. 2021-117383
Jul. 15, 2021 (JP) ................................. 2021-117401

(51) Int. Cl.
*A01G 17/08* (2006.01)
*B65B 13/02* (2006.01)
(52) U.S. Cl.
CPC .......... *A01G 17/085* (2013.01); *B65B 13/025* (2013.01)
(58) Field of Classification Search
CPC .... A01G 17/085; A01G 17/08; B65B 13/025; B65B 13/02; B65B 13/022; B65B 13/027;
(Continued)

(56) References Cited

U.S. PATENT DOCUMENTS

| | | | |
|---|---|---|---|
| 2,247,631 A | 7/1941 | Gardner |
| 2004/0216372 A1 | 11/2004 | Voogt |

(Continued)

FOREIGN PATENT DOCUMENTS

| | | |
|---|---|---|
| CH | 295590 A | 1/1954 |
| CH | 636749 A5 | 6/1983 |

(Continued)

OTHER PUBLICATIONS

Sep. 6, 2022—International Search Report—Intl App No. PCT/JP2022/027093.

(Continued)

*Primary Examiner* — Clinton T Ostrup
(74) *Attorney, Agent, or Firm* — Banner & Witcoff, Ltd.

(57) ABSTRACT

This tying machine ties a first object and a second object together by using a staple comprising a first leg portion, a second leg portion, and a body portion connecting the first leg portion and the second leg portion, the staple having an opening formed between the first leg portion and the second leg portion. The tying machine comprises: a first displacement unit that displaces the first leg portion to be engageable with the first object; and a second displacement unit that surrounds the second object with the first leg portion, the second leg portion, and the body portion and displaces the second leg portion to be engageable with the first object. The second displacement unit may be configured to be able to displace the second leg portion to a position intersecting with the first leg portion in a top view.

13 Claims, 60 Drawing Sheets

(58) Field of Classification Search
     CPC ......... B65B 13/04; B65B 13/08; B65B 13/14;
                  B65B 13/24; B65B 13/30; B65B 13/305
     See application file for complete search history.

(56)                References Cited

U.S. PATENT DOCUMENTS

| | | | |
|---|---|---|---|
| 2013/0327117 A1* | 12/2013 | Pearson ................ B65B 13/025 72/409.01 | |
| 2014/0001226 A1* | 1/2014 | Scabin .................. B25C 5/0271 227/108 | |
| 2017/0361957 A1 | 12/2017 | Takemura et al. | |
| 2020/0031508 A1* | 1/2020 | Takemura ............. B65B 13/185 | |
| 2024/0245013 A1 | 7/2024 | Asai et al. | |

FOREIGN PATENT DOCUMENTS

| | | | | |
|---|---|---|---|---|
| CN | 204238566 U | * | 4/2015 | |
| CN | 111903423 A | | 11/2020 | |
| CN | 212232430 U | | 12/2020 | |
| DE | 2521165 A1 | | 11/1976 | |
| EP | 1839482 B1 | | 3/2013 | |
| EP | 3476210 A1 | | 5/2019 | |
| JP | S52-042845 A | | 4/1977 | |
| JP | H05-074245 A | | 3/1993 | |
| JP | H05287907 A | * | 11/1993 | |
| JP | H06-072339 A | | 3/1994 | |
| JP | 2000-188964 A | | 7/2000 | |
| JP | 2001-299107 A | | 10/2001 | |
| JP | 2008297710 A | * | 12/2008 | |
| JP | 2017-221149 A | | 12/2017 | |
| JP | 2023-013307 A | | 1/2023 | |
| JP | 2023-013317 A | | 1/2023 | |
| KR | 19990015947 A | | 3/1999 | |
| KR | 100233757 B1 | * | 12/1999 | ............. A01G 9/128 |
| KR | 20030045739 A | * | 6/2003 | |
| KR | 2006004231 A | * | 1/2006 | |
| KR | 100555595 B1 | * | 3/2006 | |
| KR | 100681872 B1 | | 2/2007 | |
| KR | 2009-0010552 A | | 1/2009 | |
| KR | 2009-0105552 A | | 10/2009 | |
| KR | 2011-0096608 A | | 8/2011 | |
| KR | 101154811 B1 | * | 6/2012 | |
| KR | 101154812 B1 | * | 6/2012 | |
| WO | WO-2020209019 A1 | * | 10/2020 | ................ F16B 2/26 |

OTHER PUBLICATIONS

Sep. 6, 2022—(WO) Written Opinion of ISA—Intl App PCT/JP2022/027093.
May 28, 2025—(EP) Extended Search Report—App No. 22842052.7.

* cited by examiner

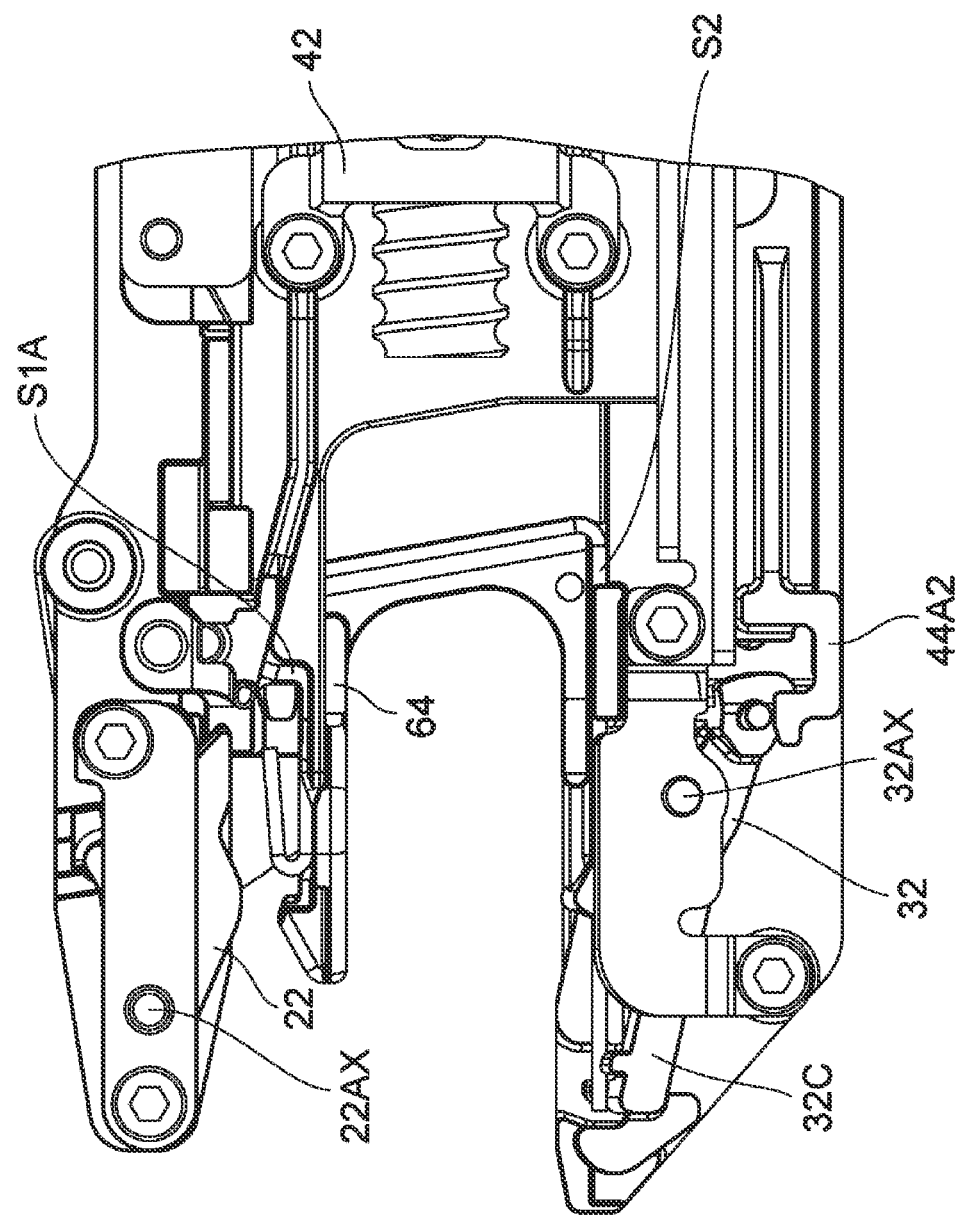
*FIG. 19*
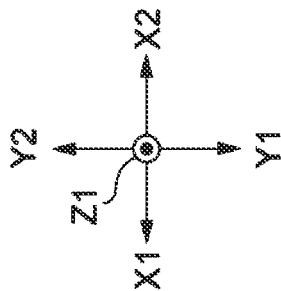

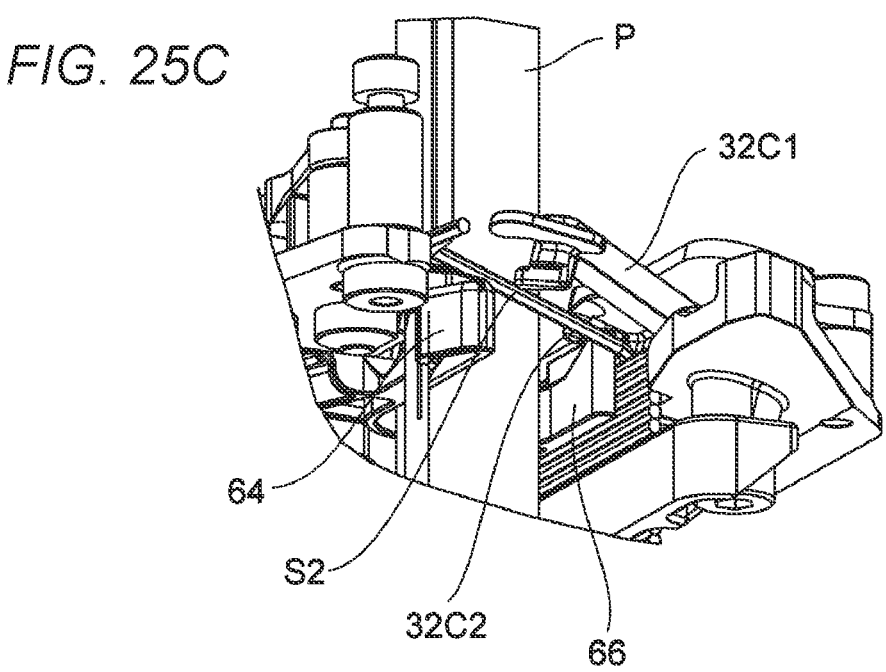
*FIG. 25C*
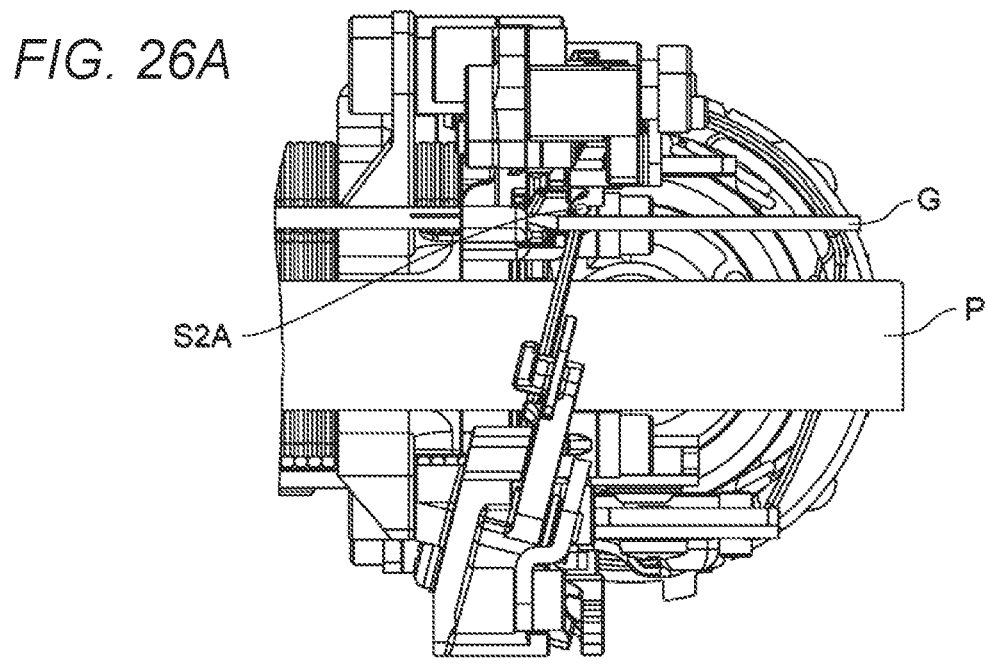
*FIG. 26A*
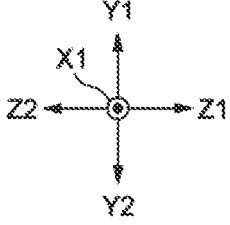

TYING MACHINE AND METHOD FOR TYING

CROSS REFERENCE TO RELATED APPLICATIONS

This is a U.S. National Phase Application under 35 U.S.C. § 371 of International Application No. PCT/JP2022/027093, filed Jul. 8, 2022, which claims priority to Japanese Application Nos. 2021-117383, filed Jul. 15, 2021; and 2021-117401, filed Jul. 15, 2021, which were published Under PCT Article 21(2), the entire contents of which are incorporated herein by reference.

TECHNICAL FIELD

The present invention relates to a binding machine and a binding method.

BACKGROUND ART

It is known that a plant and the like are bound with a wire or the like by using a binding tool such as a staple.

Patent Literature 1 describes an example of such a staple. The staple includes a pair of left and right arms and a convex protrusion provided between the arms.

Patent Literature 2 describes an electric binding machine that includes a rechargeable power source detachably connected to a mounting shell. The binding machine described in Patent Literature 2 can perform binding by using the staple described in Patent Literature 1.

CITATION LIST

Patent Literature

Patent Literature 1: European Patent No. 1839482
Patent Literature 2: Chinese Patent Application Publication No. 111903423

SUMMARY OF INVENTION

Technical Problem

The staple and the like described in Patent Literature 1 restrain the relative movement of two objects, that is, a first object and a second object, and thus the staple and the like correspond to a binding tool (a staple) for binding the first object and the second object.

Patent Literature 2 discloses a binding machine using the staple disclosed in Patent Literature 1, but does not disclose a binding method by which the binding is less likely to be released from an object. In order to bind growing objects such as a plant, two objects must be bound in a state before growth such that the binding is less likely to be released even in a state after growth. When the two objects are tightly bound in the state before growth, the growth of the objects is inhibited. On the other hand, in a case where stems and the like as the objects grow thick or the weight of fruit and the like increases when the two objects are loosely bound, both ends of the binding tool are opened and the binding tool is likely to be released.

Therefore, an object of the present invention is to provide a binding machine and a binding method that enable binding which is less likely to be released.

Solution to Problem

A binding machine according to an aspect of the invention of the present application is configured to bind a first object and a second object by using a staple that includes a first leg portion, a second leg portion, and a main body portion connecting the first leg portion and the second leg portion, and that has an opening formed between the first leg portion and the second leg portion. The binding machine includes a first displacement portion configured to displace the first leg portion so as to be engageable with the first object, and a second displacement portion configured to displace the second leg portion so as to surround the second object by using the first leg portion, the second leg portion, and the main body portion, and to be engageable with the first object.

Further, a binding method according to another aspect of the invention of the present application is a binding method for binding a first object and a second object by using a staple that includes a first leg portion, a second leg portion, and a main body portion connecting the first leg portion and the second leg portion, and that has an opening formed between the first leg portion and the second leg portion. The first leg portion is displaced and the first object is engaged with the first leg portion, and the second leg portion is displaced so as to surround the second object by using the first leg portion, the second leg portion, and the main body portion, and the first object is engaged with the second leg portion.

Here, a top view refers to a viewpoint viewed from a direction perpendicular to a plane penetrating through the first leg portion, the second leg portion, and the main body portion before binding, and may be referred to as a plan view.

In the present invention, the description "binds a first object and a second object" refers to restricting the movement of the second object with respect to the first object. Here, the staple used for binding does not necessarily come into contact with the first object or the second object. For example, even when the staple does not come into contact with the second object, it is possible to restrict the movement of the second object with respect to the first object by engaging with the first object in a state where the staple surrounds the second object, and thus the description "binds a first object and a second object" includes such a state.

In the present invention, the description "bend" or the description "fold" refers to local bending. Therefore, in a case of bending, a portion other than a locally bent portion substantially maintains an original shape. For example, when a linearly extending member is bent, a portion other than a portion locally bent substantially maintains a linearly extending shape.

In the present invention, the description "curve" refers to bending in a bow shape within a predetermined range. Therefore, in a case of curving, the curved member is deformed smoothly within a predetermined range.

In the present invention, the description "bend" includes bending and curving.

BRIEF DESCRIPTION OF DRAWINGS

FIG. 1A is a diagram illustrating an example of a staple before binding in a top view.

FIG. 19 is a partially enlarged view illustrating a state where the staple has passed through a first outer wall portion by the binding machine according to the first embodiment in the top view.

FIG. 23B is a partially enlarged view illustrating the front end portion of the binding machine in the top view when the slider advances and the second leg portion is deformed.

FIG. 25C is a partially enlarged perspective view of the front end portion of the binding machine after the slider starts retracting.

FIG. 26A is a partially enlarged view and an enlarged perspective view of the front end portion of the binding machine in the front view when the slider further retracts.

FIG. 27B is a diagram illustrating an example of the staple after the binding in the top view.

FIG. 35B is a sectional view illustrating the process of engaging the staple with the first object by using the binding machine in the second embodiment in the top view.

DESCRIPTION OF EMBODIMENTS

Hereinafter, embodiments of the present invention will be described with reference to the drawings. The following embodiments are examples for explaining the present invention, and it is not intended to limit the present invention only to the embodiments.

First Embodiment

[Configuration of Staple S]

First, a configuration of a staple S according to the present embodiment will be described. The staple S is formed of a plastic deformable wire material that has plasticity. The staple S may be referred to as a wire or a clip. The staple S includes, for example, a metal wire material or a metallic wire (including one whose surface is coated by using a plating process or a resin).

Figure 1A:
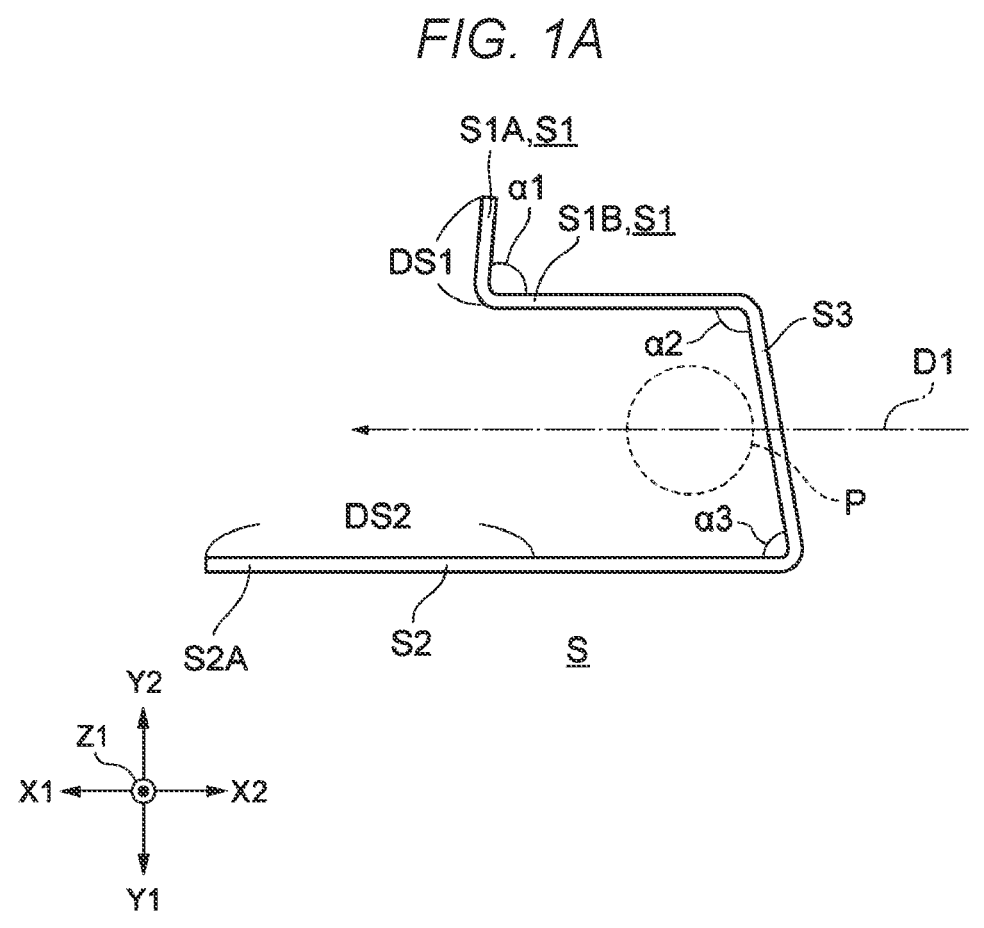
Figure 1B:
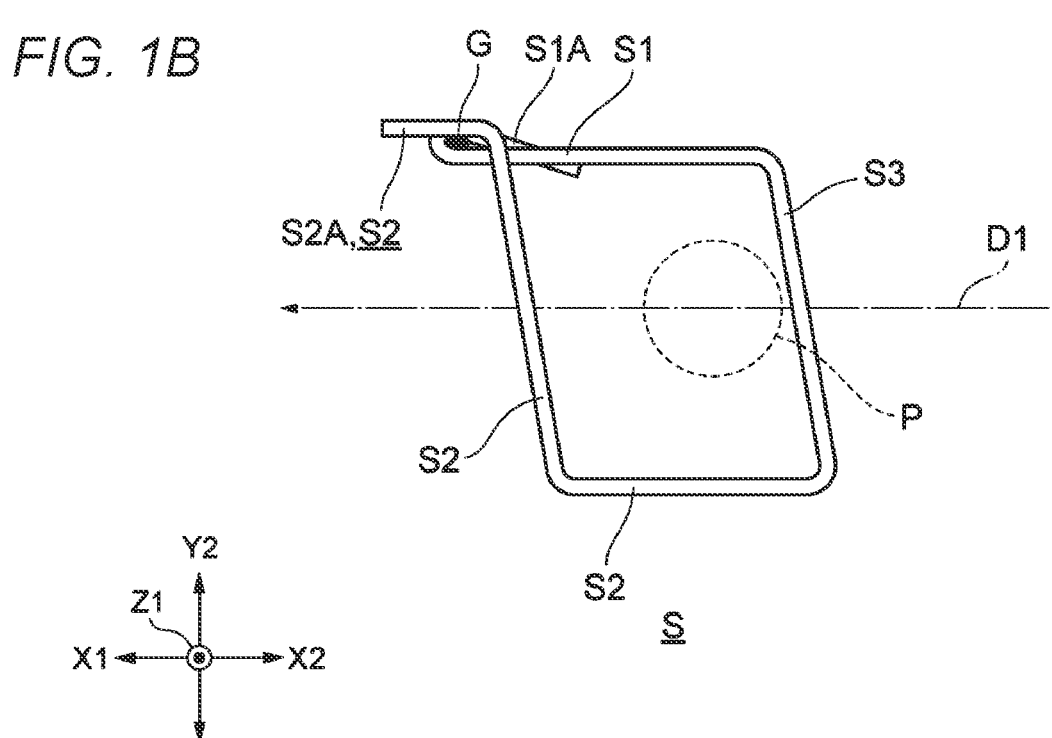
FIG. 1B is a diagram illustrating an example of the staple after the binding in the top view.
Figure 1C:
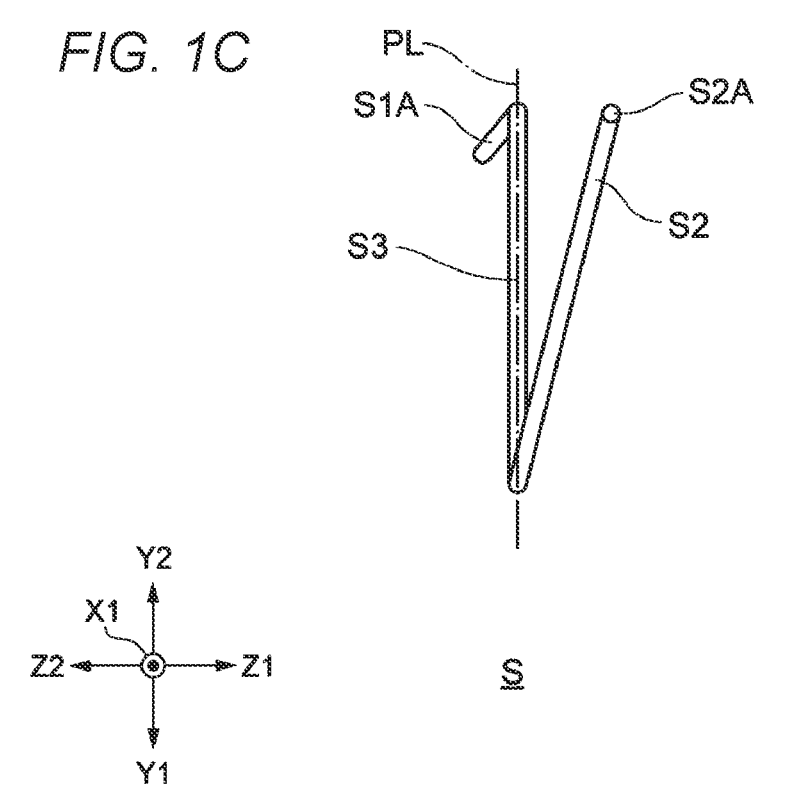
FIG. 1C is a diagram illustrating an example of the staple after the binding in a front view.

FIG. 1A illustrates the staple S before binding according to the present embodiment, and FIG. 1B and FIG. 1C respectively illustrate a top view and a front view of the staple S in a bound state after the binding (however, for convenience of description, parts unnecessary for description such as a first object G and a second object P are omitted in FIG. 1C).

The staple S includes a first leg portion S1, a second leg portion S2, and a main body portion S3 connecting the first leg portion S1 and the second leg portion S2.

In a state before binding, the first leg portion S1 and the second leg portion S2 of the staple S are separately provided, and thus an opening is provided between the first leg portion S1 and the second leg portion S2. A direction from a closed portion of the main body portion S3 toward the opening (a leftward direction of a paper surface in FIG. 1A) is referred to as an opening direction D1. When the staple S is set in a binding machine 10, the opening direction D1 of the staple S coincides with a forward direction X1 to be described later.

The first leg portion S1 is a portion including one end portion of the staple S, and includes a first portion S1B extending in the opening direction D1 and a tip end portion S1A bent from the first portion S1B and extending outward. An angle formed by the first portion S1B and the tip end portion S1A is referred to as a bending angle $\alpha 1$, and a portion of the tip end portion S1A that is bent to be connected to the first portion S1B is referred to as a bent portion. In the present embodiment, the bending angle $\alpha 1$ is 90 degrees or less.

The second leg portion S2 is a portion including the other end portion of the staple S. and includes a second portion extending in the opening direction D1. In the top view (FIG.

1B) illustrating the bound state, the second leg portion S2 is bent to intersect the first leg portion S1 and closes the opening. Accordingly, the second leg portion S2 according to the present embodiment is formed to be longer than a width of the opening, that is, a distance between the first leg portion S1 and the second leg portion S2. In addition, the second leg portion S2 is formed to be longer than the first leg portion S1.

The main body portion S3 is a portion connecting the first leg portion S1 and the second leg portion S2. The main body portion S3 according to the present embodiment includes a side portion extending linearly. However, a shape of the main body portion S3 is not limited thereto, and the main body portion S3 may include, for example, a curved portion that is curved in an outward direction, or may include one or more side portions and one or more curved portions.

In the bound state illustrated in FIG. 1B, the tip end portion S1A of the first leg portion S1 of the staple S is bent substantially clockwise (Hereinafter, in the top view; a substantially clockwise direction may be referred to as a "first rotation direction R1", and a substantially counterclockwise direction may be referred to as a "second rotation direction R2".) in FIG. 1B, and intersects the first leg portion S1 in the top view: Accordingly, it is possible to sandwich the first object G with the first leg portion S1. As illustrated in FIG. 1C, the tip end portion S1A of the first leg portion S1 is bent such that a tip end thereof advances in a downward direction Z2 separated from a plane PL penetrating through the first leg portion S1, the second leg portion S2, and the main body portion S3 before the binding.

On the other hand, a part of the second leg portion S2 of the staple S closes the opening by being folded in the first rotation direction R1. Since the opening is closed, it is possible to restrain the staple S from being released from the second object P surrounded by the staple S. Further, as illustrated in FIG. 1C, a tip end portion S2A of the second leg portion S2 is bent such that a tip end thereof advances in an upward direction Z1 separated from the plane PL penetrating through the first leg portion S1, the second leg portion S2, and the main body portion S3 before the binding. In this way, the tip end of the first leg portion S1 is bent to advance in the downward direction Z2 and is engaged with the first object G, and the tip end of the second leg portion S2 is bent to advance in the upward direction Z1 and is engaged with the second object P, and thus it is possible to easily generate tension in a region from an engagement position of the first object G with the first leg portion S1 to an engagement position of the second object P with the second leg portion S2. Accordingly, it is possible to restrain the first object G from being bent and the staple S from falling off and the like.

In addition, the second leg portion S2 is folded to a position where the second leg portion S2 intersects the first leg portion S1 in the first rotation direction R1 toward an inward direction of the staple S so as to close the opening in the top view: At this time, the tip end portion S2A of the second leg portion S2 passes through a gap between the first object G and the second object P. Thereafter, the second leg portion S2 is displaced in the second rotation direction R2 opposite to the first rotation direction R1 in the top view; which causes the tip end portion S2A of the second leg portion S2 passing through the gap between the first object G and the second object P to be engaged with the first object G. As a result, it is possible to engage the tip end portion S1A of the first leg portion S1 with the tip end portion S2A of the second leg portion S2 to sandwich the first object G. Even when the second object P grows, the first leg portion S1 and the second leg portion S2 are respectively bent in directions in which a force for sandwiching the first object G is strengthened. Therefore, it is possible that even when the second object P grows, the staple S is less likely to be released from the first object G.

When the second leg portion S2 is displaced in the first rotation direction R1, it is preferable to bend the second leg portion S2 in the first rotation direction R1 and bend the tip end portion S2A of the second leg portion S2 in the second rotation direction R2 opposite to the first rotation direction R1. According to such a configuration, it is possible to easily engage the tip end portion S2A of the second leg portion S2 with the first object G by displacing the tip end portion S2A of the second leg portion S2 that has passed through the gap between the first object G and the second object P in the second rotation direction R2.

As is clear from a comparison between FIG. 1A illustrating the state of the staple S before the binding, and FIG. 1B and FIG. 1C illustrating the state of the staple S after the binding, when a distance from the tip end of the first leg portion S1 to the displaced portion of the first leg portion S1 is set to a first distance DS1 and a distance from the tip end of the second leg portion S2 to the displaced portion of the second leg portion S2 is set to a second distance DS2, the second distance DS2 is larger than the first distance DS1, and for example, the second distance DS2 is larger than twice the first distance DS1. In this way, by bending the staple S in a non-symmetrical manner, it is possible to suitably engage the second leg portion S2 with the first object G held adjacently to the first leg portion S1.

Further, as illustrated in FIG. 1A, a boundary position between the displaced portion of the first leg portion S1 and a portion not displaced thereof, which corresponds to a position from the tip end of the first leg portion S1 by the first distance DS1, corresponds to a position advanced in the opening direction D1 with respect to a boundary position between the displaced portion of the second leg portion S2 and a portion not displaced thereof, which corresponds to a position from the tip end of the second leg portion S2 by the second distance DS2.

According to such a configuration, when a slider 44 is advanced in the opening direction D1, it is possible to first start the displacement of the second leg portion S2, and start the displacement of the first leg portion S1 after the displacement of the second leg portion S2 is started. Therefore, it is possible to restrain a large load from being applied to the binding machine 10 at the same time.

A shape of the staple S is not limited to that illustrated in FIG. 1A. For example, it will be understood by a person skilled in the art that the first leg portion S1 and the second leg portion S2 are not necessarily parallel to each other, and for example, even when the width of the opening becomes narrower toward the tip end, or the width of the opening becomes wider toward the tip end, it is possible to bend the staple S such that at least a part of the technical effects described above is exhibited. In addition, it will be understood by a person skilled in the art that even when the first leg portion S1 and the second leg portion S2 have the same length, the tip end of the first leg portion S1 is surplus, but it is possible to bend the staple S such that at least a part of the technical effects described above is exhibited.

A method of bending the staple S is not limited to those illustrated in FIGS. 1B and 1C. For example, the tip end portion S2A of the second leg portion S2 may not be bent. It will be understood by a person skilled in the art that even when the tip end portion S2A of the second leg portion S2 is not bent, the second leg portion S2 can be engaged with the first object G, and thus at least a part of the technical effects described above is exhibited.

An example of a configuration of the binding machine 10 for bending the staple S illustrated in FIG. 1A as illustrated in FIGS. 1B and 1C will be described below:

FIGS. 2A to 2E are schematic diagrams illustrating the configuration of the binding machine 10 according to the embodiment of the present invention and states of the staple S bent by the binding machine 10, respectively. In FIGS. 2A to 2E, the main body portion S3 of the staple S is stationary.

In order to describe a relation between relative directions, for the sake of convenience, a leftward direction of the paper surface in FIG. 2A to FIG. 2E may be referred to as the forward direction X1, a rightward direction of the paper surface may be referred to as a rearward direction X2, a near-side direction perpendicular to the paper surface may be referred to as the upward direction Z1, a far-side direction perpendicular to the paper surface may be referred to as the downward direction Z2, a lower side of the paper surface may be referred to as a rightward direction Y1, and an upper side of the paper surface may be referred to as a leftward direction Y2. The top view refers to the viewpoint when the binding machine 10 and the like is seen from a position at the upward direction Z1 toward the downward direction Z2, the front view refers to the viewpoint when the binding machine 10 and the like is seen from a position at the forward direction X1 toward the rearward direction X2, and the side view refers to the viewpoint when the binding machine 10 and the like is seen toward the rightward direction Y1 or the leftward direction Y2.

Further, when the staple S to be described later is set in the binding machine 10, a direction from a region surrounded by the staple S (a region into which the second object P to be described later is inserted) toward an outer side of the staple S may be referred to as an outward direction, and a direction from the outer side of the staple S toward the region surrounded by the staple S may be referred to as an inward direction, with the staple S as a reference.

Figure 2A:
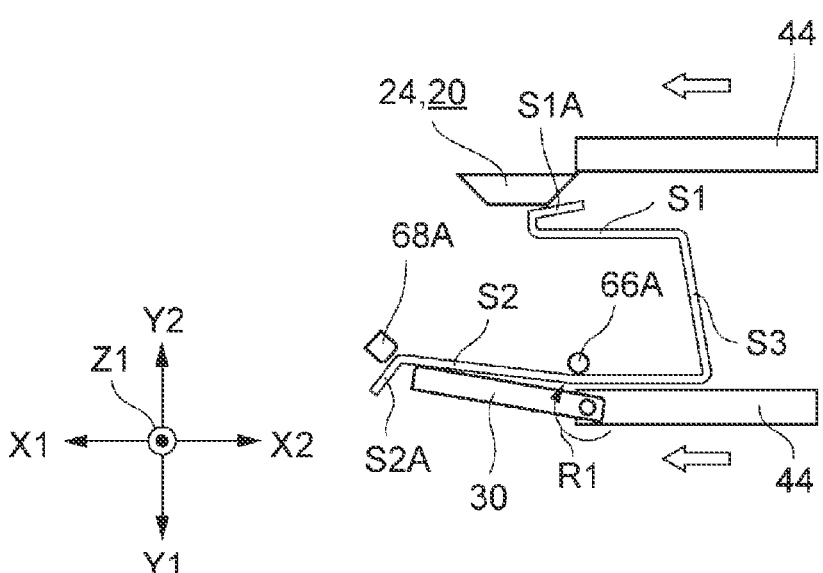
FIG. 2A is a schematic diagram of a binding method using a binding machine according to a first embodiment.

As illustrated in FIG. 2A and the like, the binding machine 10 includes the slider 44 as an example of a movement part that moves in the forward direction X1. The binding machine 10 further includes a first displacement portion 20 for displacing the first leg portion S1 of the staple S. The first displacement portion 20 displaces the first leg portion S1 of the staple S so as to be engageable with the first object G by moving different parts in different directions based on the movement of the slider 44 toward the forward direction X1.

The slider 44 may be integrally formed, or may be composed of a plurality of parts that move in an interlocked manner.

The first displacement portion 20 according to the present embodiment includes a contact member 24 that moves in a direction inclined toward the inward direction of the staple S (the rightward direction Y1) and the rearward direction X2 based on the movement of the slider 44 toward the forward direction X1. The contact member 24 comes into contact with a region of the tip end portion S1A of the staple S and bends the tip end portion S1A to plastically deform, and thus the contact member 24 may be referred to as a gripping portion.

The first displacement portion 20 may include a part that moves in a direction substantially perpendicular to the forward direction X1, which is the inward direction of the staple S (the rightward direction Y1), based on the movement of the slider 44 toward the forward direction X1 so as to come into contact with the tip end portion S1A of the staple S and bend the tip end portion S1A.

Instead of this, the first displacement portion 20 may include a part that moves in the outward direction of the staple S (the leftward direction Y2) based on the movement of the slider 44 toward the forward direction X1 so as to come into contact with the tip end portion S1A of the staple S and bend the tip end portion S1A.

Instead of this, the first displacement portion 20 may include a part that moves the staple S in the first rotation direction R1 based on the movement of the slider 44 toward the forward direction X1 so as to come into contact with the tip end portion S1A of the staple S and bend the tip end portion S1A.

Instead of this, the first displacement portion 20 may include a part that moves the staple S in the second rotation direction R2 based on the movement of the slider 44 toward the forward direction X1 so as to come into contact with the tip end portion S1A of the staple S and bend the tip end portion S1A.

As a mechanism for moving the parts such as the contact member 24 in different directions based on the movement of the movement part such as the slider 44 toward the forward direction X1, a mechanism disclosed in the present embodiment or other mechanisms may be used.

As a mechanism for rotating the parts such as the contact member 24 in the first
rotation direction R1 or the second rotation direction R2 based on the movement of the movement part such as the slider 44 toward the forward direction X1, the mechanism disclosed in the present embodiment or other mechanisms may be used.

The binding machine 10 further includes a second displacement portion 30 for displacing the second leg portion S2 of the staple S. The second displacement portion 30 displaces the second leg portion S2 of the staple S so as to be engageable with the first object G by moving different parts in different directions based on the movement of the slider 44 toward the forward direction X1.

The second displacement portion 30 according to the present embodiment includes an arm (may also referred to as a second arm) that bends the second leg portion S2 to plastically deform by rotating in the first rotation direction R1 based on the movement of the slider 44 toward the forward direction X1. In the present embodiment, since the arm comes into contact with the second leg portion S2 of the staple S and bends the second leg portion S2 in a direction inclined toward the upward direction Z1 while bending the second leg portion S2 in a direction approaching the first leg portion S1, and thus the arm may be referred to as an obliquely bending portion.

In FIG. 2A, the second displacement portion 30 is connected to the slider 44 and is configured to rotate with a front end portion of the slider 44 as a fulcrum. However, as described in the embodiment to be described later, the second displacement portion 30 may not be connected to the slider 44. For example, the second displacement portion 30 may be not connected to the slider 44, and may include a second arm 32 that bends the second leg portion S2 to plastically deform by rotating in the first rotation direction R1 by a second front end portion 44A2 of the slider 44.

The second displacement portion 30 may include a part that moves in a direction substantially perpendicular to the forward direction X1, which is the inward direction of the staple S (the leftward direction Y2), based on the movement of the slider 44 toward the forward direction X1 so as to come into contact with the second leg portion S2 of the staple S and bend the second leg portion S2.

Instead of this, the second displacement portion 30 may include a part that moves in the outward direction of the staple S (the rightward direction Y1) based on the movement of the slider 44 toward the forward direction X1 so as to come into contact with the second leg portion S2 of the staple S and bend the second leg portion S2.

Instead of this, the second displacement portion 30 may include a part that moves the staple S in the second rotation direction R2 based on the movement of the slider 44 toward the forward direction X1 so as to come into contact with the second leg portion S2 of the staple S and bend the second leg portion S2.

Further, the second displacement portion 30 according to the present embodiment additionally includes a support wall portion 68A that bends the tip end portion S2A of the second leg portion S2 in an opposite direction (the outward direction) by causing the tip end portion S2A of the second leg portion S2 to pass therethrough while bringing the tip end portion S2A into contact therewith. Since the support wall portion 68A bends the tip end portion S2A of the second leg portion S2, the support wall portion 68A may be referred to as a tip end-bending portion.

However, in the case of using a staple having a tip end portion bent in the outward direction in advance, the binding machine may not include the support wall portion 68A.

Further, the binding machine 10 according to the present embodiment additionally includes a fulcrum 66A functioning as a bending fulcrum of the second leg portion S2. In the present embodiment, a front end of a second inner wall portion 66 functions as the fulcrum 66A. In addition, a distance from a portion of the second leg portion S2, which is in contact with the fulcrum 66A, to the tip end thereof corresponds to the second distance DS2.

FIG. 2A is a schematic diagram illustrating a state immediately after the start of the bending of the staple S in the top view: As illustrated in FIG. 2A, the second displacement portion 30 starts rotating in the first rotation direction R1 by the slider 44 moving in the forward direction. Therefore, the second leg portion S2 of the staple S that is in contact with the second displacement portion 30 starts bending with the fulcrum 66A as a fulcrum. At the same time, the tip end portion S2A of the second leg portion S2 passes through the support wall portion 68A while being in contact with the support wall portion 68A. Accordingly, it is possible to bend the tip end portion S2A of the second leg portion S2 in the second rotation direction R2 corresponding to the outward direction of the staple S while bending a second leg portion S2 in the first rotation direction R1 corresponding to the inward direction of the staple S.

Figure 2B:
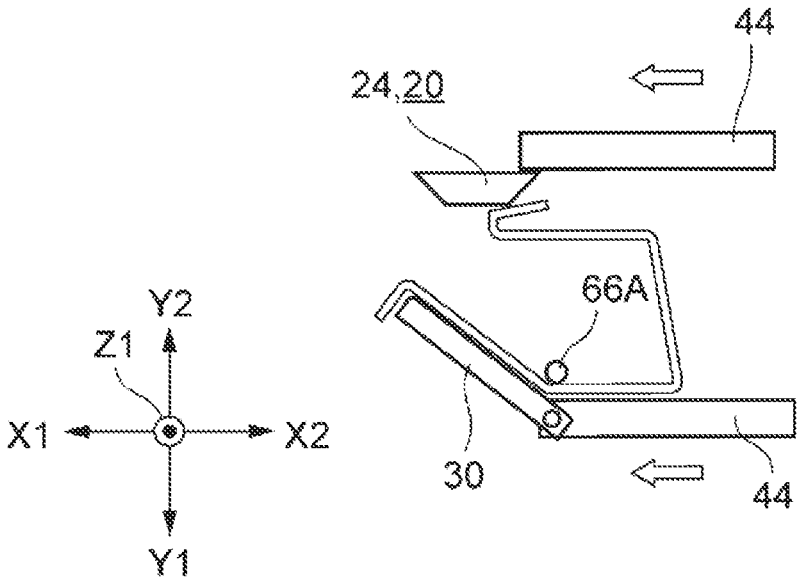
FIG. 2B is a schematic diagram of the binding method using the binding machine according to the first embodiment.
Figure 2C:
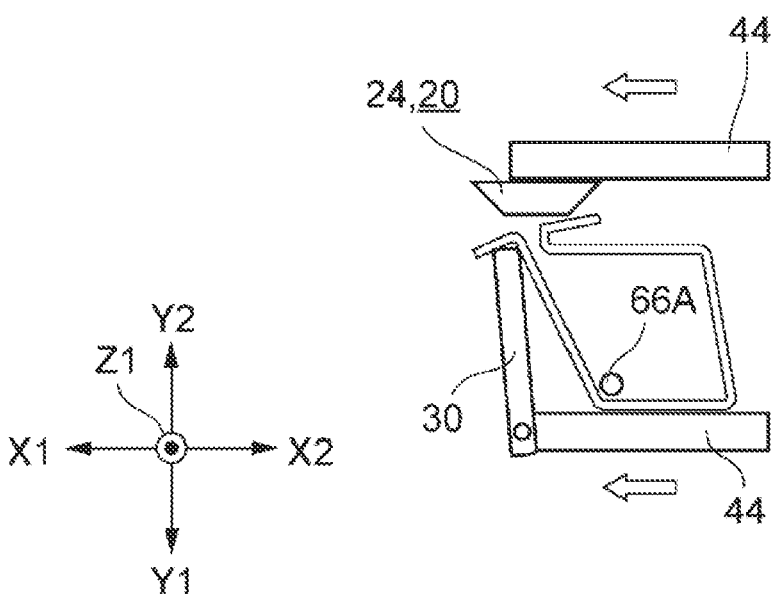
FIG. 2C is a schematic diagram of the binding method using the binding machine according to the first embodiment.

FIGS. 2B and 2C are schematic diagrams respectively illustrating the states after the start of the bending of the staple S in the top view. As illustrated in FIGS. 2B and 2C, the second displacement portion 30 further rotates in the first rotation direction R1 by the slider 44 further moving in the forward direction. Therefore, the second displacement portion 30 further bends the second leg portion S2 in the first rotation direction R1 with the fulcrum 66A as a fulcrum.

Figure 2D:
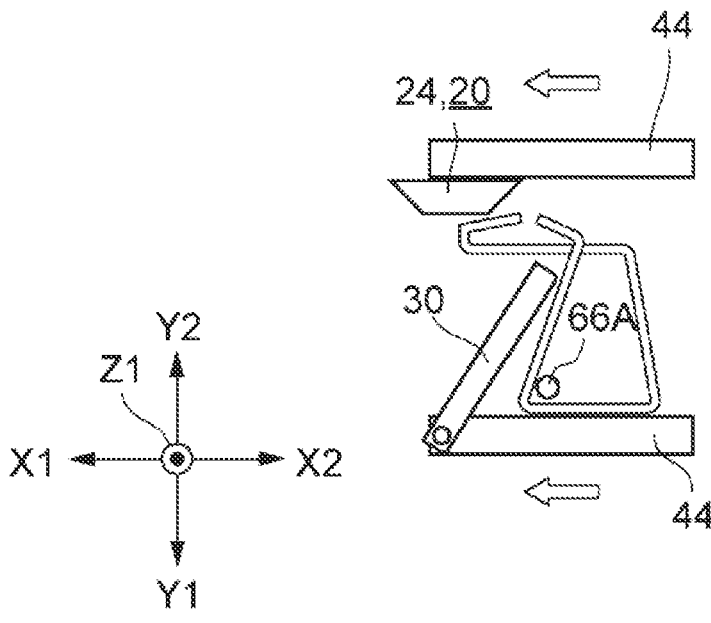
FIG. 2D is a schematic diagram of the binding method using the binding machine according to the first embodiment.
Figure 2E:
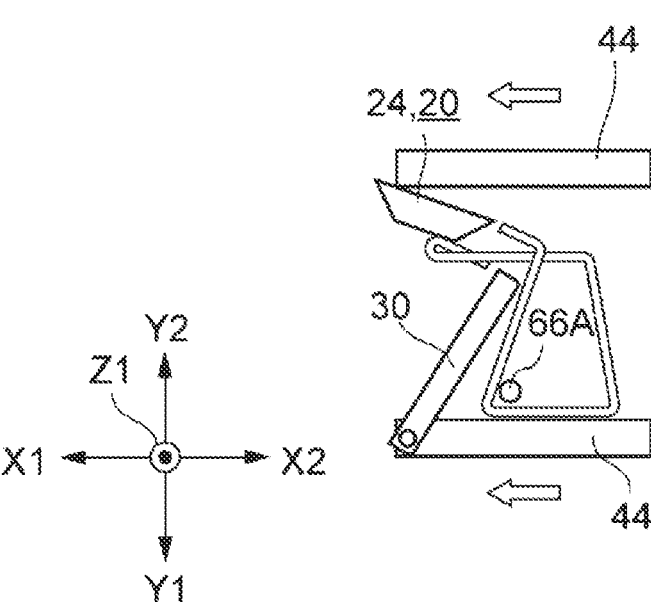
FIG. 2E is a schematic diagram of the binding method using the binding machine according to the first embodiment.

FIG. 2D is a schematic diagram illustrating a state where the second leg portion S2 of the staple S is bent and intersects the first leg portion S1 in the top view: In the present embodiment, since the second leg portion S2 is bent in the direction inclined toward the upward direction Z1 while being bent in the direction approaching the first leg portion S1, the second leg portion S2 does not intersect the first leg portion S1. As illustrated in FIG. 2D, since the second displacement portion 30 further rotates in the first rotation direction R1 by the slider 44 further moving in the forward direction and rotates by 90 degrees or more, the second displacement portion 30 is configured to bend the second leg portion S2 to the position where the second leg portion S2 intersects the first leg portion S1 in the top view:

FIG. 2E is a schematic diagram illustrating a state where the first leg portion S1 of the staple S is bent in the top view: As illustrated in FIG. 2E, the contact member 24 of the first displacement portion 20 moves in the direction inclined toward the inward direction (the rightward direction Y1) and the rearward direction X2 by the slider 44 moving in the forward direction, and bends the tip end portion S1A of the first leg portion S1. As illustrated in FIG. 2E, the tip end portion S1A may be folded in the upward direction Z1 or may be folded in the downward direction Z2 with respect to the first leg portion S1. By bending a tip end portion S1A of the first leg portion S1 in this manner, it is possible to sandwich the first object G with the first leg portion S1.

Further, in the present embodiment, by disposing the first displacement portion 20 and the second displacement portion 30 such that timings at which the first displacement portion 20 and the second displacement portion 30 come into contact with the slider 44 are different, a timing at which the bending of the first leg portion S1 of the staple S starts and a timing at which the bending of the second leg portion S2 of the staple S starts are deviated. According to such a configuration, it is possible to restrain a large load from being simultaneously generated in the binding machine 10. In addition, by first starting the bending of the second leg portion S2 having a large bending amount, it is possible to restrain a large deviation between a timing at which the bending of the first leg portion S1 ends and a timing at which the bending of the second leg portion S2 ends.

Hereinafter, the detailed configuration of the binding machine 10 according to the first embodiment will be described.

Figure 3:
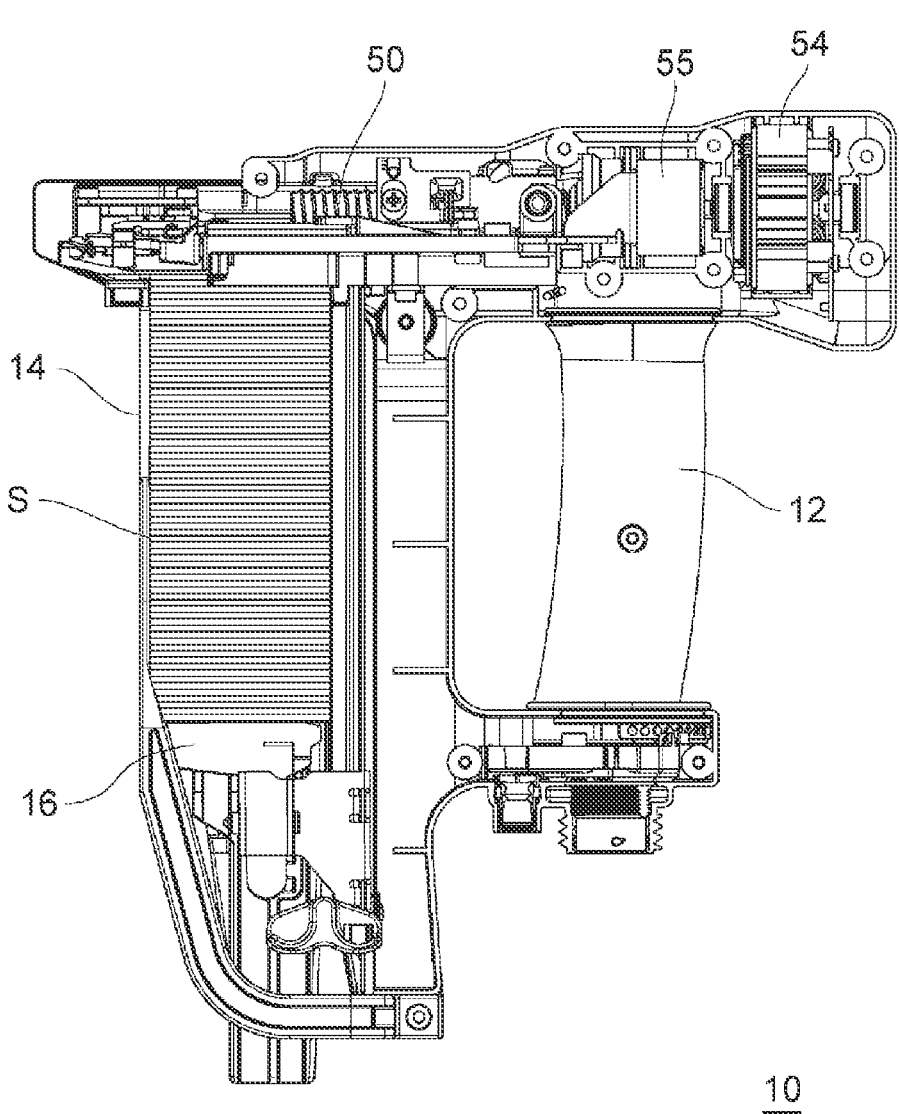
FIG. 3 is a sectional view of the binding machine according to the first embodiment in a right side view.
Figure 3:
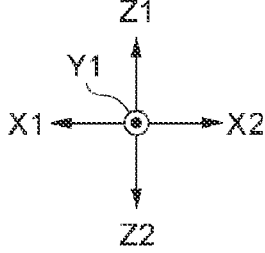
Figure 4A:
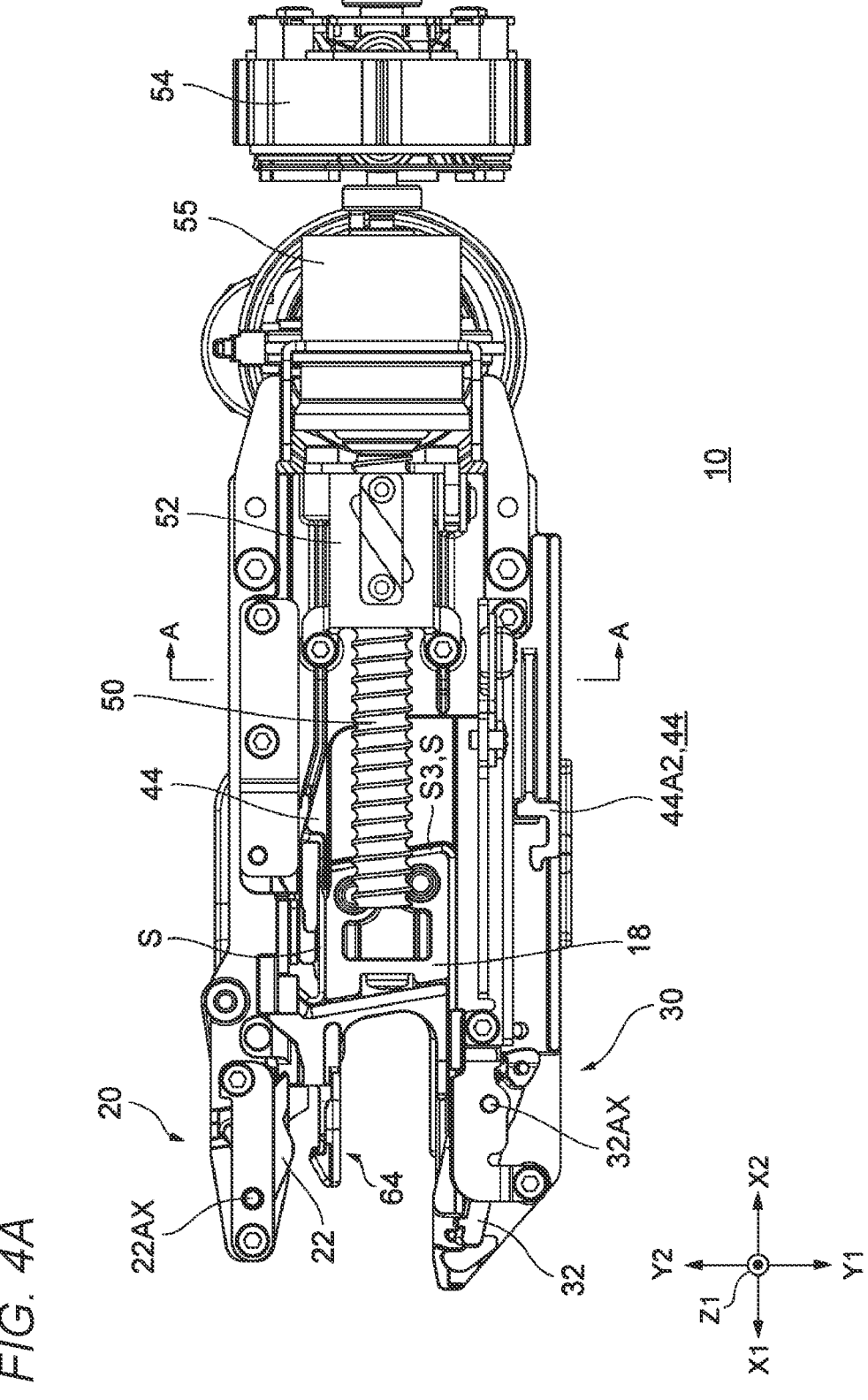
FIG. 4A is a sectional view of the binding machine according to the first embodiment in the top view.

FIG. 3 is a sectional view of the binding machine 10 in a right side view: FIG. 4A is a sectional view of the binding machine 10 in the top view (However, for the sake of convenience, FIG. 4A is rotated by 90 degrees. Hereinafter, the drawings may be rotated in the same manner for the sake of convenience. Further, parts not described in order to make the description easier to understand (for example, a housing of the binding machine 10) are omitted (hereinafter, some parts may be omitted in the drawings for the same reason).

Figure 4B:
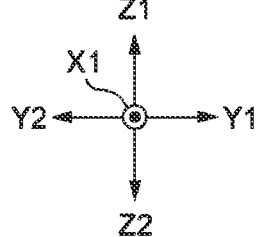
FIG. 4B is a sectional view of the binding machine according to the first embodiment in the front view.
Figure 5:
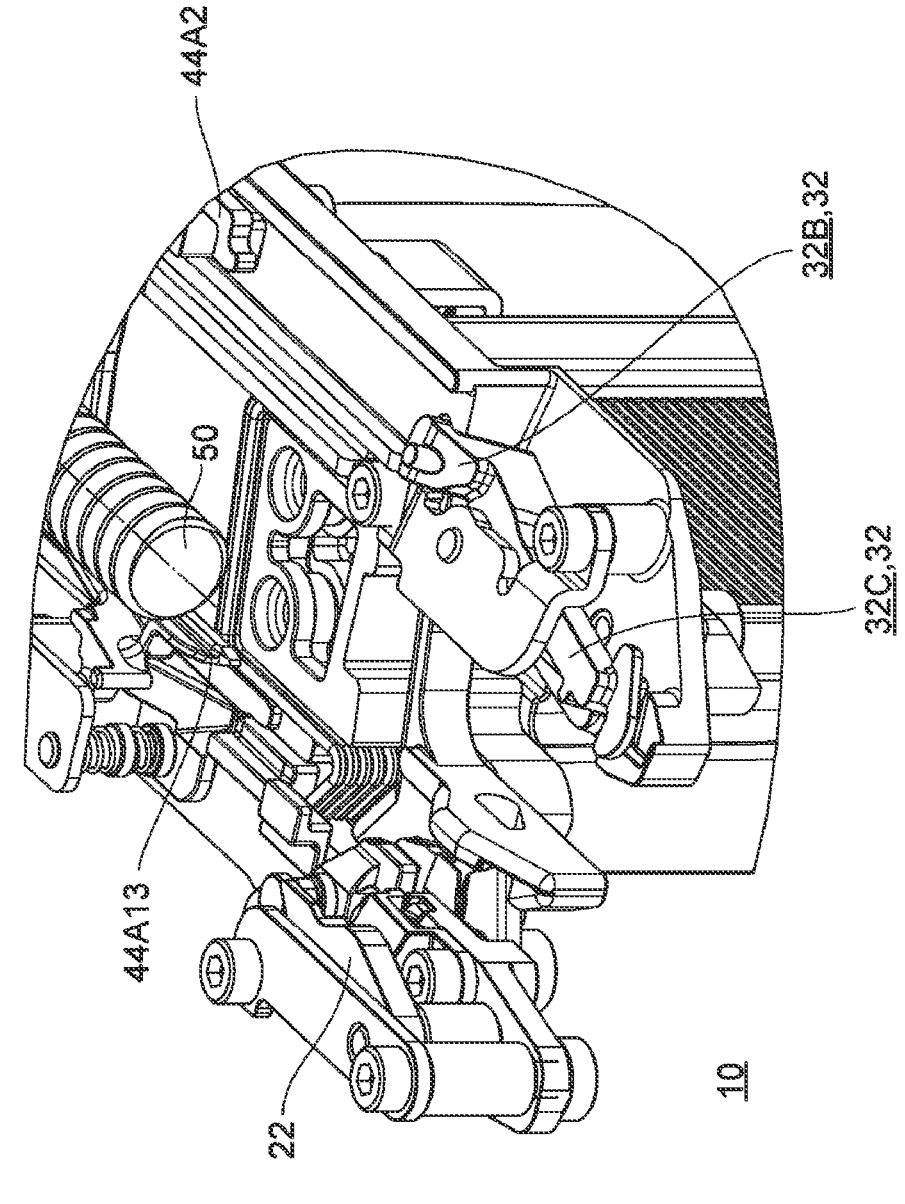
FIG. 5 is a partially enlarged view (a perspective view) illustrating a front-end side of the binding machine according to the first embodiment.

FIG. 4B is a sectional view of the binding machine 10 in the front view; which is obtained by cutting the binding machine 10 along an A-A cross section in FIG. 4A. FIG. 5 is an enlarged perspective view of a front end portion of the binding machine 10.

[Schematic Configuration of Binding Machine 10]

The binding machine 10 binds the first object G and the second object P by using the staple S having the formed opening. The configuration of the staple S (FIGS. 1A and 1B) according to the embodiment is described above.

The first object G is, for example, a wire, a beam, a string, a rod, a pipe, a branch of a tree, or the like. The first object G may be referred to as a guide element. The second object P is, for example, a stem, a vine, a branch, a fruit of a plant, a tree, or the like. The binding machine 10 restricts the movement of the second object P with respect to the first object G and binds the first object G and the second object P by displacing the first leg portion S1 of the staple S so as to engage with the first object G, and displacing the second leg portion S2 thereof so as to engage with the first object G such that the staple S surrounds the second object P.

The binding machine 10 includes the first displacement portion 20 that displaces the first leg portion S1 of the staple S so as to be engageable with the first object G, and the second displacement portion 30 that displaces the second leg portion S2 of the staple S so as to be engageable with the first object G. The second displacement portion 30 is configured to bind the first object G and the second object P by engaging the tip end portion S2A of the second leg portion S2 with the first object G in a state where the second object P is surrounded by the first leg portion S1, the second leg portion S2, and the main body portion S3 of the staple S.

More specifically, the binding machine 10 includes a grip 12 extending in an up-down direction so as to be gripped by a user and provided with a switch for driving the binding machine 10, a magazine 14 (FIG. 3) configured to accommodate a plurality of the staples S stacked in the up-down direction, a pusher 16 for biasing the plurality of staples S accommodated in the magazine 14 toward the upward direction Z1, a driver 42 that pushes the staple S positioned at an upper end toward the forward direction X1 to separate the staple S positioned at the upper end from another staple S and move the staple S in the forward direction X1, a movement mechanism for moving the driver 42 and the slider 44, the first displacement portion 20 for displacing the first leg portion S1 of the staple S by the slider 44, the second displacement portion 30 for displacing the second leg portion S2 of the staple S by the slider 44, and a detachment portion 56 that provides a movement path when the staple S is detached from the another staple S.

Here, the first displacement portion 20 includes a first outer wall portion 62 and a first inner wall portion 64 for displacing the tip end portion S1A by the tip end portion S1A of the first leg portion S1 passing through the first outer wall portion 62 and the first inner wall portion 64 while being in contact therewith when the staple S moves in the forward direction X1 by the driver 42.

Further, the first displacement portion 20 includes a first arm 22 that rotates by being pushed by a first front end portion 44A1 of the slider 44 moving in the forward direction X1, and the contact member 24 that bends the tip end portion S1A of the first leg portion S1 by moving toward the inward direction of the staple S while being in contact with the tip end portion S1A of the first leg portion S1 as the first arm 22 rotates. The contact member 24 may be referred to as a claw member.

The second displacement portion 30 includes the second arm 32 that rotates by being pushed by the second front end portion 44A2 of the slider 44 moving in the forward direction X1. The second arm 32 is configured to bend the second leg portion S2 by rotating while being in contact with the second leg portion S2 of the staple S. At this time, as described above, since the second object P is surrounded by the first leg portion S1, the second leg portion S2, and the main body portion S3 of the staple S, and the second leg portion S2 is engaged with the first object G, it is possible to bind the first object G and the second object P.

The binding machine 10 according to the present embodiment respectively displaces the first leg portion S1 and the second leg portion S2 of the staple S by translating the parts such as the slider 44 toward the forward direction X1 and pushing the first arm 22 and the second arm 32 by the translated parts to convert the translational motion into a rotational motion. However, a means for displacing the first leg portion S1 or the second leg portion S2 is not limited thereto. For example, as the means for displacing the first leg portion S1, a means for displacing the tip end portion S1A in an arc shape when the tip end portion S1A of the first leg portion S1 advances by the driver 42 or the slider 44, may be mounted. In addition, another means for converting the translational motion into the rotational motion may be adopted as a configuration for converting the translational motion into the rotational motion. Further, in the present embodiment, the first arm 22 and the second arm 32 are rotated together in the same direction in the top view to displace the first leg portion S1 and the second leg portion S2, but the present invention is not limited thereto, for example, the second arm 32 may rotate in the opposite direction to displace the second leg portion S2.

Hereinafter, the detailed configuration of the binding machine 10 according to the present embodiment will be described.

[Driver and Movement Mechanism of Slider (Feeding Mechanism)]

The driver 42 of the binding machine 10 has a function of moving in the forward direction X1 to move the staple S in the forward direction X1. The driver 42 is configured to move the staple S positioned at the upper end, which is connected to the another staple S, toward the forward direction X1 so as to separate the staple S from the another staple S, and is further configured to displace the tip end portion S1A of the first leg portion S1 by moving the staple S toward the forward direction X1 and causing the tip end portion S1A of the first leg portion S1 to pass through the first outer wall portion 62 included in the first displacement portion 20 while being in contact therewith.

Figure 6A:
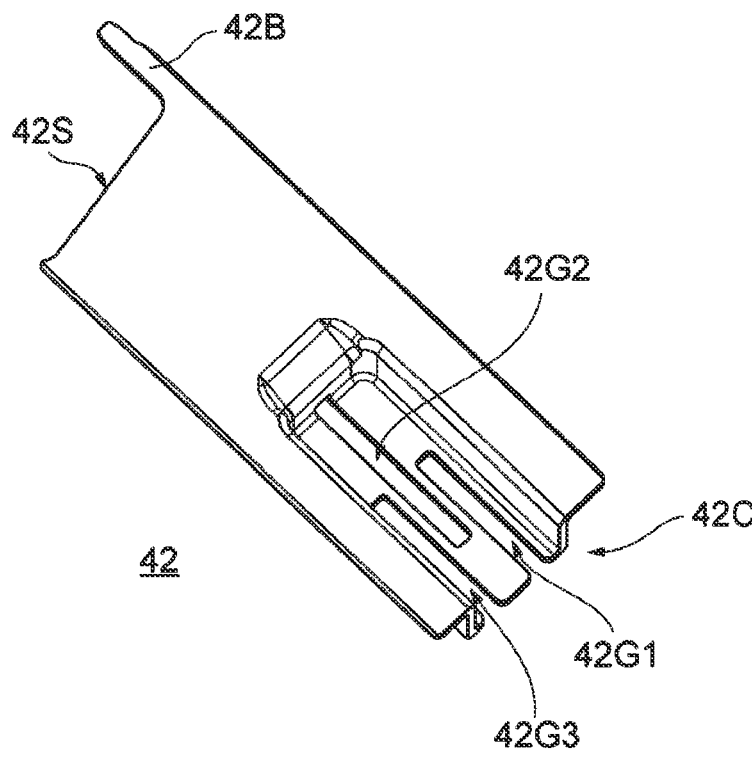
FIG. 6A is a perspective view of a driver according to the first embodiment.
Figure 6B:
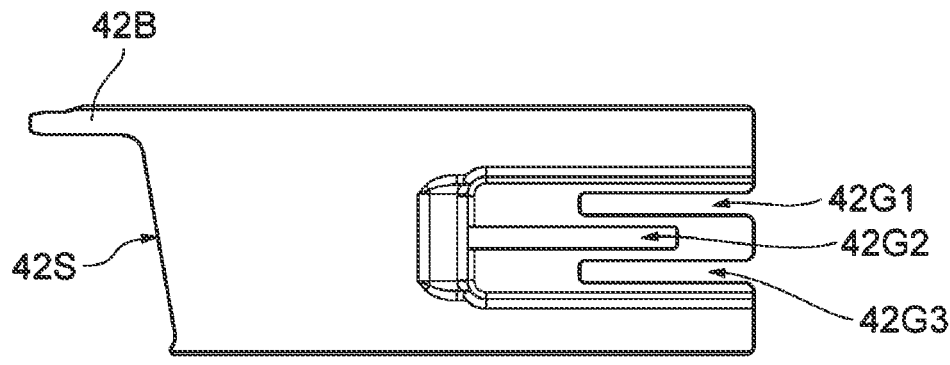
FIG. 6B is a plan view of the driver according to the first embodiment in the top view.
Figure 6B:
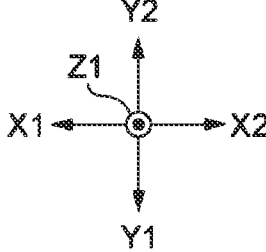

FIG. 6A is a perspective view of the driver 42 according to the present embodiment, and FIG. 6B is a plan view of the driver 42 in the top view. As illustrated in FIGS. 6A and 6B, the driver 42 is formed in a plate shape, and includes a front end portion having a front end surface 42S in contact with the main body portion S3 of the staple S, and a rear end portion provided in the rearward direction X2 with respect to the front end portion and having a protruded portion 42C for driver protruding in the downward direction Z2.

The front end portion of the driver 42 includes the front end surface 42S that conforms to the shape of the main body portion S3 of the staple S and is provided to be inclined with respect to a front-rear direction.

Further, a left end of the front end portion of the driver 42 has a protruding end portion 42B extending in the forward direction X1 so as to have a wall surface extending in the forward direction X1 in order to support the first leg portion S1 by coming into contact with the first portion S1B of the first leg portion S1 corresponding to a left end of the staple S and with a portion of the main body portion S3 connected to the first leg portion S1 from the leftward direction Y2 which is the outward direction.

Figure 8A:
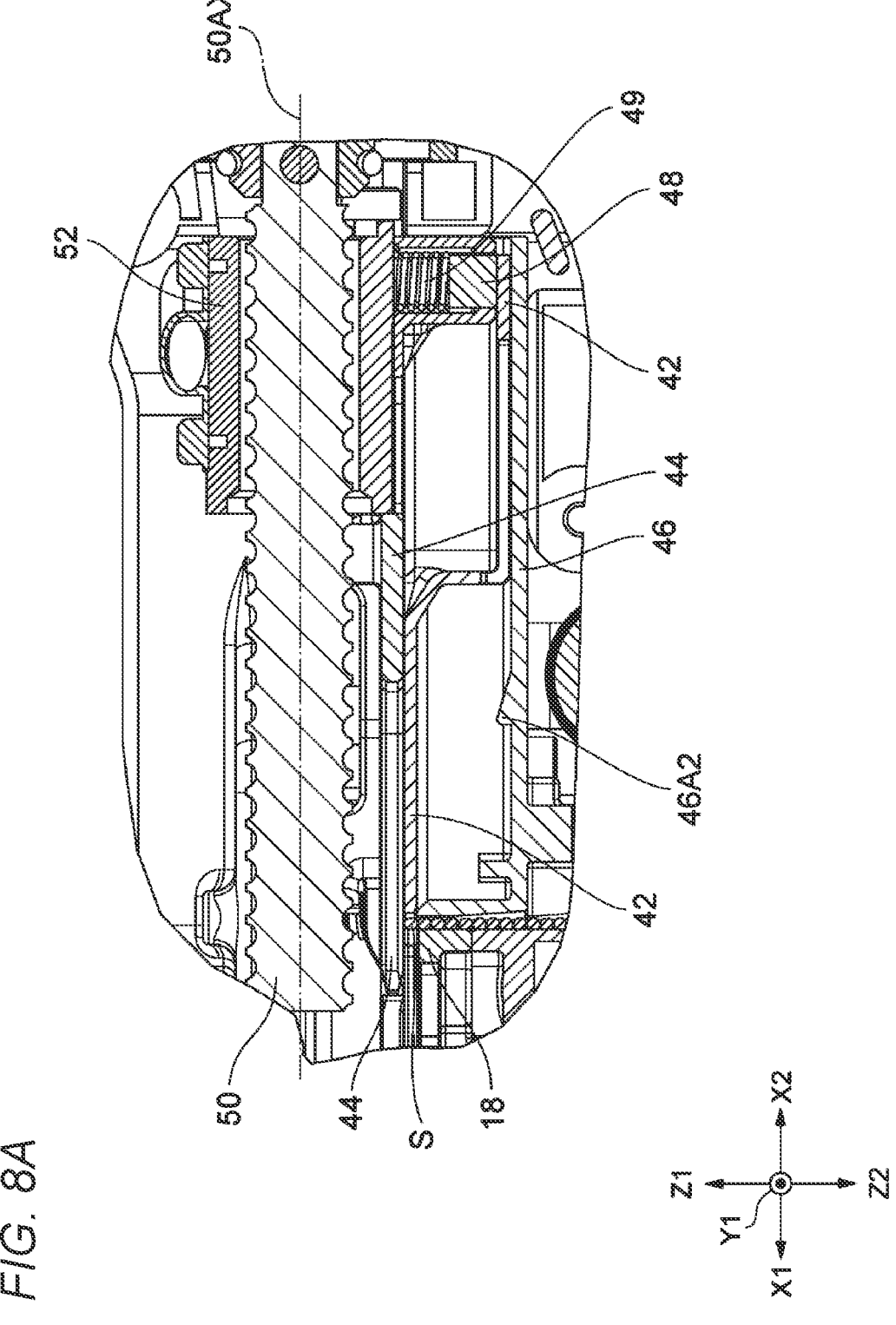
FIG. 8A is a partially enlarged view of a cross section of the binding machine according to the first embodiment in a side view.
Figure 8B:
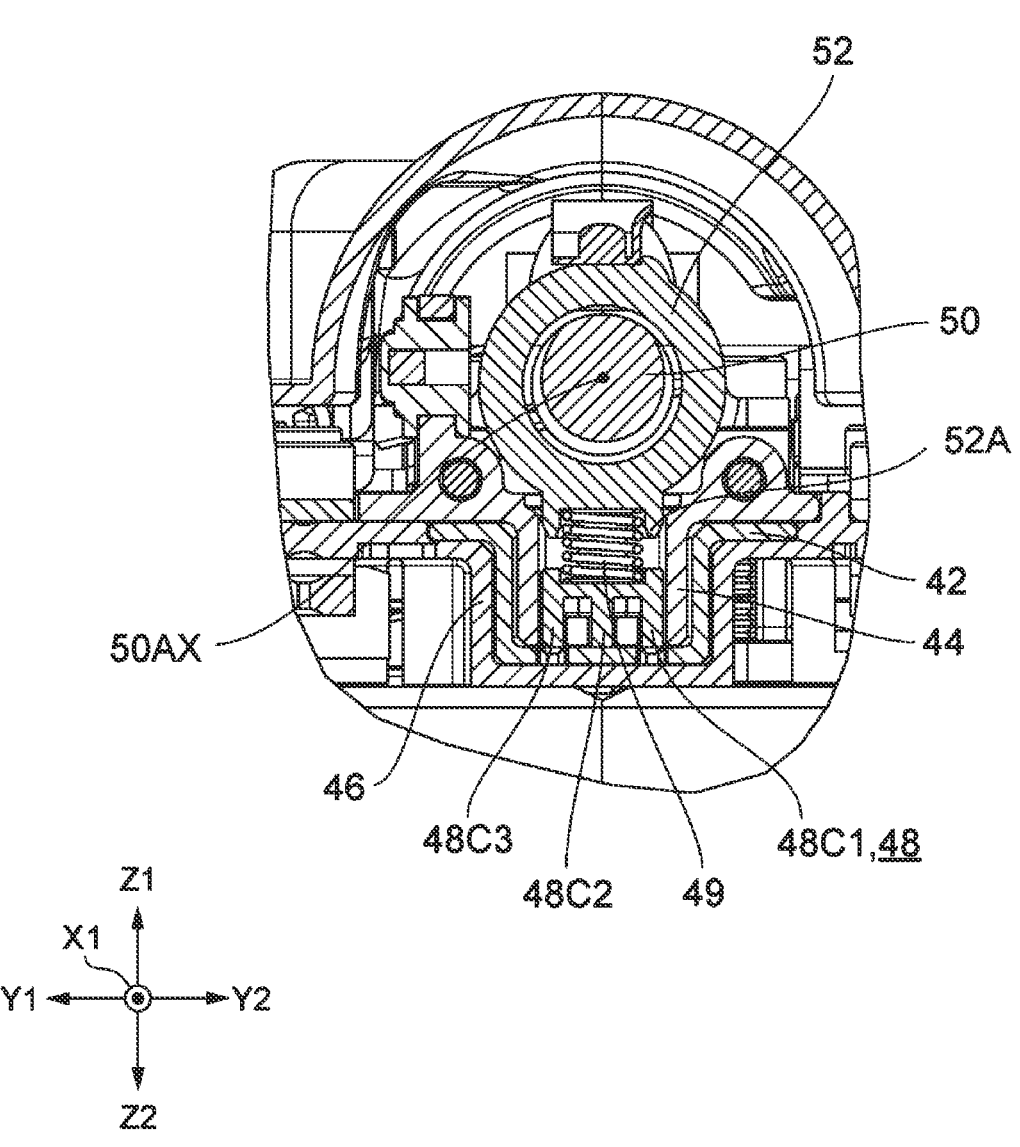
FIG. 8B is a partially enlarged view of a cross section of the binding machine according to the first embodiment in a rear view.

As illustrated in FIG. 4B and FIG. 8B, the driver 42 is guided to move in the front-rear direction by being fitted into a recessed portion provided in a base 46. Since an upper surface of the driver 42 is in contact with a bottom surface of the slider 44 fitted into the recessed portion provided in the base 46, the movement of the driver 42 toward the upward direction Z1 is restricted. In addition, since left and right side surfaces of the driver 42 are respectively in contact with left and right wall surfaces of the base 46 provided to extend in the front-rear direction, the leftward and rightward movement of the driver 42 is restricted. Further, the protruded portion 42C for driver formed at the rear end portion of the driver 42 and protruding in the downward direction Z2 is inserted into the recessed portion of the base 46. Left and right wall surfaces and a bottom surface of the protruded portion 42C for driver respectively face the wall surfaces and an upper surface of the base 46. According to the above configuration, the driver 42 is guided to move in the front-rear direction.

Three grooves are formed in a bottom portion of the protruded portion 42C for driver protruding toward the downward direction Z2. Specifically, a first groove 42G1 for moving toward the forward direction X1 by being pushed toward the forward direction X1 by a first claw portion 48C1 of a switching block 48 (an example of a "block") to be described later, a second groove 42G2 for moving toward the rearward direction X2 by being pushed toward the rearward direction X2 by a second claw portion 48C2, and a third groove 42G3 for moving toward the forward direction X1 by being pushed toward the forward direction X1 by a third claw portion 48C3 are formed. As illustrated in FIG. 4B and FIG. 8B, the first groove 42G1, the second groove 42G2, and the third groove 42G3 are provided to be parallel to one another and extend in the front-rear direction. In addition, front ends of the first groove 42G1 and the third groove 42G3 (groove side surfaces of the first groove 42G1 and the third groove 42G3 facing the rearward direction X2) are provided at the same position in the front-rear direction. In addition, a rear end of the second groove 42G2 (a groove side surface of the second groove 42G2 facing the forward direction X1) is provided in the rearward direction X2 with respect to the front ends of the first groove 42G1 and the third groove 42G3 (the groove side surfaces of the first groove 42G1 and the third groove 42G3 facing the rearward direction X2). On the other hand, the first groove 42G1 and the third groove 42G3 are provided to extend in the rearward direction X2 with respect to the rear end of the second groove 42G2.

As will be described later, a configuration is adopted in which the driver 42 is advanced by using two grooves, that is, the first groove 42G1 and the third groove 42G3 at the time of advance, the driver 42 is retracted by using one groove, that is, the second groove 42G2 at the time of retraction, and thus the driver 42 can suitably move in the forward direction X1 at the time of advance having a relatively high load. Further, in the top view, the second groove 42G2 is provided to overlap with a central axis of a ball screw 50, and the first groove 42G1 and the third groove 42G3 are provided to sandwich the second groove 42G2, and thus the driver 42 is configured to advance and retract in a well-balanced manner.

The driver 42 is placed on the base 46 of the binding machine 10 and is configured to move in the front-rear direction on the base 46. Therefore, a part of the upper surface of the base 46 is exposed in the upward direction Z1 by forming the first groove 42G1, the second groove 42G2, and the third groove 42G3.

The slider 44 of the binding machine 10 has a function of moving in the forward direction X1 and pushing the first displacement portion 20 and the second displacement portion 30 toward the forward direction X1 so as to displace the first leg portion S1 and the second leg portion S2 of the staple S, respectively. The slider 44 according to the present embodiment include the first front end portion 44A1 that pushes the first arm 22 of the first displacement portion 20 toward the forward direction X1 to rotate the first arm 22, and the second front end portion 44A2 that pushes the second arm 32 of the second displacement portion 30 toward the forward direction X1 to rotate the second arm 32.

Figure 7A:
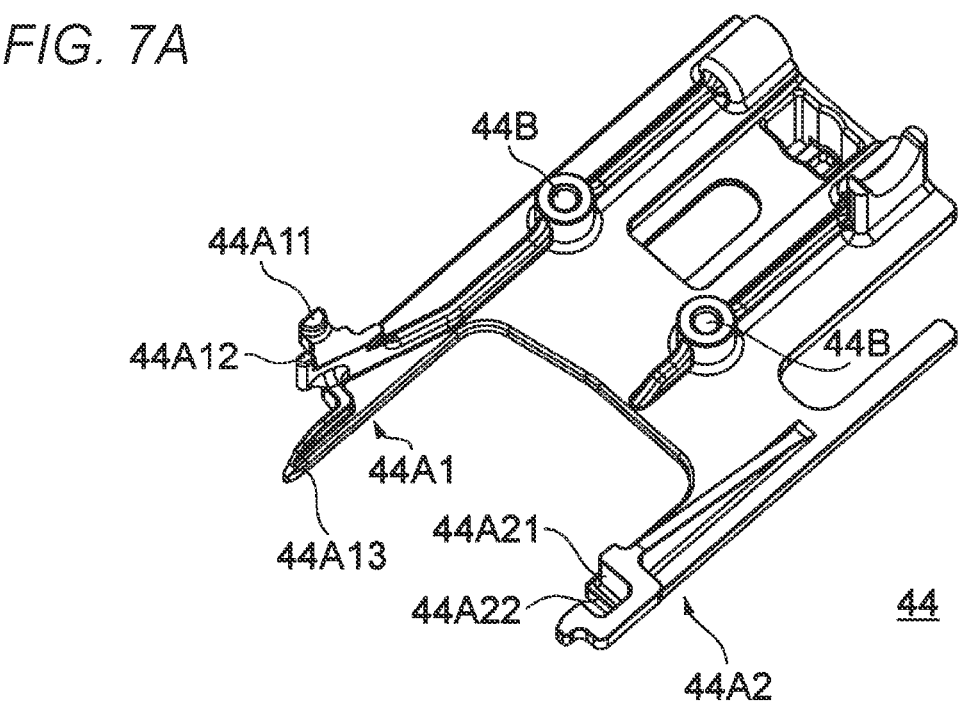
FIG. 7A is a perspective view of a slider according to the first embodiment.
Figure 7B:
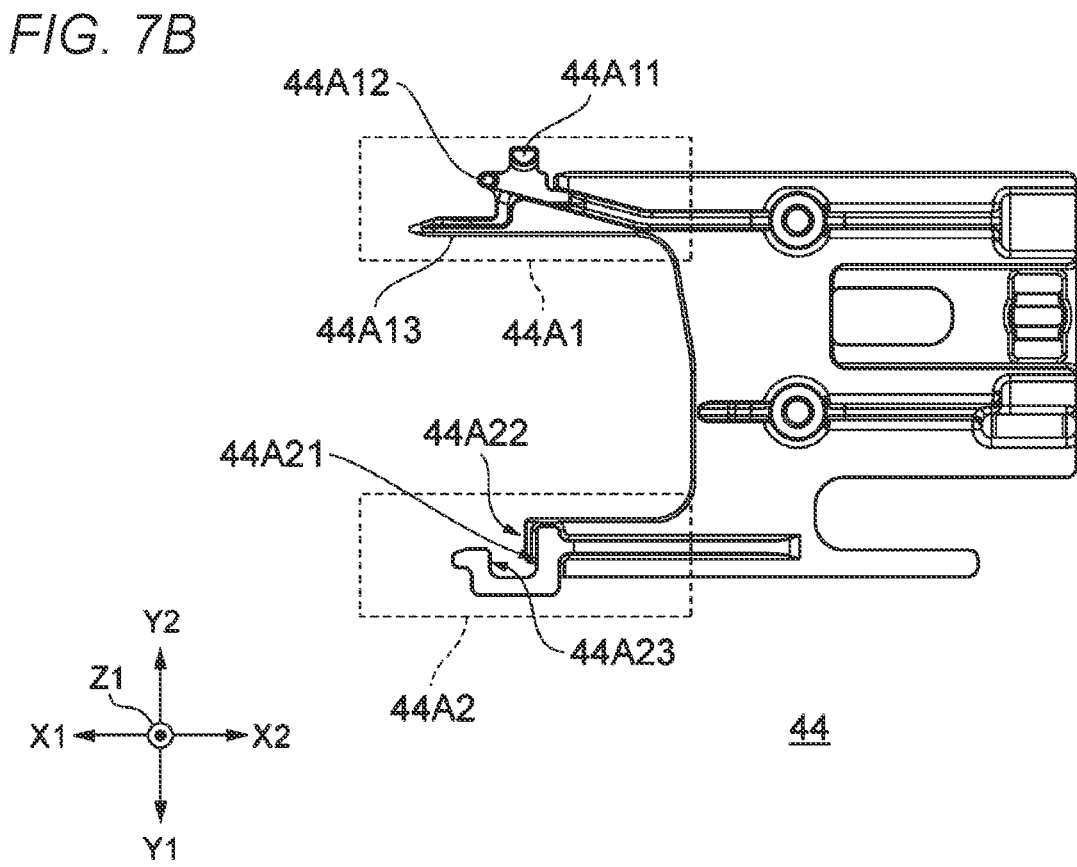
FIG. 7B is a plan view of the slider according to the first embodiment in the top view.

FIG. 7A is a perspective view of the slider 44 according to the present embodiment, and FIG. 7B is a plan view of the slider 44 in the top view. As illustrated in FIGS. 7A and 7B, the slider 44 is formed in a plate shape, and includes the first front end portion 44A1 that extends in the forward direction X1 on a left side on which the first leg portion S1 of the staple S is disposed, and the second front end portion 44A2 that is separated from the first front end portion 44A1 and extends in the forward direction X1 on a side on which the second leg portion S2 of the staple S is disposed.

The slider 44 further includes fixing portions 44B for being fixed to a nut part 52 to be described later by using bolts.

As illustrated in FIG. 4B, the slider 44 is guided to move in the front-rear direction by being fitted into the recessed portion provided in the base 46. An upper surface of the slider 44 comes into contact with the base 46 or a guide fixed to the housing so as to restrict the movement toward the upward direction Z1. Further, left and right side surfaces of the slider 44 come in contact with the left and right wall surfaces of the base 46 provided to extend in the front-rear direction so as to restrict the leftward and rightward movement. Further, the bottom surface of the slider 44 is supported by the upper surface of the base 46 and the upper surface of the driver 42. According to such a configuration, the slider 44 (and the driver 42 on which the slider 44 is stacked) is guided to move in the front-rear direction.

Configurations of the first front end portion 44A1 and the second front end portion 44A2 of the slider 44 will be described later.

The nut part 52 of the binding machine 10 (such as FIGS. 4A, 8A, and 8B) has a function of moving the driver 42 and the slider 44 in the forward direction X1 and the rearward direction X2. The nut part 52 according to the present embodiment is formed with a female screw that is screwed to a male screw of the ball screw 50 via a ball member (not shown). Therefore, the nut part 52 moves in the forward direction X1 when the ball screw: 50 rotates clockwise, and the nut part 52 moves in the rearward direction X2 when the ball screw 50 rotates counterclockwise. The nut part 52 is fixed to the slider 44. Further, as illustrated in FIG. 8A, a front end surface of the nut part 52 is in contact with a rear end surface of the slider 44. Therefore, the nut part 52 and the slider 44 are configured to integrally move in the forward direction X1 and the rearward direction X2 in a state where a rotational moment is restrained.

Further, the nut part 52 includes an annular holding portion 52A protruding in the downward direction Z2 in order to hold the switching block 48 (FIG. 8B) provided with the first claw portion 48C1, the second claw portion 48C2, and the third claw portion 48C3. The nut part 52 and the switching block 48 held by the nut part 52 are configured to integrally move in the forward direction X1 and the rearward direction X2. The holding portion 52A 30 holds the switching block 48 such that the first claw portion 48C1 can be inserted into the first groove 42G1, the second claw portion 48C2 can be inserted into the second groove 42G2, and the third claw portion 48C3 can be inserted into the third groove 42G3.

The nut part 52, the slider 44, and the driver 42 are configured to move in the forward direction X1 and the rearward direction X2, and thus the nut part 52, the slider 44, and the driver 42 may be referred to as movement portions.

Figure 9:
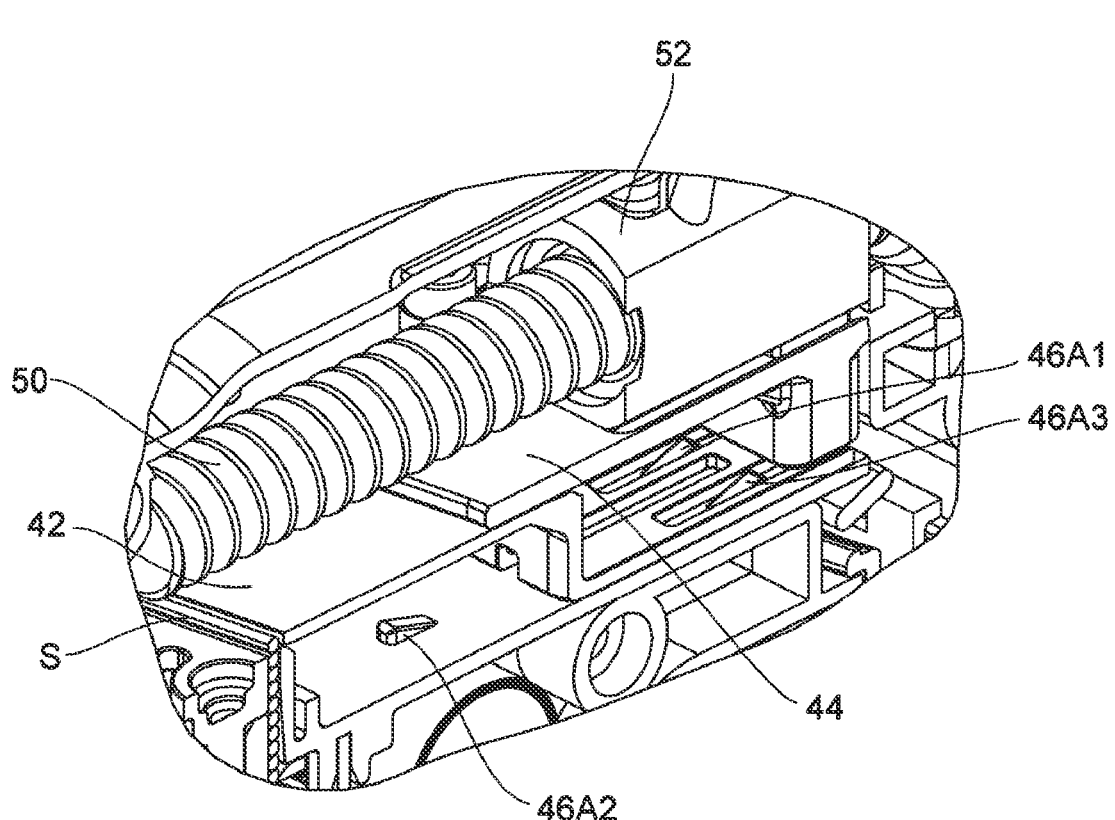
FIG. 9 is a partially enlarged view (a perspective sectional view) illustrating a nut part and the like of the binding machine according to the first embodiment.

FIG. 8A is a partially enlarged view obtained by cutting the binding machine 10 along a vertical cross section including the central axis 50AX of the ball screw 50 in a side view obtained by seeing the binding machine 10 from a side surface. FIG. 8B is a partially enlarged view obtained by cutting the binding machine 10 along a vertical cross section perpendicular to the central axis 50AX of the ball screw 50 in a rear view obtained by seeing the binding machine 10 from the rearward direction X2. FIG. 9 is a partially enlarged view illustrating the nut part 52 and the like in a perspective sectional view of the binding machine 10.

As illustrated in FIG. 8B, an elastic member 49 for generating an elastic force for pressing a bottom surface of the switching block 48 against the surface of the base 46 is inserted between the nut part 52 and the switching block 48. Accordingly, the switching block 48 is configured to move in the up-down direction, and a distance in the up-down direction between the nut part 52 and the switching block 48 varies according to a surface shape of the base 46 through which the switching block 48 passes.

In the present embodiment, the nut part 52 is configured to move in the forward direction X1 and the rearward direction X2 by a motor 54 and the ball screw 50.

The motor 54 (FIG. 4A) rotates the ball screw 50. The motor 54 is provided at a rear end portion of the binding machine 10. The binding machine 10 may include a battery that is detachably provided, and the motor 54 may be configured to be rotationally driven by a power source of the battery. The binding machine 10 according to the present embodiment further includes a speed reducer 55, and the motor 54 increases a torque by the speed reducer 55 to rotate the ball screw 50. In addition, a printed wiring board on which a CPU corresponding to a control device for controlling the motor 54 is mounted, is mounted on the rear end portion of the binding machine 10.

The ball screw 50 (FIGS. 4A, 8A, and 8B) is provided by extending a substantially central portion of the binding machine 10 in the front-rear direction. As described above, the ball screw 50 is formed with the male screw that is screwed to the female screw of the nut part 52 via the ball member (not shown).

The base 46 (FIGS. 4B, 8A, and 8B) supports the driver 42 and the slider 44. As illustrated in FIG. 4B, the base 46 includes a support surface that comes into contact with or faces the bottom surface of the driver 42 so as to support the driver 42 from the downward direction Z2, and a wall portion extending in the front-rear direction in order to come into contact with or face a left side surface of the driver 42 so as to support the driver 42 from the leftward direction Y2. Further, the base 46 includes a wall portion extending in the front-rear direction in order to come into contact with or face a right end of the driver 42 so as to support the driver 42 from the rightward direction Y1. According to such a configuration, the base 46 guides the driver 42 to move in the front-rear direction.

Further, the base 46 includes a support surface that comes into contact with or faces the bottom surface of the slider 44 placed on the driver 42 so as to support the slider 44 from the downward direction Z2, and a wall portion extending in the front-rear direction in order to come into contact with or face a left end of the slider 44 so as to support the slider 44 from the leftward direction Y2. Further, the base 46 includes a wall portion extending in the front-rear direction in order to come in contact with or face a right end of the slider 44 so as to support the slider 44 from the rightward direction Y1. According to such a configuration, the base 46 guides the slider 44 to move in the front-rear direction.

As illustrated in FIG. 9, the base 46 is formed with a first protrusion 46A1 provided with a taper that protrudes in the upward direction Z1 as advancing in the rearward direction X2, a second protrusion 46A2 provided with a taper that protrudes in the upward direction Z1 as advancing in the forward direction X1, and a third protrusion 46A3 provided with a taper that protrudes in the upward direction Z1 as advancing in the rearward direction X2.

The first protrusion 46A1 is provided on a path of the first claw portion 48C1 (inside the first groove 42G1) when the driver 42 moves in the rearward direction X2.

The second protrusion 46A2 is provided on a path of the second claw portion 48C2 (inside the second groove 42G2) when the driver 42 moves in the forward direction X1.

The third protrusion 46A3 is provided on a path of the third claw portion 48C3 (inside the third groove 42G3) when the driver 42 moves in the rearward direction X2.

Each of the first protrusion 46A1 to the third protrusion 46A3 is preferably formed to have the same height as the driver 42 (a plate thickness of the driver 42) or be higher than the driver 42.

The first protrusion 46A1 and the third protrusion 46A3 are provided at the same position in the front-rear direction. The second protrusion 46A2 is provided in the forward direction X1 with respect to the first protrusion 46A1 and the third protrusion 46A3.

According to the above configuration, when the motor 54 rotates the ball screw 50 clockwise, the nut part 52, the slider 44 fixed to the nut part 52, and the switching block 48 held by the nut part 52 move together in the forward direction X1. Further, since the first claw portion 48C1, the second claw portion 48C2, and the third claw portion 48C3 of the switching block 48 are respectively inserted into the first groove 42G1, the second groove 42G2, and the third groove 42G3, a front surface of the first claw portion 48C1 and a front surface of the third claw portion 48C3 respectively come into contact with a side surface of the first groove 42G1 facing the rearward direction X2 and a side surface of the third groove 42G3 facing the rearward direction X2. Therefore, the switching block 48 pressed against the surface of the base 46 by the elastic member 49 moves the driver 42 in the forward direction X1 by the front surface of the first claw portion 48C1 and the front surface of the third claw portion 48C3 while pressing the surface of the base 46 in the downward direction Z2. As a result, the driver 42 and the slider 44 move together in the forward direction X1. A moving operation in which the driver 42 and the slider 44 move together in the forward direction X1 is referred to as a first moving operation.

Thereafter, when the switching block 48 advances to a position where the second protrusion 46A2 is provided, the second claw portion 48C2 moves in the upward direction Z1 along an inclined surface of the second protrusion 46A2. Therefore, the switching block 48 moves in the upward direction Z1 while moving in the forward direction X1. As a result, the front surface of the first claw portion 48C1 and the front surface of the third claw portion 48C3 move in the upward direction Z1 with respect to the side surface of the first groove 42G1 and the side surface of the third groove 42G3 that are in contact with the front surface of the first claw portion 48C1 and the front surface of the third claw portion 48C3, respectively. Accordingly, the switching block 48 moves on the driver 42, and the driver 42 stops moving in the forward direction X1. At this time, the first moving operation ends.

After the first moving operation ends, when the motor 54 further rotates the ball screw: 50 clockwise, the switching block 48 moves on the driver 42 in the forward direction X1. At this time, of the slider 44 and the driver 42, only the slider 44 moves in the forward direction X1. A moving operation in which only the slider 44 of the driver 42 and the slider 44 moves in the forward direction X1 is referred to as a second moving operation. When the slider 44 advances by a predetermined amount with respect to the driver 42, the motor

54 stops the clockwise rotation of the ball screw 50. At this time, the second moving operation ends.

During the second moving operation, there is a possibility that the driver 42 advances by the friction with the switching block 48 and the driver 42. Therefore, the binding machine 10 may include a stopper for stopping the advance of the driver 42 during the second moving operation. For example, by adopting a configuration in which an opening hole is formed on the base 46, the stopper such as a ball biased in the upward direction Z1 from the opening hole is exposed, and on the other hand, a recess into which the ball is inserted is provided on the bottom surface of the driver 42, and the stopper and the recessed portion are engaged with each other at a position where the first moving operation ends and the movement of the driver 42 toward the forward direction X1 is to be stopped, it is possible to restrain the advance and retraction of the driver 42 during the second moving operation.

As will be described later, in the first moving operation, by pushing the staple S positioned at the upper end in the forward direction X1 by using the driver 42 moving in the forward direction X1, it is possible to move the staple S positioned at the upper end in the forward direction X1 and separate the staple S from the another staple S. Further, in the first moving operation, by bringing the tip end portion S1A of the first leg portion S1 into contact with the first outer wall portion 62 while moving the staple S positioned at the upper end in the forward direction X1 by using the driver 42 moving in the forward direction X1, it is possible to displace (plastically deform) the first leg portion S1 such that the bending angle α1 formed by the tip end portion S1A of the first leg portion S1 and the first portion S1B of the first leg portion S1 is further reduced.

Further, in the second moving operation, the driver 42 stops the movement toward the forward direction X1, and thus the staple S pushed by the driver 42 also stops the movement toward the forward direction X1. Accordingly, in a state where the staple S is stopped, by causing the slider 44 to advance in the second moving operation, it is possible to push the second arm 32 of the second displacement portion 30 in the forward direction X1 by the second front end portion 44A2 of the slider 44 so as to rotate, and displace the second leg portion S2 of the staple S so as to be surrounded by the first leg portion S1, the second leg portion S2, and the main body portion S3 and be engaged with the first object G. Further, in the state where the staple S is stopped, by rotating the first arm 22 of the first displacement portion 20 by the first front end portion 44A1 of the slider 44, it is possible to displace the first leg portion S1 of the staple S so as to be engaged with the first object G.

The binding machine 10 may further include a Hall sensor or other sensor for obtaining a rotation amount of the motor 54 in order to control movement amounts of the driver 42 and the slider 44. In addition, the binding machine 10 may further include a magnet attached to the nut part 52 in order to detect and control a position of the nut part 52 in the front-rear direction, and a Hall sensor or other sensor for obtaining a position of the magnet attached to the nut part 52.

After a binding operation ends, when the motor 54 rotates the ball screw 50 counterclockwise, the nut part 52, the slider 44 fixed to the nut part 52, and the switching block 48 held by the nut part 52 move together in the rearward direction X2. At this time, the switching block 48 moves on the stopped driver 42 in the rearward direction X2.

Further, when the motor 54 rotates the ball screw 50 counterclockwise, the second claw portion 48C2 of the switching block 48 moves in the downward direction Z2 while moving in the rearward direction X2 along the inclined surface of the second protrusion 46A2 provided on the base 46, and thus the first claw portion 48C1, the second claw portion 48C2. and the third claw portion 48C3 of the switching block 48 are respectively inserted into regions inside the first groove 42G1, the second groove 42G2, and the third groove 42G3. In addition, when the motor 54 rotates the ball screw 50 counterclockwise, the switching block 48 moves in the rearward direction X2, and a rear surface of the second claw portion 48C2 of the switching block 48 comes into contact with a side surface of the second groove 42G2 facing the forward direction X1. Therefore, the switching block 48 moves the driver 42 in the rearward direction X2 by the rear surface of the second claw portion 48C2 while pressing the surface of the base 46 in the downward direction Z2 by the elastic member 49. At this time, the nut part 52, the slider 44, the switching block 48, and the driver 42 move together in the rearward direction X2.

Further, when the motor 54 rotates the ball screw 50 counterclockwise and the switching block 48 retracts to the position where the first protrusion 46A1 and the third protrusion 46A3 are provided, the first claw portion 48C1 and the third claw portion 48C3 of the switching block 48 respectively move in the upward direction Z1 along inclined surfaces of the first protrusion 46A1 and the third protrusion 46A3. Therefore, the switching block 48 moves in the upward direction Z1 while moving in the rearward direction X2. As a result, the rear surface of the second claw portion 48C2 moves in the upward direction Z1 with respect to the side surface of the second groove 42G2 that is in contact with the rear surface of the second claw portion 48C2. Accordingly, the switching block 48 moves on the driver 42, and the driver 42 stops moving in the rearward direction X2. In order to restrict the movement of the driver 42 toward the rearward direction X2, the binding machine 10 may include a stopper having the above configuration or other configurations.

Thereafter, when the motor 54 further rotates the ball screw 50 counterclockwise, the switching block 48 moves on the driver 42 in the rearward direction X2. At this time, of the driver 42 and the slider 44, only the slider 44 moves in the rearward direction X2. When the slider 44 retracts by a predetermined amount with respect to the driver 42, the motor 54 stops the counterclockwise rotation of the ball screw 50.

Thereafter, when the motor 54 rotates the ball screw 50 clockwise, the nut part 52, the slider 44 fixed to the nut part 52, and the switching block 48 held by the nut part 52 move together in the forward direction X1. Since the nut part 52, the slider 44, and the switching block 48 are moved together in the forward direction X1 to a position where the first claw portion 48C1 and the third claw portion 48C3 of the switching block 48 respectively come into contact with or approach close to a side surface of a front end of the first groove 42G1 and a side surface of a front end of the third groove 42G3, and thereafter, it is possible to shift to the first moving operation.

According to the above configuration, the binding machine 10 is configured to execute the first moving operation in which the driver 42 and the slider 44 advance together, and the second moving operation in which only the slider 44 of the driver 42 and the slider 44 further move in the forward direction X1.

A position of the nut part 52 in an initial state is not limited. For example, the binding machine 10 may have a configuration in which only the slider 44 moves in the forward direction immediately after startup from the initial state, and then the first moving operation which the driver 42 and the slider 44 start is executed.

[Feeding-Bending Mechanism of Detachment Portion]

The detachment portion includes a support wall that supports the staple S in the movement path of the staple S separated by the driver 42 and moving in the forward direction X1 and during the displacement by the first displacement portion 20 and the second displacement portion 30.

Figure 10:
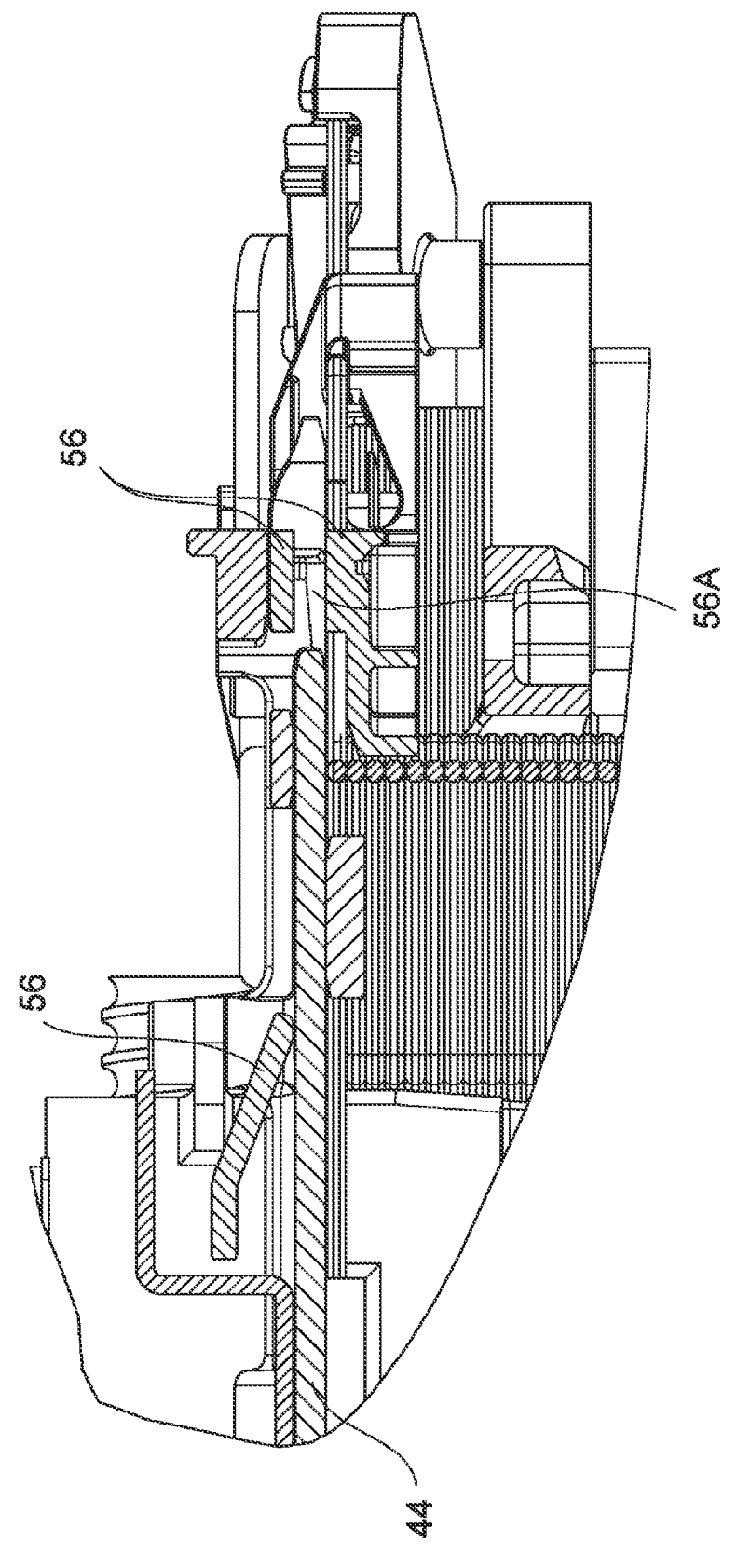
FIG. 10 is a sectional view illustrating a detachment portion and the like of the binding machine according to the first embodiment.

As illustrated in FIG. 10, the detachment portion 56 is provided to vertically move with the movement of the slider 44. A gap 56A in which a part of the slider 44 enters with the movement of the slider 44 is formed in the detachment portion 56. Since a part of the slider 44 enters the gap 56A of the detachment portion 56, a vertical position of the detachment portion 56 can be stabilized, and the deformation of the staple S can be reliably performed.

Figure 11A:
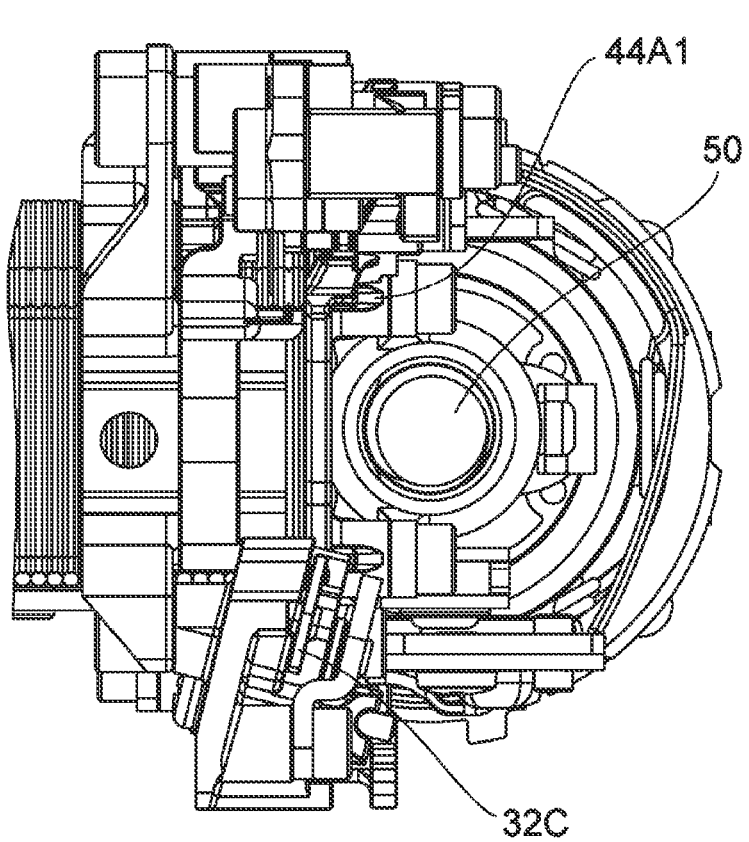
FIG. 11A is a partially enlarged view illustrating an initial state of the binding machine according to the first embodiment in the front view.
Figure 11A:
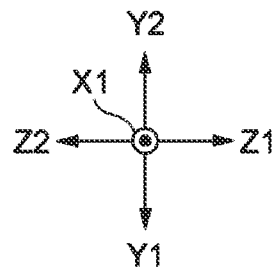
Figure 11B:
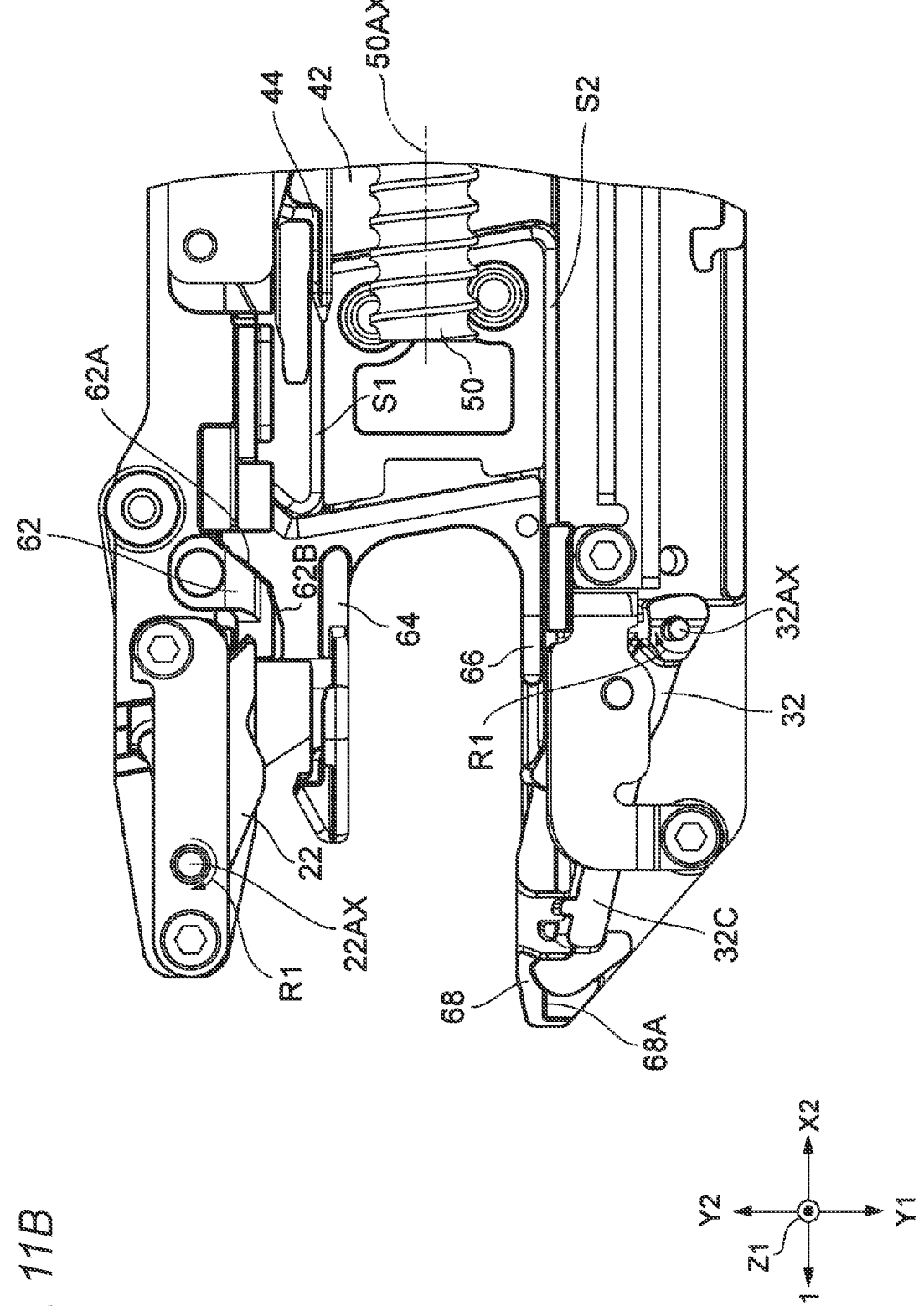
FIG. 11B is a partially enlarged view illustrating the initial state of the binding machine according to the first embodiment in the top view.

FIGS. 11A and 11B are partially enlarged views illustrating the front end portion of the binding machine 10 in the initial state (a standby state) in the front view and the top view; respectively.

When the staple S moves in the forward direction X1 by the driver 42, the tip end portion S1A of the first leg portion S1 passes through the first outer wall portion 62 while being in contact therewith, and thus the first outer wall portion 62 executes plastic deformation so as to further reduce the bending angle α1 formed by the tip end portion S1A of the first leg portion S1 and the first portion S1B of the first leg portion S1 (a portion connected to the tip end portion S1A of the first leg portion S1).

Accordingly, the first outer wall portion 62 is provided at a position where only a part of the tip end portion S1A of the first leg portion S1 of the staple S is in contact with the first outer wall portion 62.

The first inner wall portion 64 is provided inside the first leg portion S1 to support the first leg portion S1 from the inside when the first leg portion S1 of the staple S moves in the forward direction X1 by the driver 42 and when the first leg portion S1 is displaced. The first inner wall portion 64 includes a bottom surface provided along a movement path of the first leg portion S1, and a wall surface provided substantially parallel to the front-rear direction, which is a movement direction of the first leg portion S1, and supporting the first leg portion S1 from the inside.

On the other hand, the first outer wall portion 62 is provided to include a wall surface inclined such that a gap with the wall surface of the first inner wall portion 64 becomes small toward the forward direction X1. According to such a configuration, it is possible to displace the tip end portion such that the bending angle α1 becomes small as the tip end portion S1A of the first leg portion S1 advances in the forward direction X1.

Further, the first outer wall portion 62 according to the present embodiment at least includes a first region 62A (FIG. 11B) where a wall surface in which a gap with the wall surface of the first inner wall portion 64 is relatively largely reduced is formed, and a second region 62B (FIG. 11B) provided in the forward direction X1 with respect to the first region 62A, and in the second region 62B, a wall surface in which a gap with the wall surface of the first inner wall portion 64 is slightly reduced is formed.

When an average reduction rate of the gap (a distance in a left-right direction perpendicular to the forward direction X1) between the wall surface of the first outer wall portion 62 and the wall surface of the first inner wall portion 64 in the first region 62A is set to a first reduction rate, and an average reduction rate of the gap (the distance in the left-right direction perpendicular to the forward direction X1) between the wall surface of the first outer wall portion 62 and the wall surface of the first inner wall portion 64 in the second region 62B is set to a second reduction rate, an absolute value of the first reduction rate is larger than an absolute value of the second reduction rate. In other words, an angle formed by the front-rear direction in the top view and the wall surface of the first region 62A of the first outer wall portion 62 is larger than an angle formed by the front-rear direction in the top view and the wall surface of the second region 62B of the first outer wall portion 62.

As the bending angle α1 of the bent portion decreases, the elastic force repelling the displacement becomes smaller, and thus it is possible to smoothly bend the tip end portion S1A of the first leg portion S1 by the above configuration.

The wall surface with which the first leg portion S1 does not come into contact is not limited to the above configuration. For example, the first inner wall portion 64 may be provided to restrict the displacement of the first portion S1B in the upward direction Z1 by providing a wall surface provided to protrude an upper portion of the first inner wall portion 64 in the outward direction and face an upper surface of the first portion S1B.

Further, the first inner wall portion 64 is formed with a through hole for allowing the tip end portion S1A and the contact member 24 to pass through the downward direction Z2 with respect to the first portion S1B (FIG. 5).

[Support Wall of Detachment Portion]

The detachment portion further includes a second inner wall portion 66 having a wall surface that is provided inside the second leg portion S2 to support the second leg portion S2 from the inside when the second leg portion S2 is displaced. The second inner wall portion 66 further includes a bottom surface provided substantially parallel to the front-rear direction along a movement path of the second leg portion S2.

A front end of the second inner wall portion 66 functions as a fulcrum when the second leg portion S2 is bent. Therefore, the front end of the second inner wall portion 66 is provided at a position by the second distance DS2 from the tip end of the second leg portion S2, which is a bent portion of the second leg portion S2. Since the second leg portion S2 needs to have a distance for closing the opening, the front end of the second inner wall portion 66 needs to be provided at a position separated by a distance equal to or larger than the width of the opening of the staple S from the tip end of the second leg portion S2. The tip end portion S2A of the second leg portion S2 is supported by a tip end supporting portion 68. The width of the opening of the staple S corresponds to a width between the wall surface of the first inner wall portion 64 and the wall surface of the second inner wall portion 66. Therefore, the second inner wall portion 66 is provided such that a distance between the tip end supporting portion 68 (a surface thereof facing the tip end of the second leg portion S2) and the front end of the second inner wall portion 66 is larger than the width between the wall surface of the first inner wall portion 64 and the wall surface of the second inner wall portion 66, which corresponds to the width of the opening of the staple S.

The second displacement portion 30 further includes the tip end supporting portion 68 that supports the tip end portion S2A of the second leg portion S2. The tip end supporting portion 68 includes the support wall portion 68A that has a wall surface provided inside the second leg portion S2 and supporting the tip end portion S2A from the inside.

[First Displacement Portion]

The first displacement portion 20 has a function of displacing the first leg portion S1 so as to be engageable with the first object G.

The first displacement portion 20 according to the present embodiment includes the first arm 22 that rotates by being pushed by the first front end portion 44A1 of the slider 44, and the contact member 24 (the claw member) that bends the tip end portion S1A of the first leg portion S1 to plastically deform by moving toward the inward direction of the staple S while being in contact with the tip end portion S1A of the first leg portion S1 as the first arm 22 rotates.

First, a configuration of the first front end portion 44A1 of the slider 44 will be described.

As illustrated in FIGS. 7A and 7B, the first front end portion 44A1 of the slider 44 is provided to extend in the forward direction X1 at an end portion of the slider 44 in the leftward direction Y2. The first front end portion 44A1 includes a first protruded portion 44A11 that protrudes in the upward direction Z1 in order to rotate the first arm 22 in the first rotation direction R1 by coming into contact with the first arm 22 at the time of the movement in the forward direction X1, and a second protruded portion 44A12 that rotates the first arm 22 in the second rotation direction R2 opposite to the first rotation direction R1 by coming into contact with the first arm 22 at the time of the movement in the rearward direction X2.

The first protruded portion 44A11 is provided in the rearward direction X2 with respect to the second protruded portion 44A12. Further, the first protruded portion 44A11 is provided outside (in the leftward direction Y2) with respect to the second protruded portion 44A12. According to such a configuration, since a distance between the rotation shaft of the first arm 22 and the first protruded portion 44A11 can be set to be larger than a distance between the rotation shaft of the first arm 22 and the second protruded portion 44A12, it is possible to generate a large rotation torque at the time of advance having a high load.

The first front end portion 44A1 of the slider 44 further includes a protruding end portion 44A13 extending in the forward direction X1. The protruding end portion 44A13 restrains the bending of the first portion S1B by pressing the first portion S1B connected to the tip end portion S1A of the first leg portion S1 from the upward direction Z1 at the time of the plastic deformation of the tip end portion S1A of the first leg portion S1.

Next, the first arm 22 of the first displacement portion 20 will be described. The first arm 22 is a member that rotates in a first rotation direction R1 by being pushed in the forward direction X1 by the first front end portion 44A1 of the slider 44, and translates the contact member 24 in the inward direction.

Figure 12A:
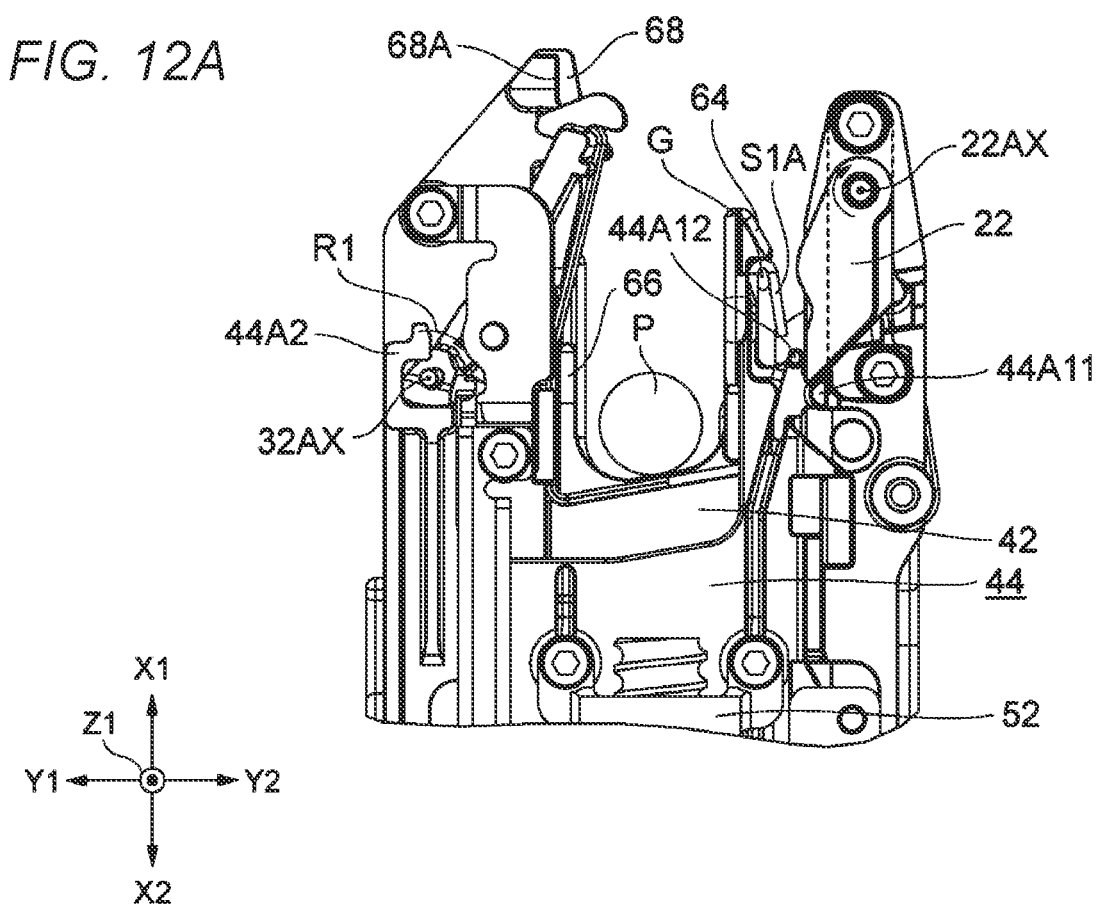
FIG. 12A is a partially enlarged view illustrating a plastic deformation start time of the binding machine according to the first embodiment in the top view.
Figure 12B:
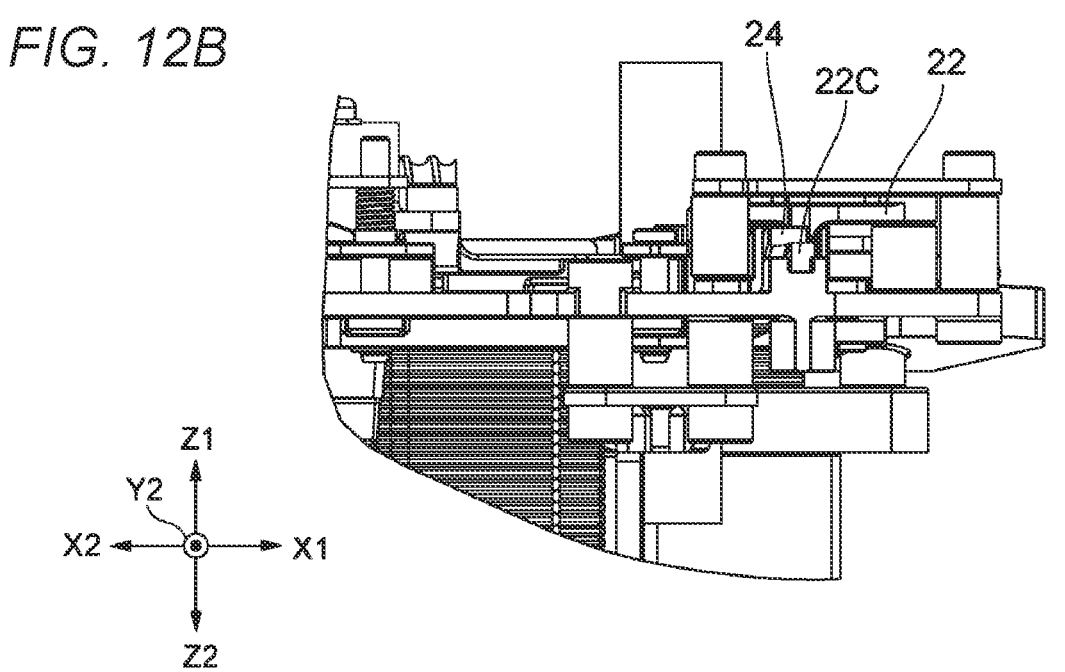
FIG. 12B is a partially enlarged view illustrating the plastic deformation start time of the binding machine according to the first embodiment in a side view.
Figure 12C:
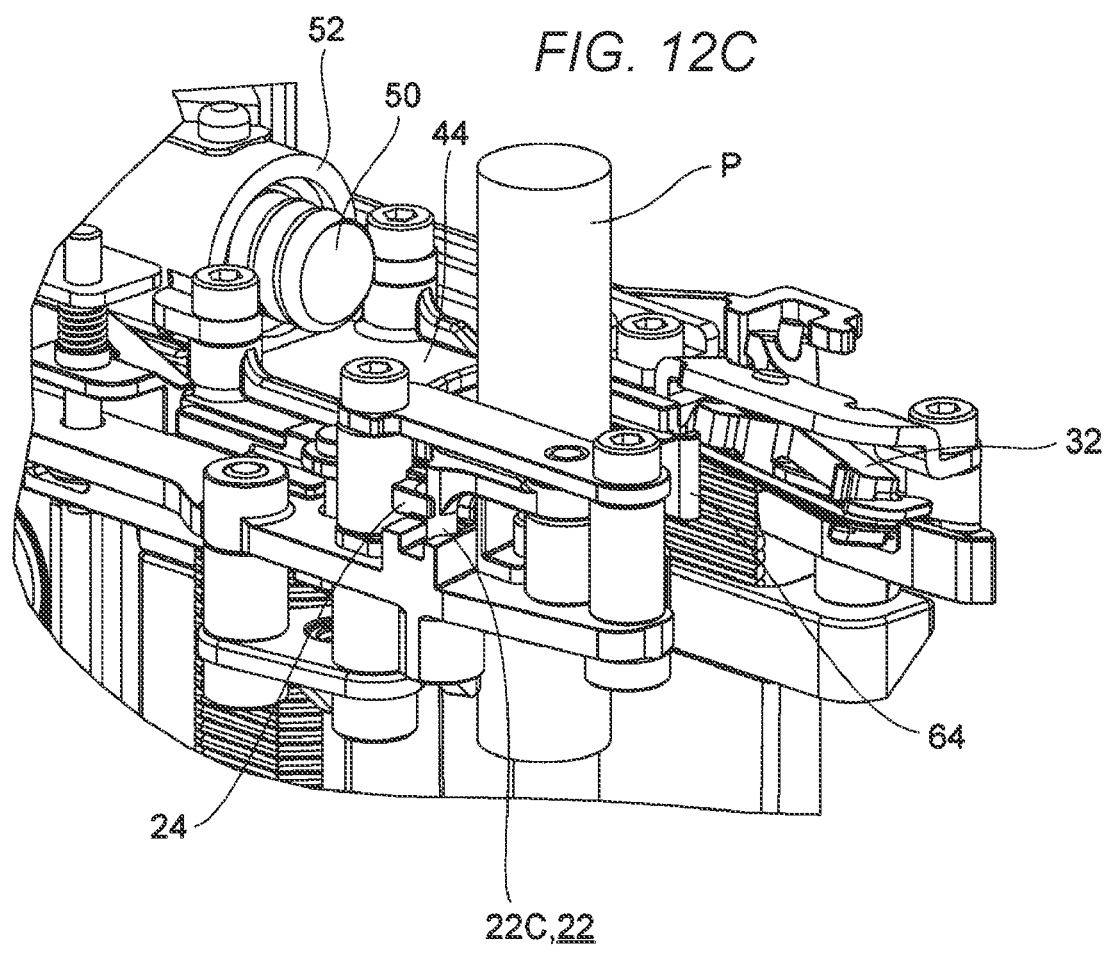
FIG. 12C is a partially enlarged perspective view illustrating a front end portion of the binding machine according to the first embodiment.

FIG. 12A is a partially enlarged view illustrating the front end portion of the binding machine 10 during a plastic deformation start time by the first displacement portion 20 in the top view; and FIG. 12B is a partially enlarged view of a cross section of the first displacement portion 20 in a left side view; and FIG. 12C is an enlarged perspective view of the front end portion of the binding machine 10. However, for the sake of convenience, parts unnecessary for the description are omitted in FIGS. 12A to 12C.

As illustrated in FIG. 12A and the like, a rotation shaft 22AX of the first arm 22 is provided in the outward direction (in the rightward direction Y1) of the first leg portion S1 of the staple S and in the forward direction X1. Further, the rotation shaft 22AX of the first arm 22 is provided perpendicular to the front-rear direction so as to extend in the up-down direction. The first arm 22 further has a portion that is provided to extend from the rotation shaft 22AX toward the rearward direction X2 at the time of standby, and includes, at a rear end of this portion, a wall portion that protrudes in the downward direction Z2 and extends to be inclined toward the rearward direction X2 and the inward direction. A surface of the wall portion facing the rearward direction X2 faces the rearward direction X2 and the outward direction in the initial state, and a surface of the wall portion facing the forward direction X1 faces the forward direction X1 and the inward direction. The surface of the wall portion facing the rearward direction X2 includes a surface in contact with the advancing first protruded portion 44A11. The wall portion moves to penetrate through a region between the first protruded portion 44A11 and the second protruded portion 44A12 while rotating in the first rotation direction R1 by being in contact with the first protruded portion 44A11. In addition, the surface of the wall portion facing in the forward direction X1 includes a surface in contact with the retracting second protruded portion 44A12. Accordingly, the wall portion is configured to return to an original position while rotating in the second rotation direction R2 opposite to the first rotation direction R1 by being in contact with the second protruded portion 44A12.

As illustrated in FIG. 12C, a protruded portion 22C protruding in the downward direction Z2 is further provided at the rear end portion of the first arm 22. The protruded portion 22C is engaged with a recessed portion 24A provided at an end portion of the contact member 24. Since the protruded portion 22C rotates in the first rotation direction R1 around the rotation shaft 22AX of the first arm 22, the contact member 24 is configured to advance toward the inward direction of the staple S.

Figure 13:
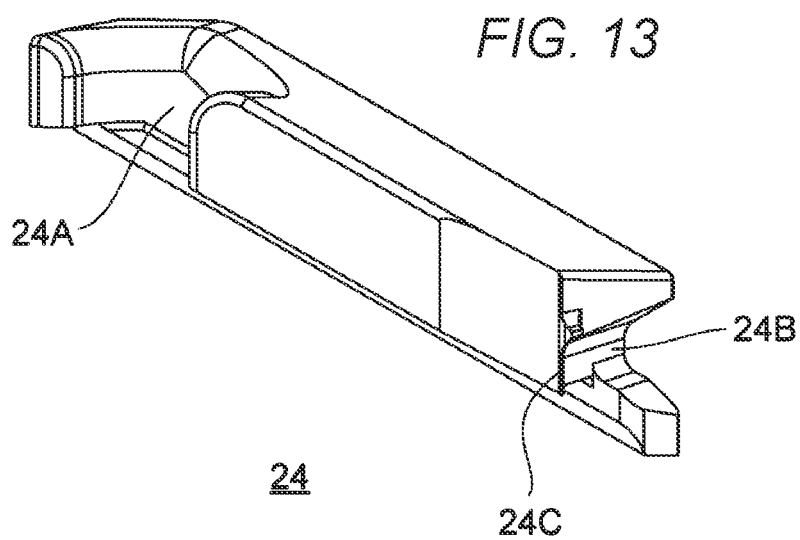
FIG. 13 is a perspective view of a contact member 24 (a claw member) according to the first embodiment.

FIG. 13 is a perspective view of the contact member 24 (the claw member). The contact member 24 has a function of plastically deforming the tip end portion S1A of the first leg portion S1 of the staple S by being pressed by the first arm 22 and advancing in a direction inclined toward the inward direction of the staple S and the downward direction Z2. By the contact member 24, the tip end portion S1A of the first leg portion S1 is bent such that the tip end portion S1A intersects the first portion S1B connected to the tip end portion S1A of the first leg portion S1 in the top view; and the tip end advances in the downward direction Z2 separated from the plane PL penetrating through the first leg portion S1, the second leg portion S2, and the main body portion S3 before the binding. By plastically deforming the tip end portion S1A of the first leg portion S1 in the inward direction and the downward direction Z2 in a state of sandwiching the first object G, the tip end portion S1A of the first leg portion S1 can sandwich the first object G without interfering with the first portion S1B.

As illustrated in FIG. 13, at a tail end of the contact member 24, the recessed portion 24A that is engaged with the protruded portion 22C of the first arm 22 protruding in the downward direction Z2 is provided. When the protruded portion 22C of the first arm 22 rotates in the first rotation direction R1, a side surface of the recessed portion 24A comes into contact with the protruded portion 22C, and the contact member 24 advances in the direction inclined toward the inward direction and the downward direction Z2, when the protruded portion 22C rotates in the second rotation direction R2, another side surface of the recessed portion 24A comes into contact with the protruded portion 22C, and the contact member 24 returns in a direction inclined toward the upward direction Z1 and the outward direction.

A tip end of the contact member 24 includes a contact surface 24B that comes into contact to grip the tip end portion, and a corner portion 24C that is provided at a connection portion between the contact surface 24B and a side surface and applies a stress for plastically deforming the tip end portion. Here, the contact surface 24B is formed to be recessed to conform to a shape of the cross section of the staple S. Further, the contact surface 24B is formed to be inclined so as to come in contact with the tip end portion S1A prior to the corner portion 24C. According to such a configuration, after the tip end portion S1A is taken in by the contact surface 24B to be gripped, the tip end portion S1A can be plastically deformed by the corner portion 24C, and thus it is possible to stabilize the position of the tip end portion S1A plastically deformed by the corner portion 24C.

Figure 14:
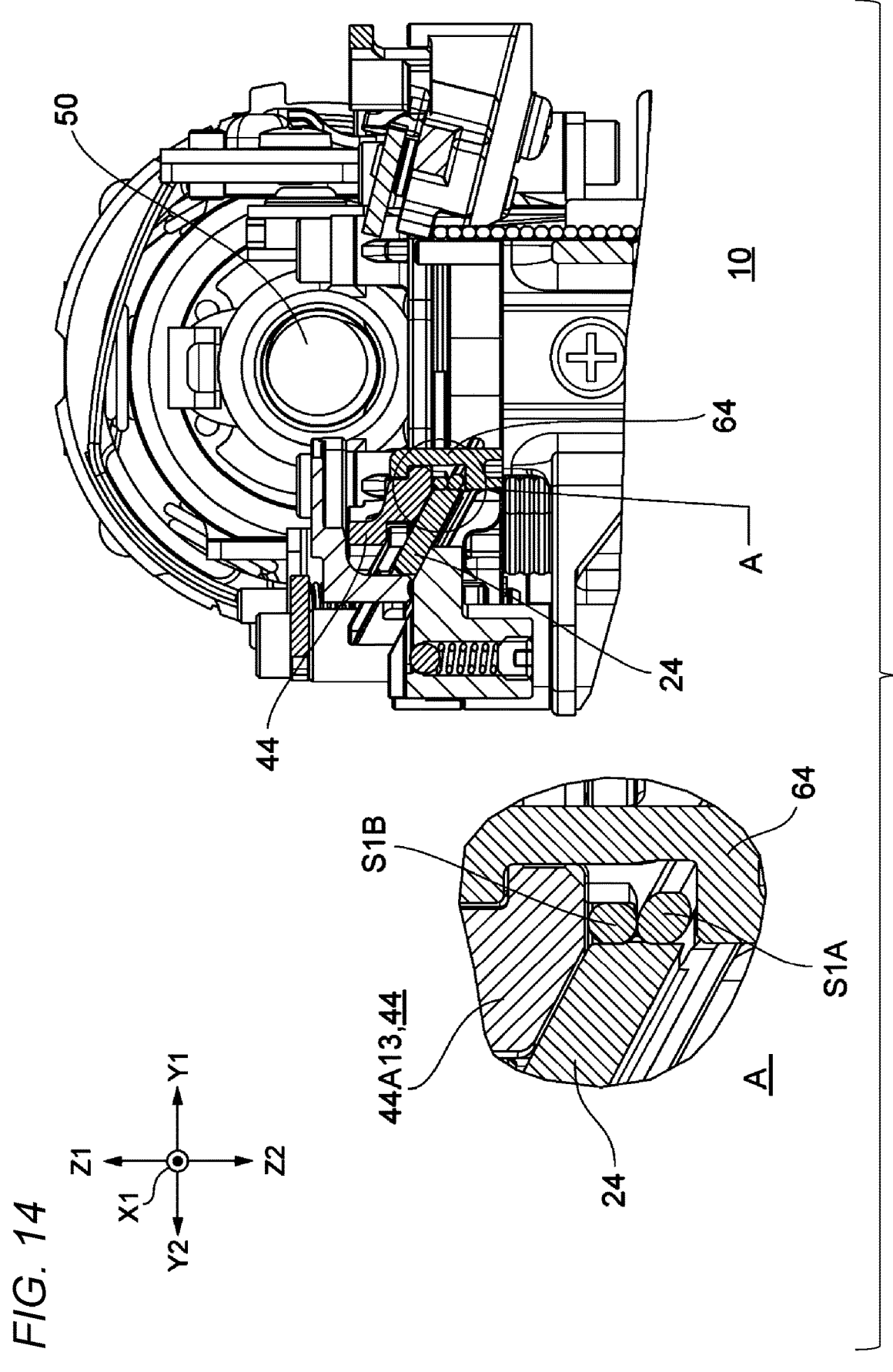
FIG. 14 is a sectional view in the front view during plastic deformation by the contact member 24 (the claw member) according to the first embodiment.

FIG. 14 is a sectional view of the tip end portion S1A after the plastic deformation by the contact member 24 in the front view; and is an enlarged view of a region A in this cross section. As illustrated in FIG. 14, the contact member 24 is placed on an inclined surface of the base 46 inclined to descend in the inward direction, and thus the contact member 24 is guided to advance in a direction inclined toward the inward direction of the staple S (a direction approaching the second arm 32) and the downward direction Z2. The first portion S1B of the first leg portion S1 is supported by the bottom surface of the slider 44 from the upward direction Z1, and is supported by the first inner wall portion 64 from the inside and the downward direction Z2 (excluding a portion where the tip end portion S1A passes through the downward direction Z2 with respect to the first portion S1B). In addition, the contact surface 24B of the contact member 24 faces an outer surface of the first portion S1B at the time of the plastic deformation. Therefore, it is possible to restrain the bending of the first portion S1B at the time of the plastic deformation of the tip end portion S1A of the first leg portion S1.

[Second Displacement Portion]

The second displacement portion 30 has a function of displacing the second leg portion S2 so as to be engageable with the first object G.

The second displacement portion 30 includes the second arm 32 that bends the second leg portion S2 to plastically deform by rotating in the first rotation direction R1 by the second front end portion 44A2 of the slider 44.

First, a configuration of the second front end portion 44A2 of the slider 44 will be described.

As illustrated in FIGS. 7A and 7B, the second front end portion 44A2 of the slider 44 is provided to extend in the forward direction X1 at an end portion of the slider 44 in the rightward direction Y1. The second front end portion 44A2 includes a first surface 44A21 and a second surface 44A22 formed to face the forward direction X1 in order to rotate the second arm 32 in the first rotation direction R1 by coming into contact with the second arm 32 at the time of the movement in the forward direction X1, and a third surface 44A23 provided in the forward direction X1 with respect to the first front surface 44A21 and the second surface 44A22 and formed to face the rearward direction X2. By disposing a rear end portion 32B of the second arm 32 between the first surface 44A21 and the second surface 44A22, and the third surface 44A23, the second arm 32 rotates in the first rotation direction R1 at the time of the advance of the slider 44, and the second arm 32 rotates in the second rotation direction R2 and returns to an original position at the time of the retraction of the slider 44.

The first surface 44A21 of the slider 44 corresponds to a surface where the first front end portion 44A1 of the advancing slider 44 first comes into contact with the rear end portion 32B of the second arm 32. A surface of the rear end portion 32B of the second arm 32 that comes into contact with the first surface 44A21 is referred to as a first rear end surface 32B1.

The second surface 44A22 of the slider 44 corresponds to a surface where the second front end portion 44A2 of the slider 44, which further advances after the first surface 44A21 comes into contact with the first rear end surface 32B1 and the second arm 32 starts rotating in the first rotation direction R1, comes into contact with the rear end portion 32B of the second arm 32. A surface of the rear end portion 32B of the second arm 32 that comes into contact with the second surface 44A22 is referred to as a second rear end surface 32B2.

As illustrated in FIG. 7B and the like, the first surface 44A21 is provided in the upward direction Z1 with respect to the second surface 44A22 in terms of the up-down direction, the first surface 44A21 is provided in the rearward direction X2 with respect to the second surface 44A22 in terms of the front-rear direction, and the first surface 44A21 is provided in the rightward direction Y1 with respect to the second surface 44A22 in terms of the left-right direction, that is, the first surface 44A21 is provided in the outward direction (the rightward direction Y1) with respect to the second surface 44A22 with the staple S as a reference.

According to this configuration, the slider 44 can further push the second arm 32 by the second surface 44A22 after pushing the second arm 32 by the first surface 44A21, and thus it is possible to increase a rotation angle of the second arm 32 with respect to a stroke of the slider 44.

Further, the slider 44 and the second arm 32 are formed such that an angle (an example of a "first angle") formed by a normal line of the first rear end surface 32B1 at a contact point (an example of a "first contact point") in contact with the first surface 44A21 of the slider 44 and a straight line connecting the first contact point and a rotation shaft 32AX is closer to 90 degrees than an angle (an example of a "second angle") formed by a normal line of the second rear end surface 32B2 at a contact point (an example of a "second contact point") in contact with the second surface 44A22 of the slider 44 and a straight line connecting the second contact point and the rotation shaft 32AX when there is no first contact point.

When the contact point is switched by the rotation of the second arm 32, the slider 44 and the second arm 32 are formed such that an angle (an example of the "first angle") formed by a normal line of the first rear end surface 32B1 at a contact point (an example of the "first contact point") in contact with the first surface 44A21 of the slider 44 and a straight line connecting the first contact point and the rotation shaft 32AX is equal to an angle (an example of the "second angle") formed by a normal line of the second rear end surface 32B2 at a contact point (an example of the "second contact point") in contact with the second surface 44A22 of the slider 44 and a straight line connecting the second contact point and the rotation shaft 32AX. Alternatively, the slider 44 and the second arm 32 are formed such that the angle (an example of the "second angle") formed by the normal line of the second rear end surface 32B2 at the contact point (an example of the "second contact point") in contact with the second surface 44A22 of the slider 44 and the straight line connecting the second contact point and the rotation shaft 32AX is close to 90 degrees.

According to this configuration, it is possible to set a rotational moment when the first surface 44A21 is in contact with the first rear end surface 32B1 to be relatively larger than a rotational moment when the second surface 44A22 is in contact with the second rear end surface 32B2.

As will be described later, the second leg portion S2 needs to bend two portions simultaneously at the start of rotation of the second arm 32, and thus a large load is applied to the second arm 32 at the start of rotation. Therefore, by pushing the second arm 32 in the forward direction X1 by the first surface 44A21 of the slider 44 at the start of rotation having the load, it is possible to generate a relatively large rotational moment on the second arm 32. In order to increase the rotational moment, a distance between the rotation shaft 32AX of the second arm 32 and the first rear end surface 32B1 may be larger than a distance between the rotation shaft 32AX of the second arm 32 and the second rear end surface 32B2. In other words, the distance between the rotation shaft 32AX of the second arm 32 and the second rear end surface 32B2 may be smaller than the distance between the rotation shaft 32AX of the second arm 32 and the first rear end surface 32B1.

Figure 15:
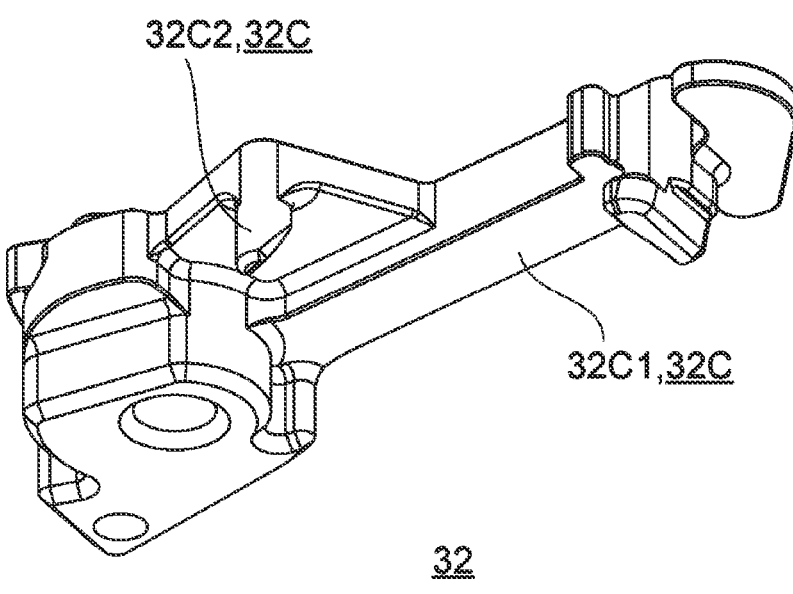
FIG. 15 is a perspective view of a second arm according to the first embodiment.
Figure 16A:
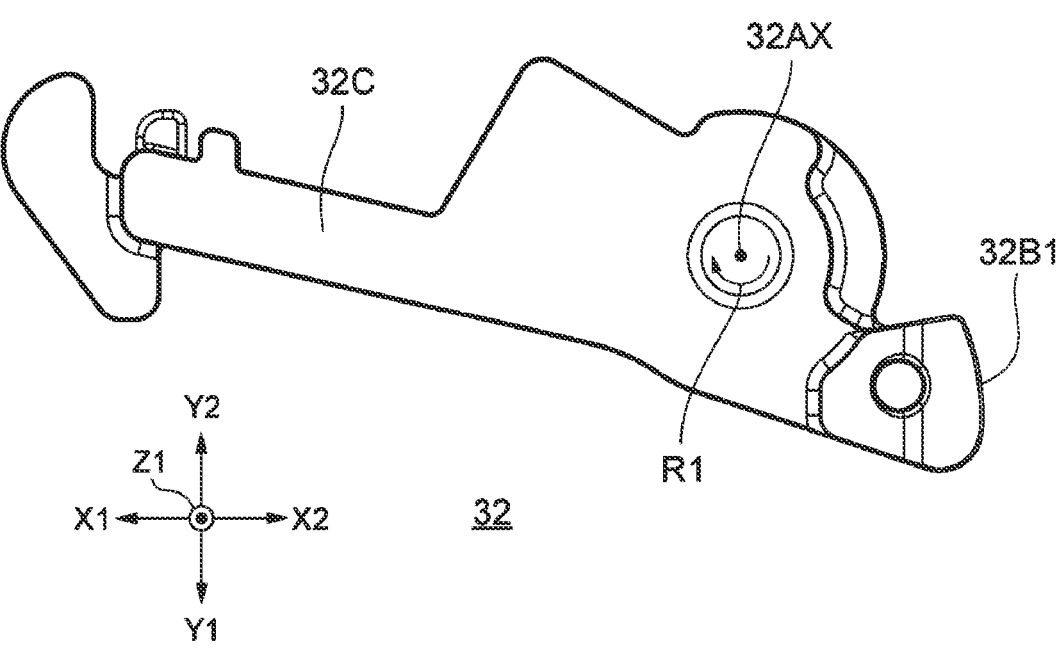
FIG. 16A is a plan view of the second arm according to the first embodiment.
Figure 16B:
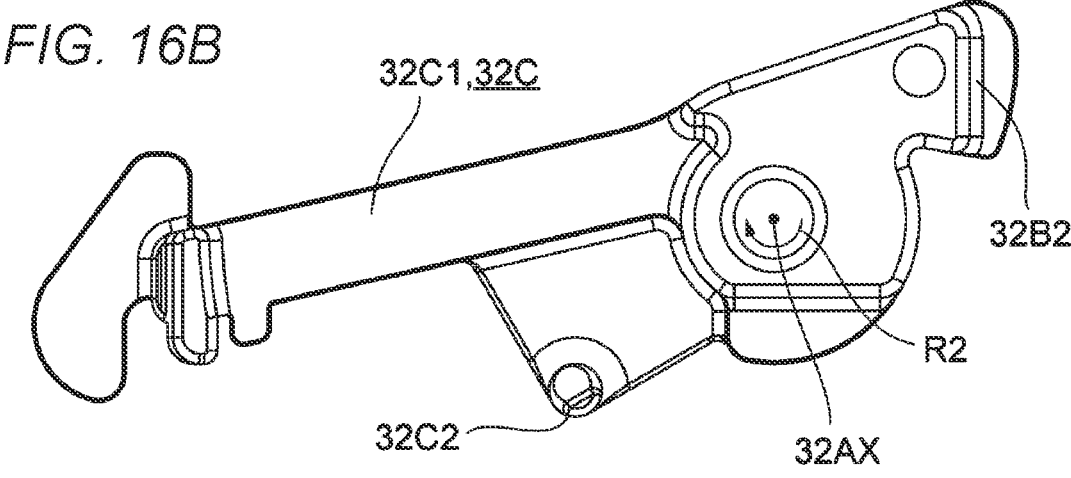
FIG. 16B is a rear view of the second arm according to the first embodiment.

Next, the second arm 32 will be described. FIG. 15 is a perspective view of the second arm 32 as seen from below: FIGS. 16A and 16B are respectively a plan view and a rear view of the second arm 32.

As illustrated in FIGS. 15, 16A, and 16B, the second arm 32 includes the rear end portion 32B that extends in the rearward direction X2 from the rotation shaft 32AX in the initial state, and a tip end portion 32C that extends in the forward direction X1 with respect to the rotation shaft 32AX.

Since the first rear end surface 32B1 of the rear end portion 32B is provided in the rearward direction X2 with respect to the second rear end surface 32B2, it is possible to bring the first surface 44A21 of the slider 44 into contact with the first rear end surface 32B1, and then bring the second surface 44A22 into contact with the second rear end surface 32B2.

The rotation shaft 32AX is provided in the leftward direction Y2 (the inward direction) which is closer to a center than the first rear end surface 32B1 and the second rear end surface 32B2. Therefore, since the rear end portion 32B is pushed in the forward direction X1, the tip end portion 32C of the second arm 32 rotates in the first rotation direction R1 which is directed to a direction approaching the inward direction of the staple S and the first arm 22.

Further, the rotation shaft 32AX is provided to be inclined so as to advance in the inward direction (the leftward direction Y2) toward the downward direction Z2. Therefore, the tip end portion 32C of the second arm 32 rotating in the first rotation direction R1 is provided to advance in the upward direction Z1 as the tip end portion 32C rotates in the first rotation direction R1. As a result, the second leg portion S2 of the staple S plastically deformed by the second arm 32 also advances in the upward direction Z1 as the second arm 32 rotates, and is configured to be engaged with the first object G at a position in the upward direction Z1 with respect to the plane PL penetrating through the first leg portion S1, the second leg portion S2, and the main body portion S3 before the binding.

The tip end portion 32C of the second arm 32 includes a main body portion 32C1 that comes into contact with the second leg portion S2, and a protrusion 32C2 for bending back. The main body portion 32C1 is provided such that two protruded portions protruding in the first rotation direction R1 are vertically separated from each other at a position separated from the rotation shaft 32AX. By vertically sandwiching the second leg portion S2 by using the protruded portions, it is possible to firmly hold and plastically deform the second leg portion S2.

The second arm 32 includes the protrusion 32C2 for bending back that is provided at a position advanced in the first rotation direction R1 with respect to the main body portion 32C1, and protrudes in the downward direction Z2. By rotating the second arm 32 in the second rotation direction R2 and returning the second leg portion S2 in the second rotation direction R2 by the protrusion 32C2 after rotating the second arm 32 in the first rotation direction R1 and bending the second leg portion S2, it is possible to engage the tip end portion S2A of the second leg portion S2 with the first object G.

The protrusion 32C2 for bending back is formed to be inclined so as to protrude in the downward direction Z2 as advancing in the first rotation direction R1. According to such a configuration, when the second arm 32 is rotated in the second rotation direction R2, the protrusion 32C2 for bending back can smoothly move over the second leg portion S2 engaged with the first object G while returning the second leg portion S2 in the second rotation direction R2. A biasing force toward the upward direction Z1 by the pusher 16 is applied to the plastically deformed staple S via the staple S in the downward direction Z2. An elevation angle of the second leg portion S2 at the time of the displacement (for example, 10 degrees to 45 degrees with respect to the plane PL penetrating through the first leg portion S1, the second leg portion S2, and the main body portion S3 before the binding) and an inclination angle of the protrusion 32C2 for bending back are designed such that the protrusion moves over the second leg portion S2 against the biasing force.

[Binding Method Using Binding Machine]

Hereinafter, a binding method using the binding machine 10 will be described.

As described above, FIGS. 11A and 11B are partially enlarged views illustrating the front end portion of the binding machine 10 in the initial state (the standby state) in the front view and the top view, respectively.

At this time, the staple S positioned at the upper end is connected to one or more staples S accommodated in the magazine 14 in the downward direction Z2. Further, the driver 42 is positioned in the rearward direction X2 with respect to the main body portion S3 of the staple S positioned at the upper end. There is a slight gap between a front end of the driver 42 and the main body portion S3 of the staple S positioned at the upper end. The protruding end portion 44A13 of the slider 44 provided at a left end slightly overlaps with the staple S.

Figure 17A:
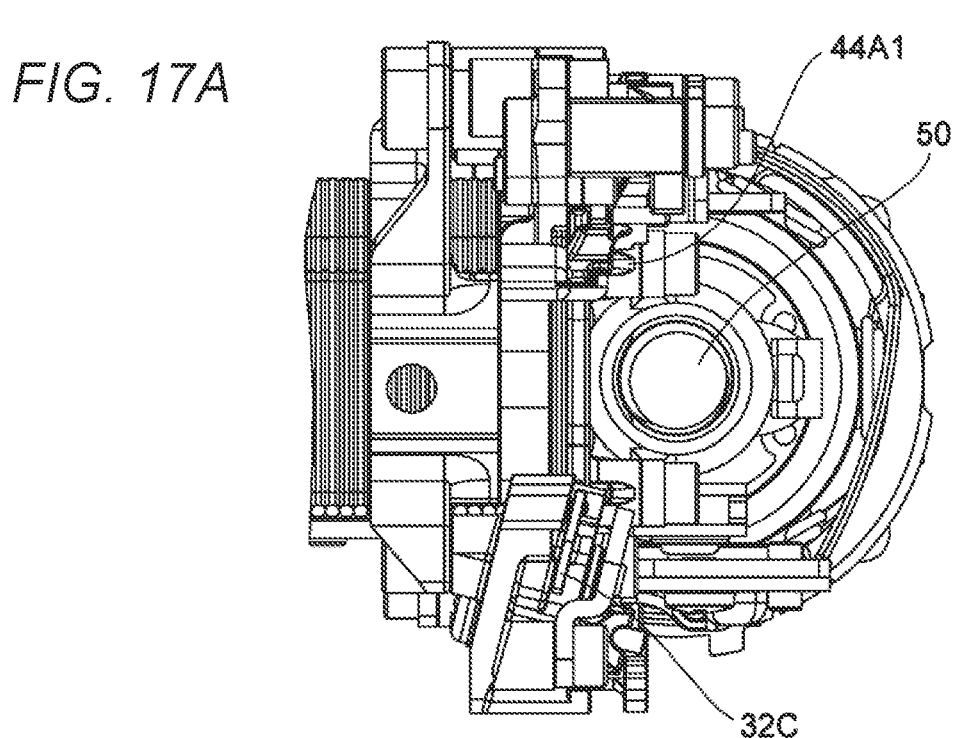
FIG. 17A is a partially enlarged view illustrating a driver movement start time of the binding machine according to the first embodiment in the front view.
Figure 17A:
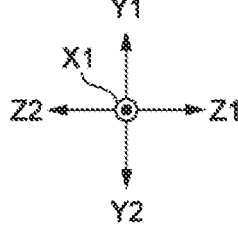
Figure 17B:
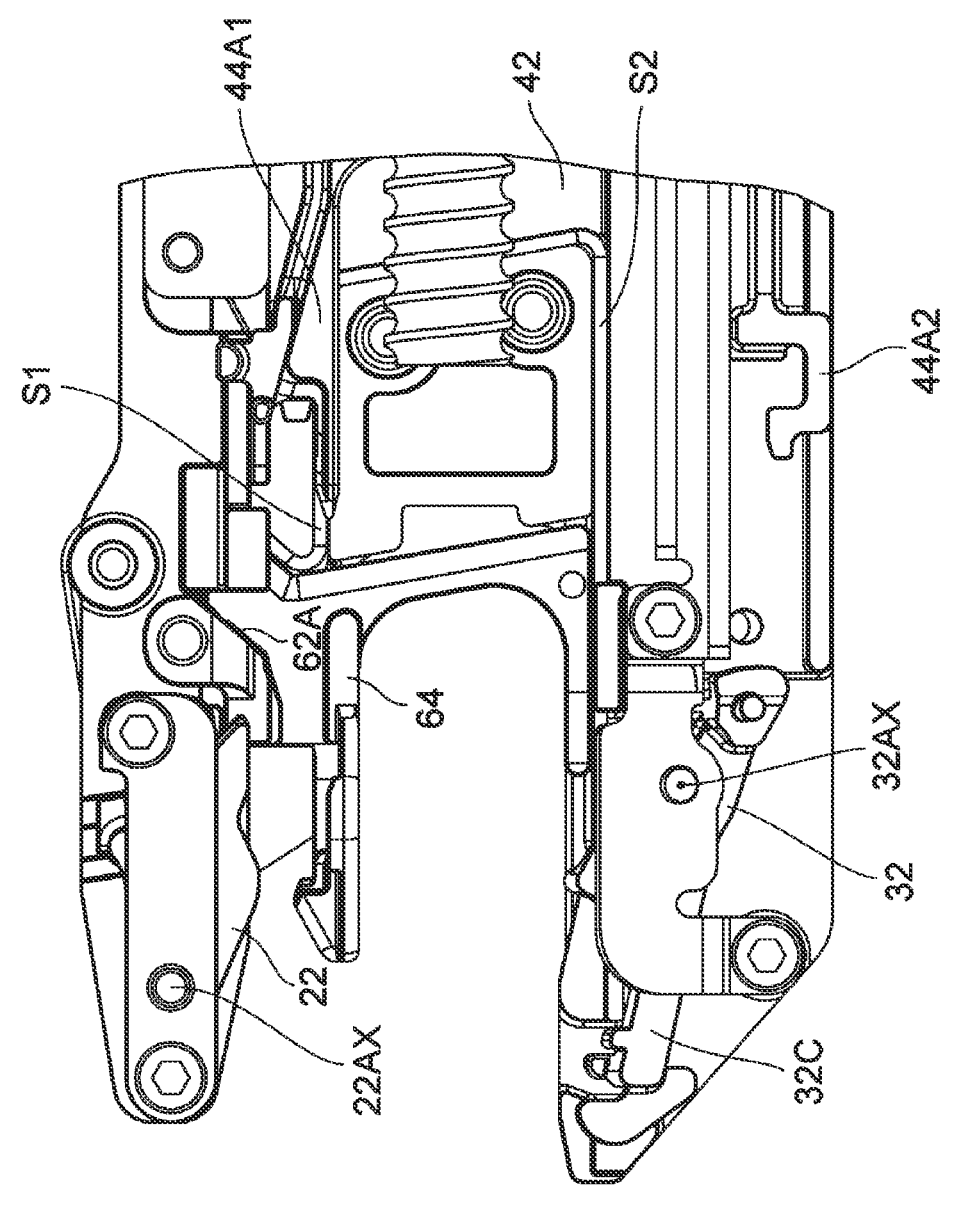
FIG. 17B is a partially enlarged view illustrating the driver movement start time of the binding machine according to the first embodiment in the top view.
Figure 17B:
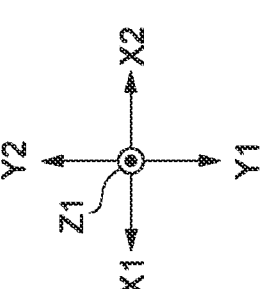

FIGS. 17A and 17B are partially enlarged views illustrating the front end portion of the binding machine 10 in the front view and the top view immediately after the user operates the switch and the driver 42 starts moving, respectively. When the user operates the switch, the motor 54 starts rotating, and the ball screw 50 accordingly rotates clockwise, and thus the nut part 52 and the slider 44 fixed to the nut part 52 start moving toward the forward direction X1. The first claw portion 48C1 and the third claw portion 48C3 of the switching block 48 held by the nut part 52 are inserted into the first groove 42G1 and the third groove 42G3, and thus the front surface of the first claw portion 48C1 and the front surface of the third claw portion 48C3 are in contact with the side surface of the first groove 42G1 facing the rearward direction X2 and the side surface of the third groove 42G3 facing the rearward direction X2. respectively, and the movement of the driver 42 toward the forward direction X1 is started. Accordingly, the first moving operation in which the driver 42 and the slider 44 advance together is started.

As illustrated in FIG. 8A, the base 46 is provided such that the height of the driver 42 substantially coincides with the staple S positioned at the upper end. Therefore, the front end surface 42S of the driver 42 moving on the base 46 in the forward direction X1 comes into contact with the main body portion S3 of the staple S positioned at the upper end, and presses the main body portion S3 of the staple S in the forward direction X1. A separation block 18 (FIG. 5) for prohibiting the movement of the staple S in the downward direction Z2 toward the forward direction X1 is provided inside the staple S in the downward direction Z2. Therefore, only the staple S positioned at the upper end is separated from the another staple S in the downward direction Z2 and moves on the separation block 18 in the forward direction X1.

Figure 18:
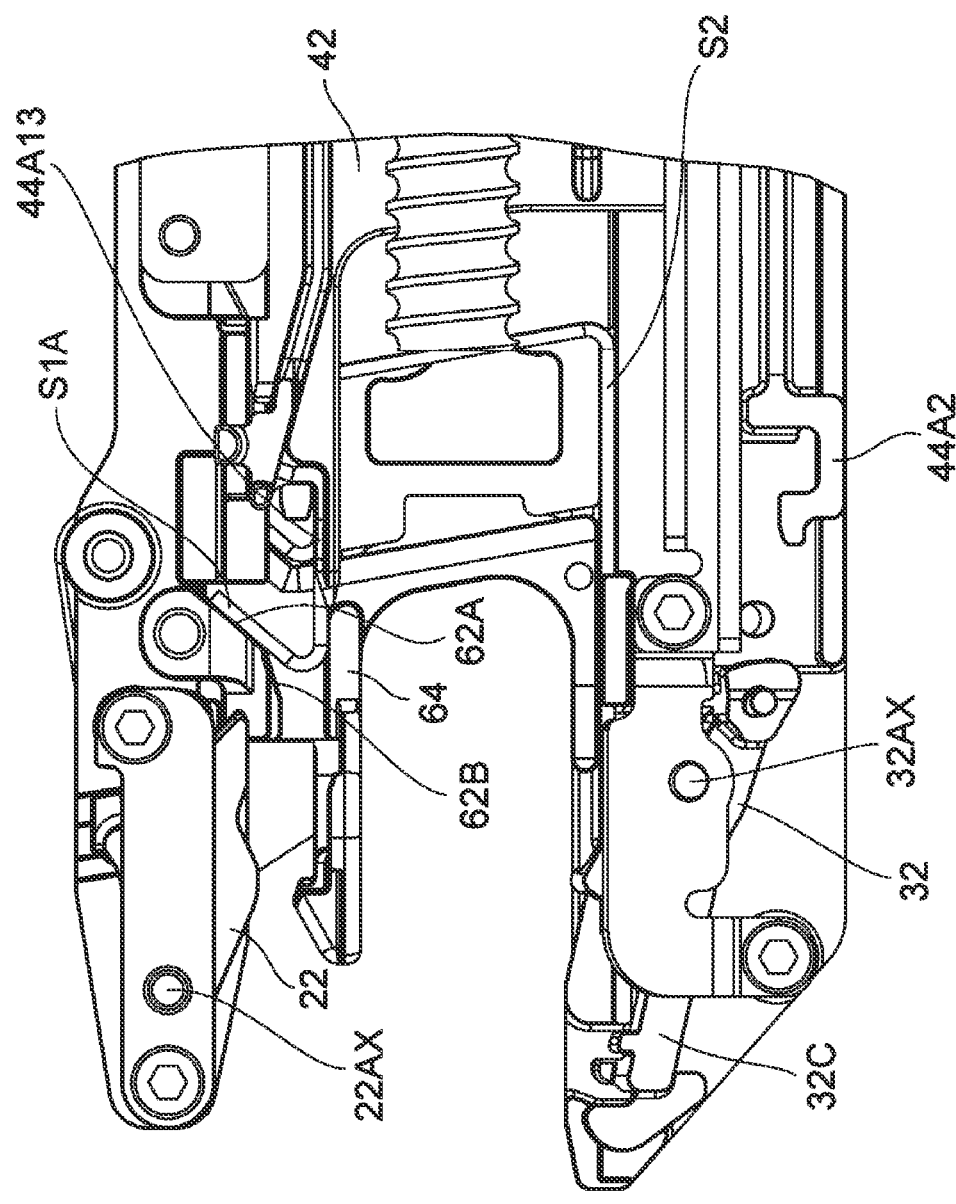
FIG. 18 is a partially enlarged view illustrating a state where the separated staple is advanced by the binding machine according to the first embodiment in the top view.

FIG. 18 is a partially enlarged view illustrating the front end portion of the binding machine 10 in the top view when the driver 42 advances and the tip end portion S1A of the first leg portion S1 of the staple S advances on a guiding path of the detachment portion. Since a front view thereof is the same as FIG. 17A, the front view is omitted.

Since the ball screw 50 continuously rotates clockwise, the slider 44 moves in the forward direction X1. Therefore, the first front end portion 44A1 of the slider 44 advances such that the protruding end portion 44A13 is positioned on the first leg portion S1, and the second front end portion 44A2 advances along a right end of the binding machine 10. The driver 42 advances together with the slider 44. The tip end portion S1A of the first leg portion S1 comes into contact with the wall surface of the first region 62A corresponding to an entering portion of the first outer wall portion 62. In addition, the inside of the first portion S1B of the first leg portion S1 comes into contact with the wall surface of the first inner wall portion 64. Since the distance between the wall surface of the first outer wall portion 62 and the wall surface of the first inner wall portion 64 decreases as the driver 42 advances in the forward direction X1, the first leg portion S1 is plastically deformed such that the bending angle α1 is reduced as the driver 42 advances. At this time, the protruding end portion 42B of the driver 42 supports the first portion S1B and a left end of the main body portion S3 from the outside, and the protruding end portion 44A13 of the slider 44 comes into contact with an upper surface of the first leg portion S1 to press the first leg portion S1 from the upward direction Z1, and thus the bending of the first portion S1B is restrained. Since the distance between the wall surface of the first outer wall portion 62 and the wall surface of the first inner wall portion 64 in the first region 62A is relatively largely reduced, an angle between the tip end portion S1A and the first portion S1B of the first leg portion S1 and the first portion S1B is relatively largely reduced. Since the distance between the wall surface of the first outer wall portion 62 and the wall surface of the first inner wall portion 64 in the subsequent second region 62B is relatively slightly reduced, the bending angle is relatively slightly reduced.

FIG. 19 is a partially enlarged view of the front end portion of the binding machine 10 in the top view when the driver 42 advances and the tip end portion S1A of the first leg portion S1 of the staple S passes through the first outer wall portion 62. Since a front view thereof is the same as FIG. 17A, the front view is omitted. As illustrated in FIG. 19, when the tip end portion passes through the first outer wall portion 62, the tip end portion is plastically deformed, and the bending angle α1 is largely reduced.

Figure 20:
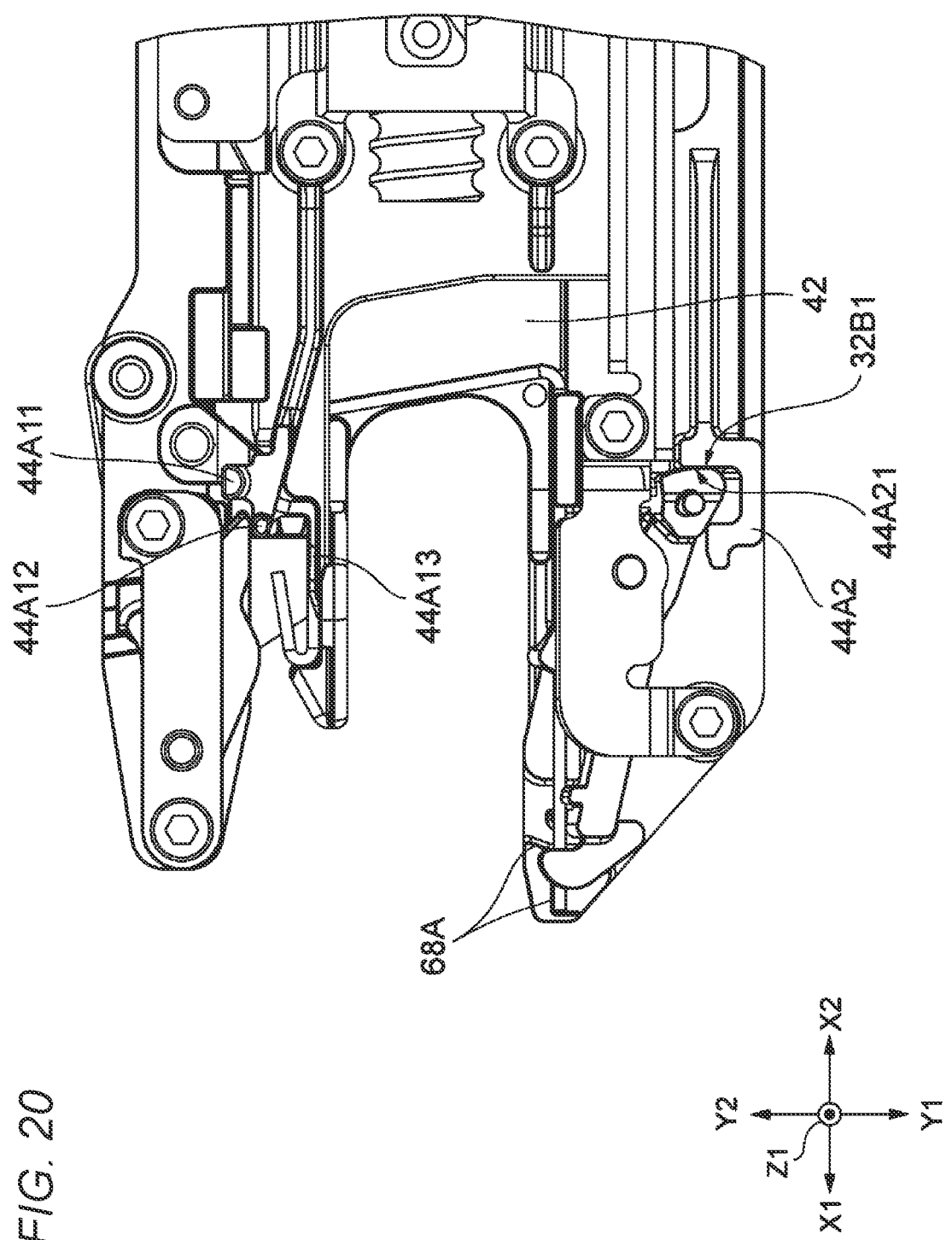
FIG. 20 is a partially enlarged view illustrating a state where the staple has reached a displacement start position by the binding machine according to the first embodiment in the top view.

FIG. 20 is a partially enlarged view illustrating a state where the driver 42 advances most and the staple S reaches a displacement start position in the top view: At this time, the bent portion of the first leg portion S1 of the staple S reaches a front end of the first inner wall portion 64 (an inner wall surface of the first inner wall portion 64 facing the rearward direction X2), and the tip end portion S2A of the second leg portion S2 reaches a front end of the tip end supporting portion 68 (an inner wall surface of the tip end supporting portion 68 facing the rearward direction X2). Since a front view thereof is the same as FIG. 17A, the front view is omitted.

At this time, the bent portion of the first leg portion S1 and an inner side surface and a lower surface of the first portion S1B are supported by the first inner wall portion 64 from the downward direction Z2 and the rightward direction Y1 (the inward direction). Further, the bent portion of the first leg portion S1 is also supported by the first inner wall portion 64 from the forward direction X1. Further, the upper surface of the first portion S1B is supported from the upward direction Z1 by the protruding end portion 44A13 of the first front end portion 44A1 of the slider 44.

On the other hand, an inner side surface and a lower surface of the tip end portion S2A of the second leg portion S2 are supported by the tip end portion from the downward direction Z2 and the leftward direction Y2 (the inward direction).

Further, an inner side surface of the main body portion S3 and an inner side surface of a connection portion with the main body portion S3 of the second leg portion S2 are supported by the second inner wall portion 66 from the inward direction.

At this time, the second claw portion 48C2 of the switching block 48, which pushes the driver 42 in the forward direction X1, moves in the upward direction Z1 by the second protrusion 46A2. As a result, since the switching block 48 moves on the driver 42, the driver 42 stops moving in the forward direction X1, and the first moving operation ends. At the same time, the ball biased in the upward direction Z1 from the hole formed in the base 46 is fitted into the recessed portion provided in the bottom surface of the driver 42 and functions as a stopper, and thus the movement of the driver 42 toward the forward direction X1 or the rearward direction X2 is restrained by a frictional force with the switching block 48.

The first protruded portion 44A11 and the second protruded portion 44A12 of the first front end portion 44A1 of the slider 44 approach a rear end of the first arm 22. In addition, the first surface of the second front end portion 44A2 of the slider 44 approaches or comes into contact with the first rear end surface 32B1 of the second arm 32.

After the first moving operation ends, the motor 54 stops rotating by the control device. At this time, the user sets the first object G and the second object P at predetermined positions of the binding machine 10. In the present embodiment, the first object G is a string that functions as a guide element. Accordingly, the user inserts the string, which is the first object G, into the bent portion of the first leg portion S1. In the present embodiment, the second object P is a stem. Accordingly, the user inserts the stem, which is the second object P, into a region surrounded by the staple S. The portions of the binding machine 10 where the first object G and the second object P are inserted may be referred to as a first insertion portion and a second insertion portion. In the present embodiment, the first object G is inserted into the bent portion of the first leg portion S1 supported by the first inner wall portion 64, and thus the first inner wall portion 64 corresponds to the first insertion portion. Further, the second object P is inserted into the recessed portion of the binding machine 10 provided to be recessed in the rearward direction X2 so as to be sandwiched by the first inner wall portion 64 and the second inner wall portion 66, and thus the recessed portion corresponds to the second insertion portion.

Figure 21A:
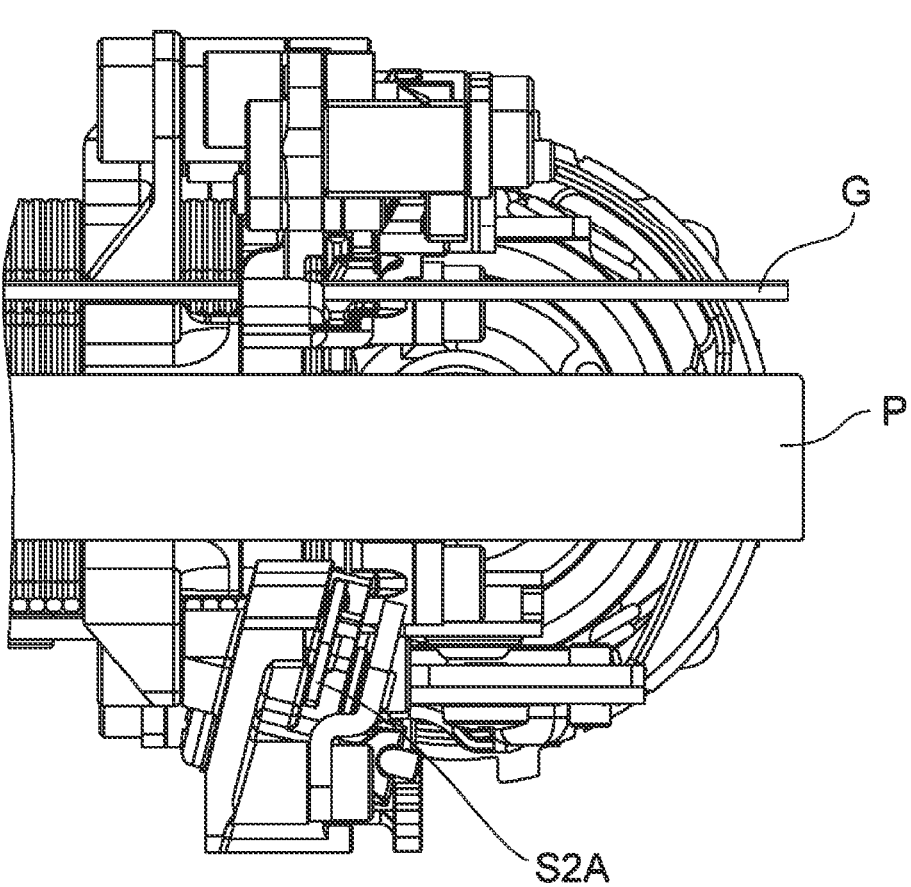
FIG. 21A is a partially enlarged view illustrating the front end portion of the binding machine in the front view when a user inserts a first object into a first insertion portion and inserts a second object into a second insertion portion.
Figure 21A:
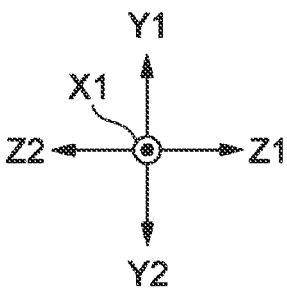
Figure 21B:
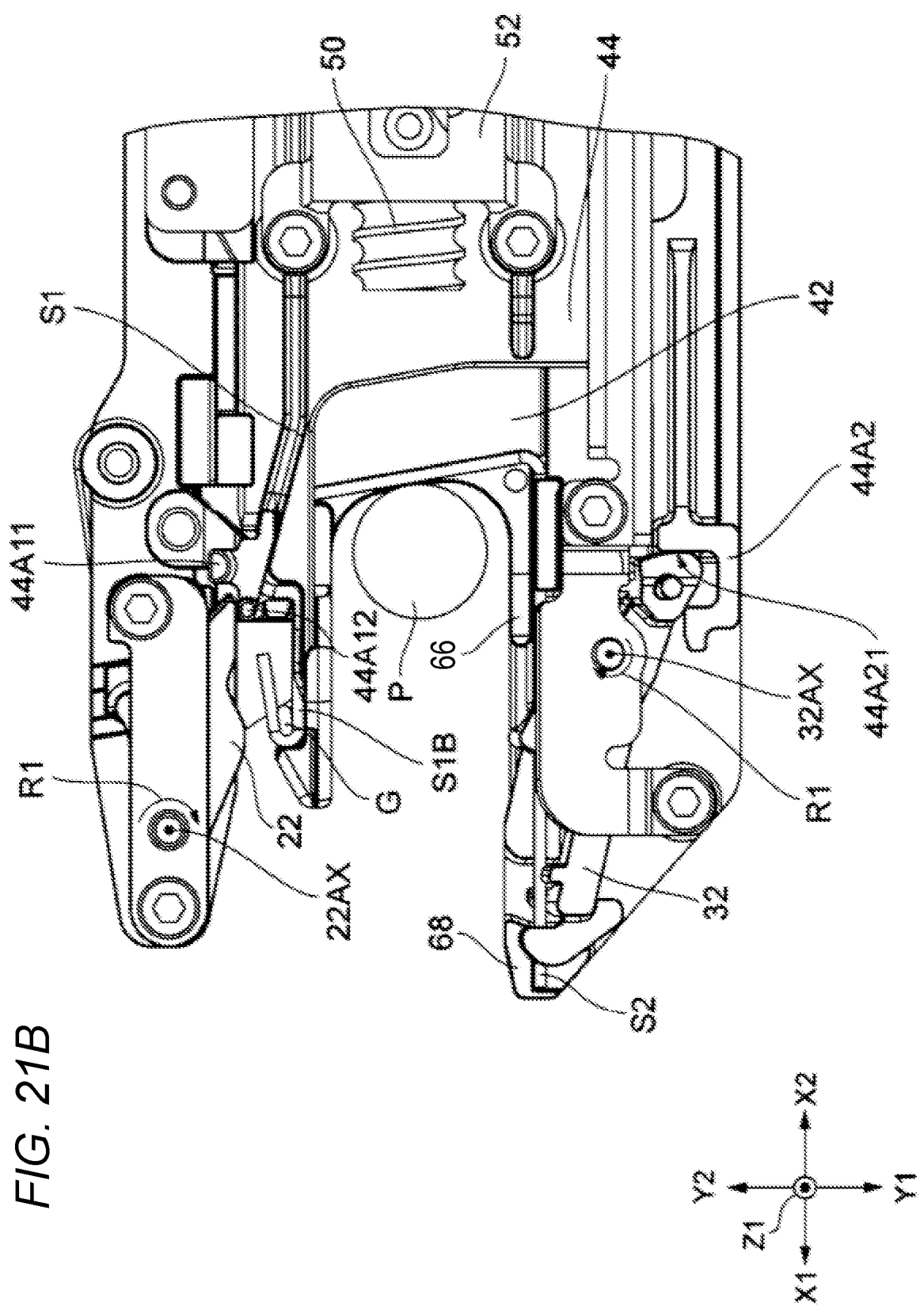
FIG. 21B is a partially enlarged view illustrating the front end portion of the binding machine in the top view when the user inserts the first object into the first insertion portion and inserts the second object into the second insertion portion.

FIGS. 21A and 21B are partially enlarged views illustrating the front end portion of the binding machine 10 in the front view and the top view when the user inserts the first object G into the first insertion portion and inserts the second object P into the second insertion portion, respectively.

Thereafter, when the user operates the switch, or when it is detected that the first object G and the second object P are inserted by sensors such as contact sensors respectively provided in the first insertion portion and the second insertion portion, the motor 54 starts rotating again. The motor 54 restarts rotating, and the ball screw 50 accordingly rotates clockwise, and thus the nut part 52 and the slider 44 fixed to the nut part 52 start moving in the forward direction X1. Since the switching block 48 advances on the driver 42, the driver 42 does not advance. Therefore, the second moving operation in which only the slider 44 of the driver 42 and the slider 44 advances is started.

Figure 22A:
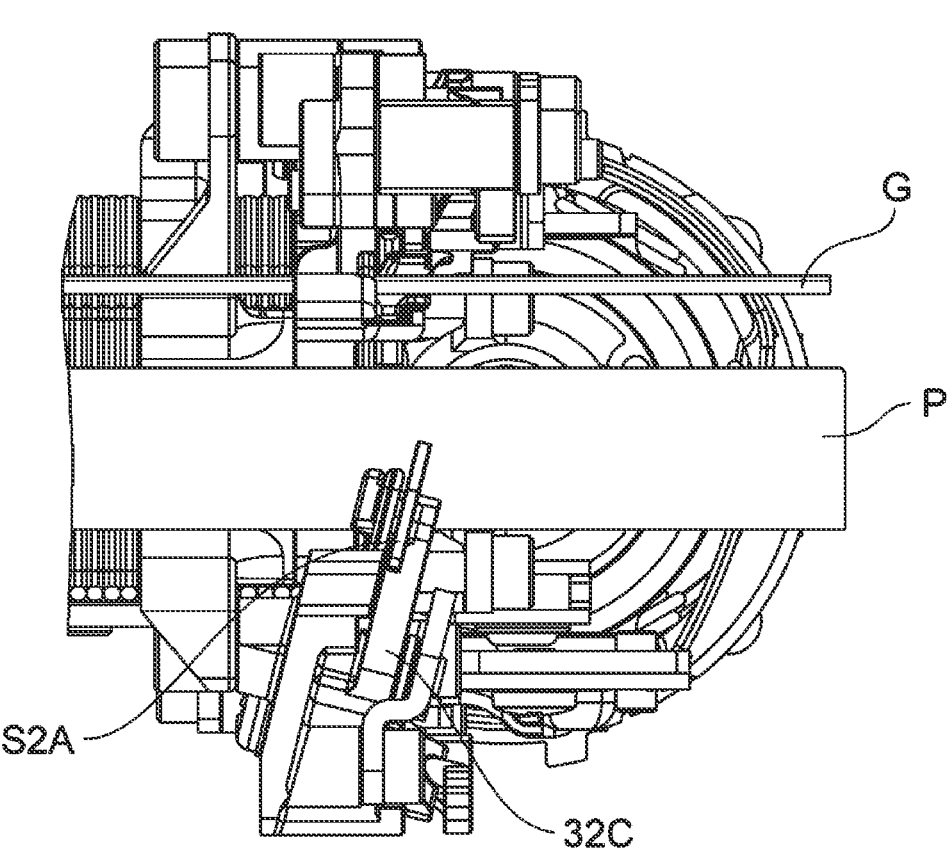
FIG. 22A is a partially enlarged view illustrating the front end portion of the binding machine in the front view when the slider restarts advancing after the first object and the second object are inserted.
Figure 22A:
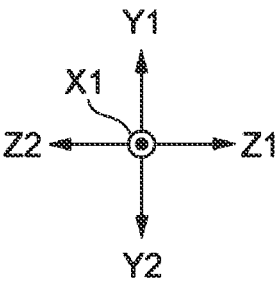
Figure 22B:
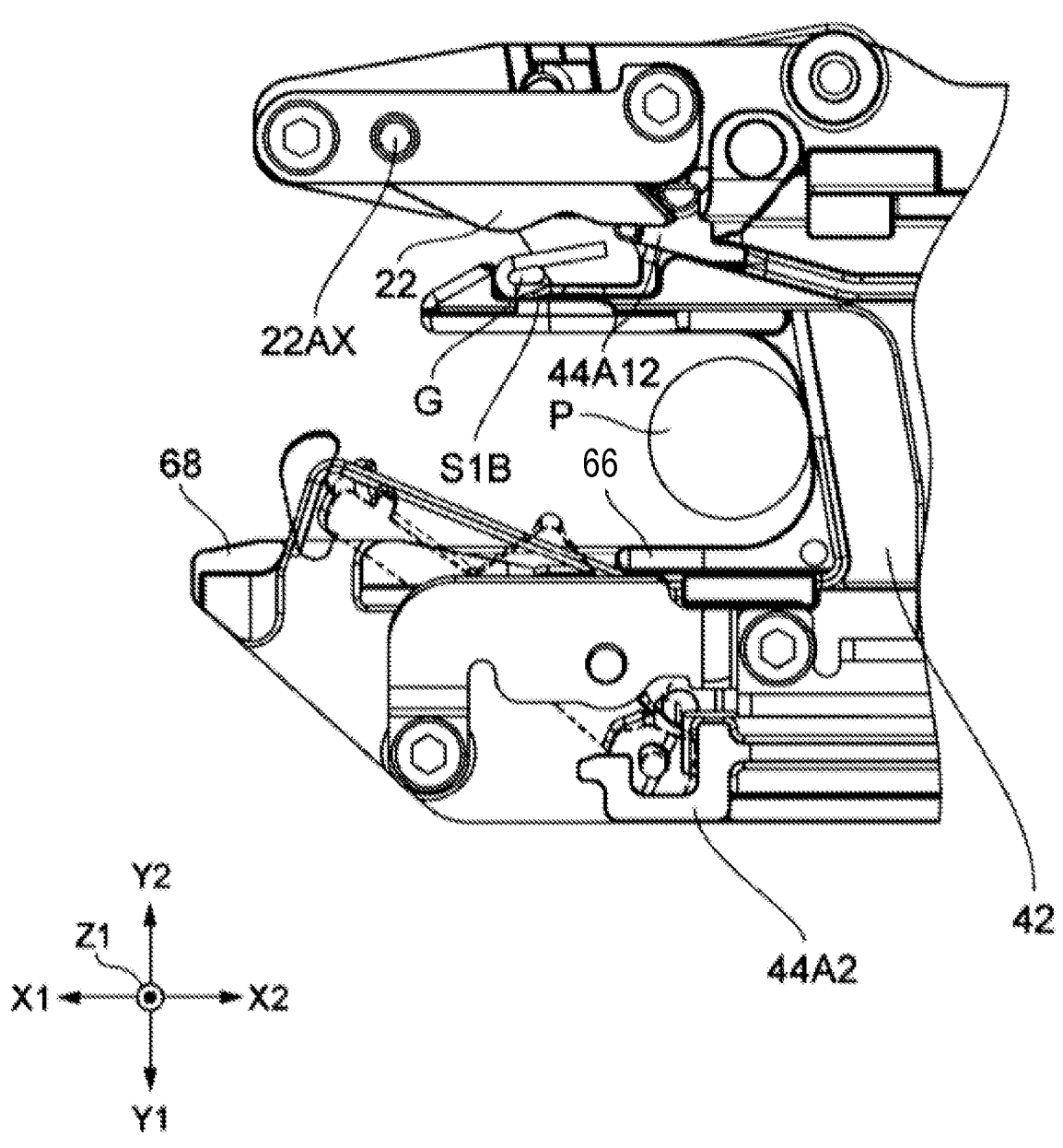
FIG. 22B is a partially enlarged view illustrating the front end portion of the binding machine in the top view when the slider restarts advancing after the first object and the second object are inserted.

FIGS. 22A and 22B are partially enlarged views illustrating the front end portion of the binding machine 10 in the front view and the top view when the slider 44 further advances in the second moving operation, respectively. In the second moving operation, the driver 42 does not advance. Therefore, the inner side surface of the main body portion S3 of the staple S is supported by the first inner wall portion 64 and the second inner wall portion 66, and an outer side surface thereof is supported by the driver 42 and is static.

The first protruded portion 44A11 of the first front end portion 44A1 of the slider 44 comes into contact with the surface of the wall portion facing the rearward direction X2, which extends in a direction inclined to protrude in the downward direction Z2 with respect to the rear end portion of the first arm 22, and pushes the first arm 22 in the forward direction X1. The rotation shaft 22AX of the first arm 22 is provided at a position in the forward direction X1 and the outward direction (the leftward direction Y2) with respect to the first protruded portion 44A11 at this time. Therefore, the first arm 22 starts rotating in the first rotation direction R1. The wall portion of the rear end portion of the first arm 22 rotates in the first rotation direction R1 while passing through a region of a gap between the first protruded portion 44A11 and the second protruded portion 44A12. At this time, the first leg portion S1 is not plastically deformed by the first displacement portion 20.

On the other hand, the first surface 44A21 of the second front end portion 44A2 comes into contact with the first rear end surface 32B1 of the second arm 32, and pushes the second arm 32 in the forward direction X1. At this time, the rotation shaft 32AX of the second arm 32 is positioned in the forward direction X1 and the inward direction (the leftward direction Y2) with respect to the first rear end surface 32B1, and thus the second arm 32 also starts rotating in the first rotation direction R1. The second leg portion S2 vertically sandwiched by two protrusions of the main body portion of the second arm 32 is bent toward the inward direction with the front end of the second inner wall portion 66 as a fulcrum.

At this time, the tip end portion S2A of the second leg portion S2 is supported from the inward direction by the wall surface of the support wall portion 68A of the tip end supporting portion 68 provided inside the second leg portion S2. Therefore, the second leg portion S2 is bent toward the inward direction of the staple S with the front end of the second inner wall portion 66 as a fulcrum, and at the same time, the tip end portion S2A of the second leg portion S2 is bent in the opposite direction (the outward direction) by passing through the support wall portion 68A while being in contact with the wall surface of the support wall portion 68A of the tip end supporting portion 68.

As described above, since the rotation shaft 32AX of the second arm 32 is inclined such that the rotation shaft 32AX advances in the inward direction as advancing in the downward direction Z2, the tip end portion S2A of the second leg portion S2 advances in the upward direction Z1 while approaching the first leg portion S1 as rotating in the first rotation direction R1.

In addition, a period in which the tip end portion S2A of the second leg portion S2 of the staple S and the wall surface of the support wall portion 68A are in contact with each other and a period in which the first surface 44A21 of the slider 44 and the first rear end surface 32B1 of the second arm 32 are in contact with each other are configured to overlap with each other in at least a partial period, and thus it is possible to generate a relatively large rotational moment at the time of high load.

Figure 23A:
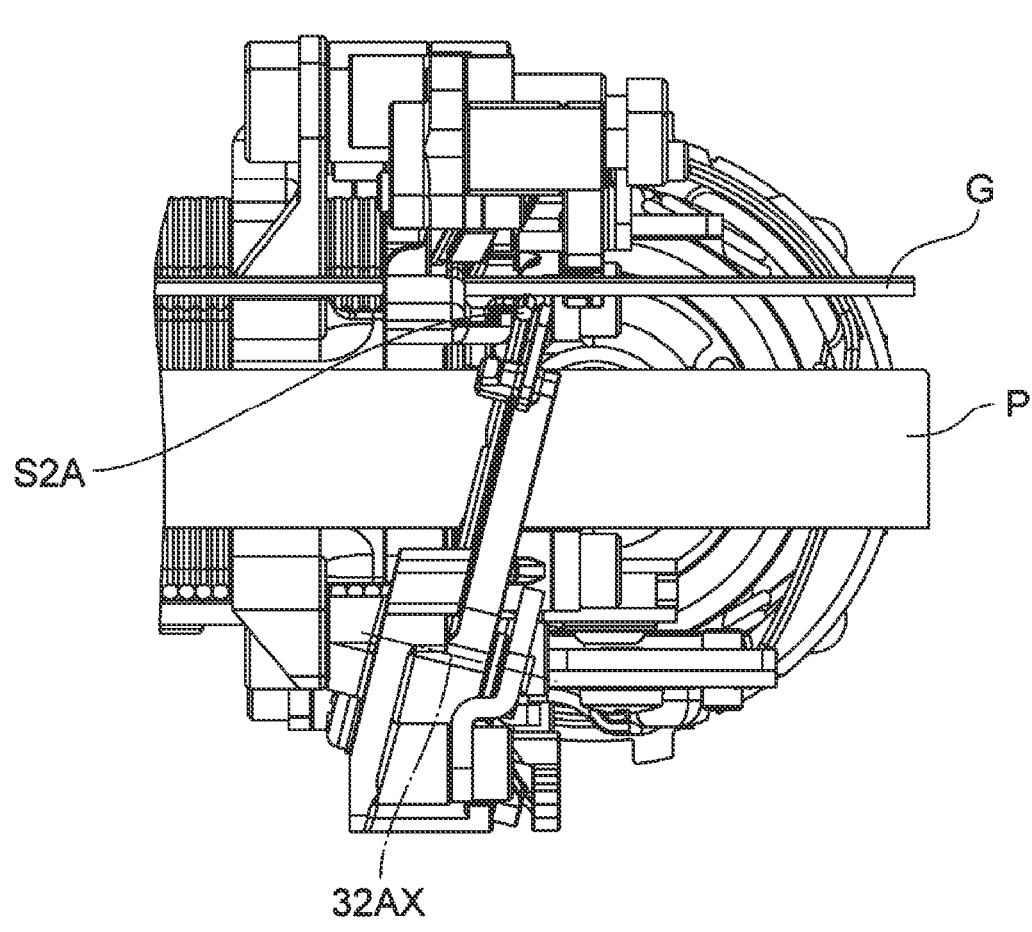
FIG. 23A is a partially enlarged view illustrating the front end portion of the binding machine in the front view when the slider advances and a second leg portion is deformed.
Figure 23A:
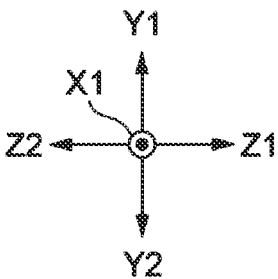
Figure 23B:
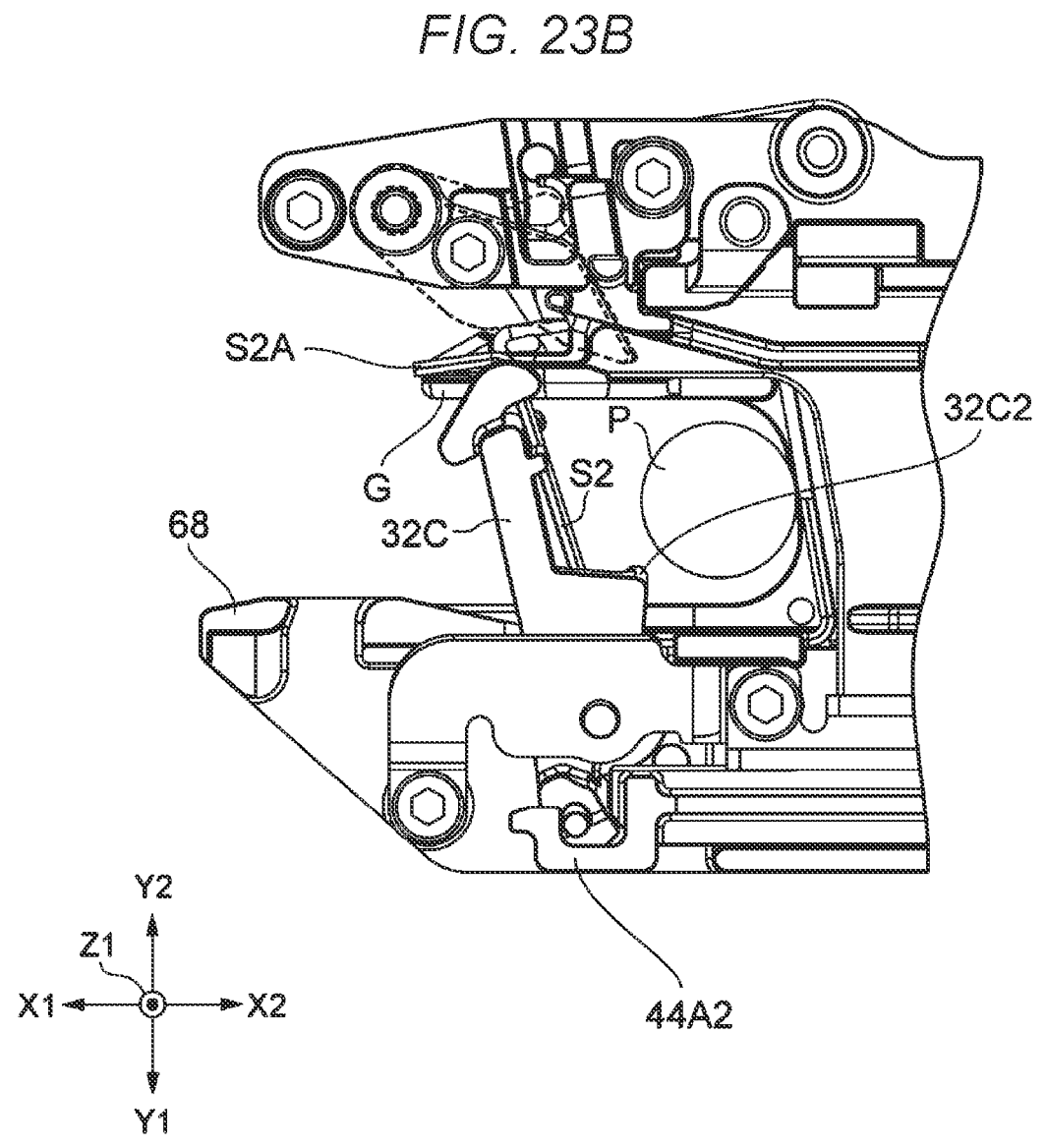

FIGS. 23A and 23B are partially enlarged views illustrating the front end portion of the binding machine 10 in the front view and the top view when the slider 44 further advances in the second moving operation, respectively.

The first arm 22 further rotates in the first rotation direction R1 by being pushed by the first protruded portion 44A11 of the first front end portion 44A1 of the slider 44. At this time, since the protruding end portion 44A13 of the first front end portion 44A1 of the slider 44 reaches the front end of the first inner wall portion 64, the slider 44 presses the upper surface of the first portion S1B of the first leg portion S1 from the upward direction Z1. Therefore, the first portion S1B of the first leg portion S1 is supported by the slider 44 and the first inner wall portion 64 from the upward direction Z1, the downward direction Z2, and the inward direction.

The second rear end surface 32B2 of the second arm 32 further rotates in the first rotation direction R1 by being pushed by the second surface 44A22 of the second front end portion 44A2 of the slider 44. As illustrated in FIG. 23B, since the second leg portion S2 held by the second arm 32 is bent to the position where the second leg portion S2 intersects the first leg portion S1, the opening provided in the staple S before the binding is closed in the top view; and the first leg portion S1, the second leg portion S2, and the main body portion S3 of the staple S surround the second object P in the top view: In the front view illustrated in FIG. 23A, the tip end portion S2A of the second leg portion S2 moves in the upward direction Z1 and approaches the first object G.

Further, the second surface 44A22 of the slider 44 and the second rear end surface 32B2 of the second arm 32 are in contact with each other after the period in which the tip end portion S2A of the second leg portion S2 of the staple S and the support wall portion 68A are in contact with each other elapses, and thus it is possible to generate a relatively small rotational moment at the time of relatively low load.

Figure 24A:
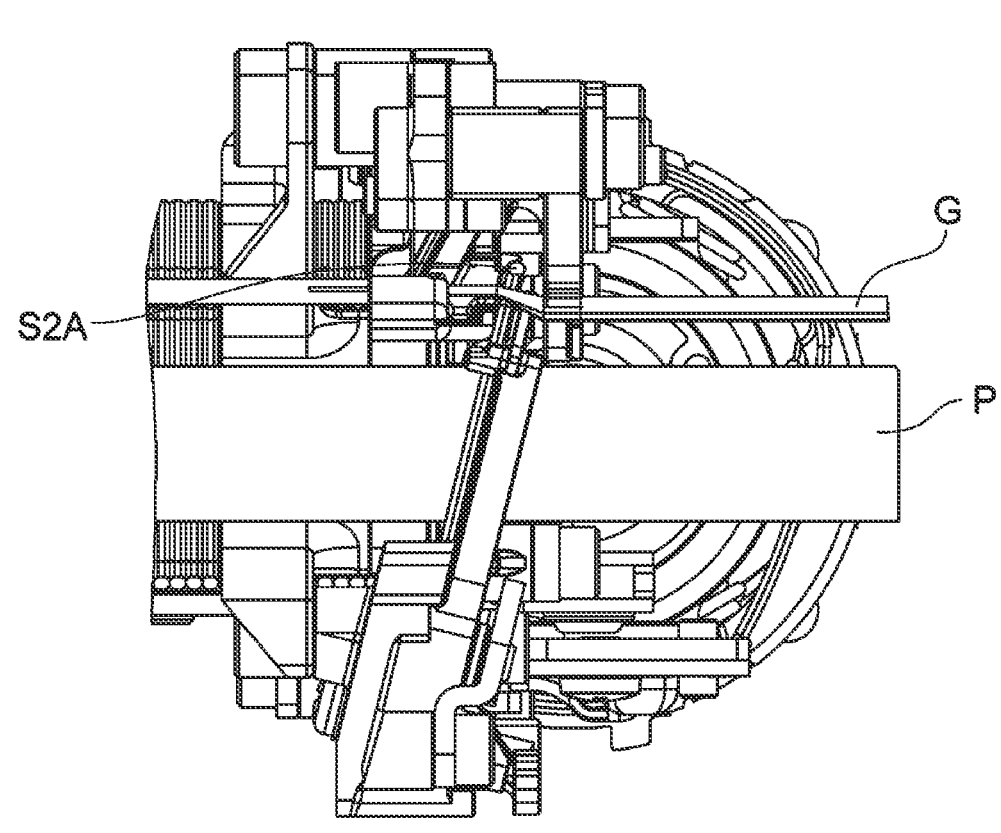
FIG. 24A is a partially enlarged view illustrating the front end portion of the binding machine in the front view immediately before the slider most advances.
Figure 24A:
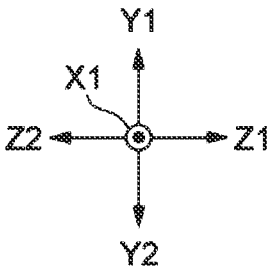
Figure 24B:
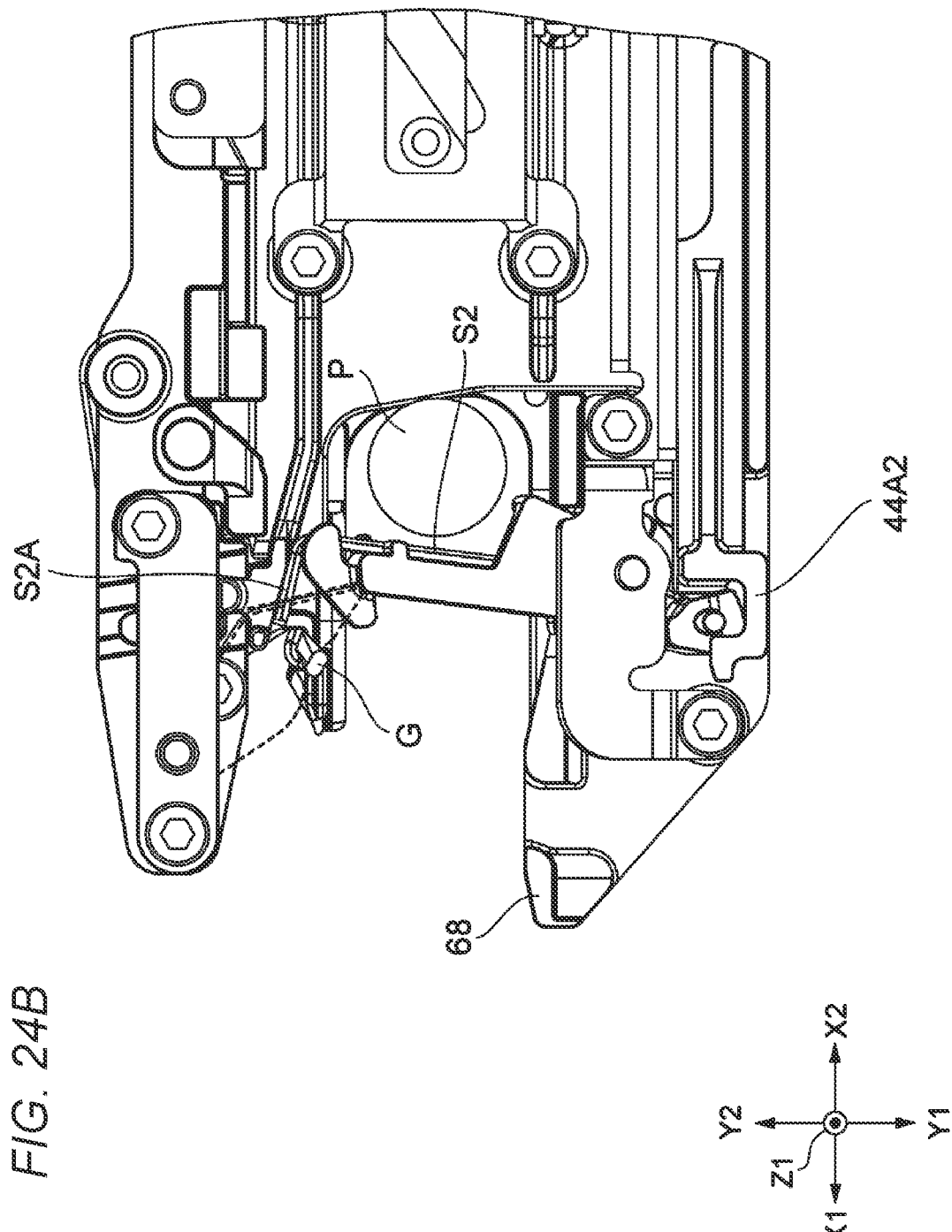
FIG. 24B is a partially enlarged view illustrating the front end portion of the binding machine in the top view immediately before the slider most advances.

FIGS. 24A and 24B are partially enlarged views illustrating the front end portion of the binding machine 10 in the front view and the top view immediately before the slider 44 most advances in the second moving operation, respectively.

The first arm 22 further rotates in the first rotation direction R1 by being pushed by the first protruded portion 44A11 of the first front end portion 44A1 of the slider 44, comes into contact with the first object G, and pushes and displaces the first object G. Further, the protruded portion 22C protruding in the downward direction Z2 with respect to the first arm 22 is in contact with the recessed portion 24A provided at the tail end of the contact member 24. Therefore, as the protruded portion 22C of the first arm 22 rotates, the contact member 24 starts advancing in the direction inclined toward the inward direction of the staple S and the downward direction Z2. First, the contact surface 24B of the contact member 24 comes into contact with the tip end portion S1A of the first leg portion S1, and then the corner portion 24C of the contact member 24 comes into contact with the tip end portion S1A of the first leg portion S1, and plastically deforms the tip end portion to fold back. The tip end portion S1A of the first leg portion S1 folded back by the contact member 24 passes through the downward direction Z2 with respect to the first portion S1B, and is bent to intersect the first portion S1B in the top view: As illustrated in FIG. 14 corresponding to a sectional view at the position where the first portion S1B intersects the tip end portion S1A, the tip end portion S1A can be plastically deformed such that the first portion S1B (the upward direction) and the tip end portion S1A (the downward direction) are vertically adjacent to each other. At this time, the tip end of the contact member 24 and the tip end of the second leg portion S2 are formed in the first inner wall portion 64, and enter the inside of the through hole communicating with the region surrounded by the staple S in the top view: As illustrated in FIGS. 24A and 24B, since the first portion S1B is surrounded by the slider 44 and the first inner wall portion 64 from the upward direction, the downward direction (excluding the portions through which the folded-back tip end portion S1A and the contact member 24 pass), and the inward direction, the bending thereof is restrained.

According to the above process, the first leg portion S1 sandwiches the first object G. Since the first leg portion S1 is plastically deformed, the first leg portion S1 and the first object G are not easily disengaged from each other.

On the other hand, the second rear end surface 32B2 of the second arm 32 further rotates in the first rotation direction R1 by being pushed by the second surface 44A22 of the second front end portion 44A2 of the slider 44. Therefore, the second leg portion S2 approaches the second object P beyond the first object G in the top view.

Thereafter, the motor 54 rotates the ball screw 50 counterclockwise, and thus the slider 44 starts retracting.

Figure 25A:
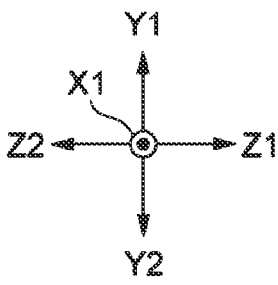
FIG. 25A is a partially enlarged view and an enlarged perspective view of the front end portion of the binding machine in the front view after the slider starts retracting.
Figure 25B:
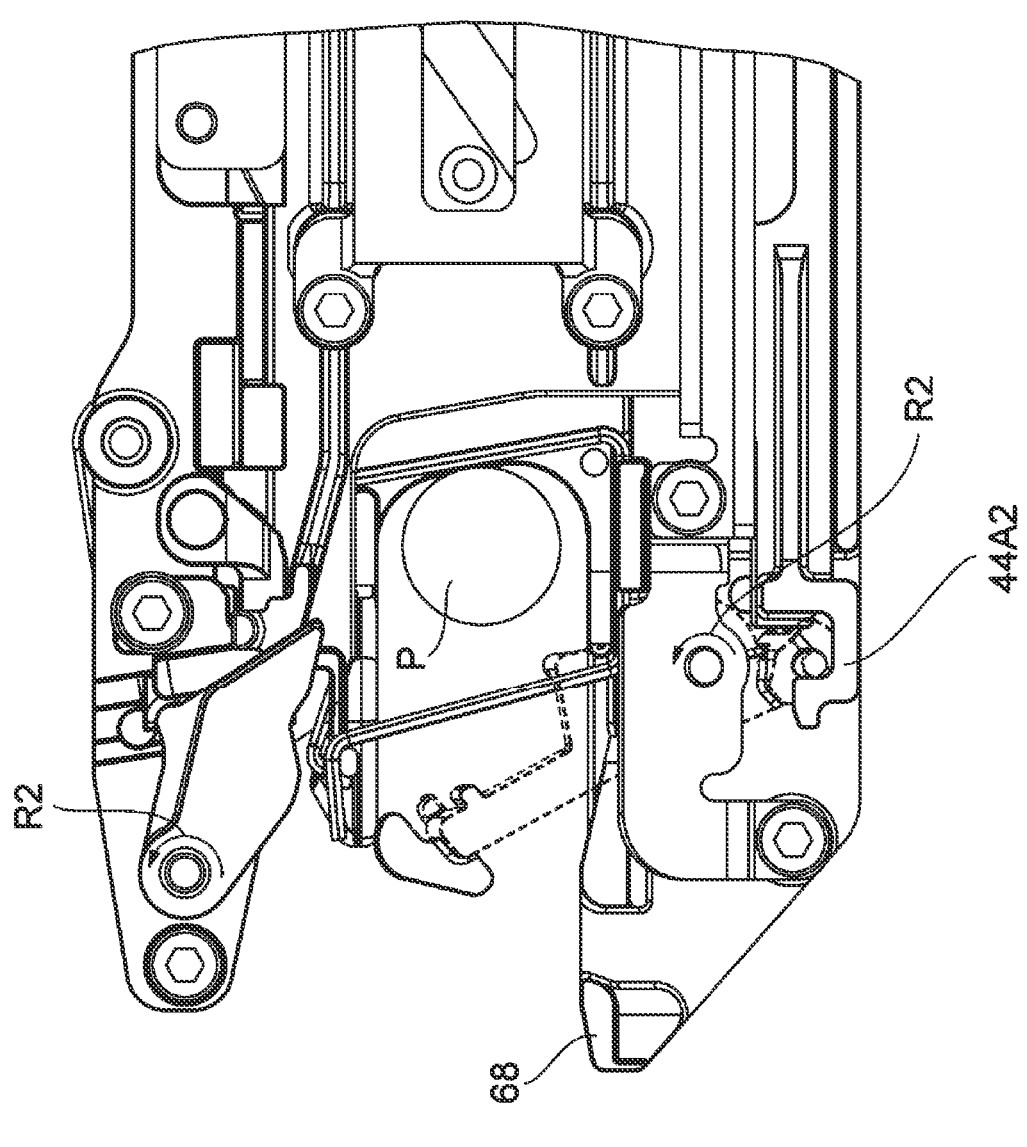
FIG. 25B is a partially enlarged view and an enlarged perspective view of the front end portion of the binding machine in the top view after the slider starts retracting.
Figure 25B:
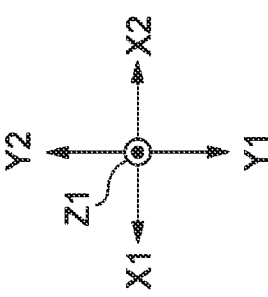

FIGS. 25A, 25B, and 25C are partially enlarged views and a partially enlarged perspective view of the front end portion of the binding machine 10 in the front view and the top view after the slider 44 starts retracting.

When the slider 44 starts retracting, the second protruded portion 44A12 of the first front end portion 44A1 of the slider 44 comes into contact with the surface facing the forward direction X1 of the wall portion of the first arm 22 and pushes the wall portion in the rearward direction X2, the wall portion of the first arm 22 moves to penetrate through the region between the first protruded portion 44A11 and the second protruded portion 44A12, and thus the first arm 22 is rotated in the second rotation direction R2.

Further, the third surface of the second front end portion 44A2 of the slider 44 comes into contact with the rear end portion of the second arm 32 and pushes the second arm 32 in the rearward direction X2, and thus the second arm 32 is rotated in the second rotation direction R2. When the second arm 32 rotates in a second rotation direction R2, the protrusion 32C2 for bending back of the second arm 32, which is provided to protrude in the downward direction Z2 at the position advanced in the first rotation direction R1 with respect to the main body portion, comes into contact with the second leg portion S2 and pushes the second leg portion S2 in the second rotation direction R2. Therefore, the second leg portion S2 is displaced in the second rotation direction R2, and as a result, the bent portion of the second leg portion S2 is engaged with the first object G. As illustrated in FIG. 25A, the second leg portion S2 is engaged with the first object G, and thus the first object G is displaced, and the tension is generated between the engagement position of the first leg portion S1 and the first object G and the engagement position of the second leg portion S2 and the second object P. Therefore, the first object G is bent, and it is possible to restrain the first object G and the second leg portion S2 from being disengaged from each other.

Figure 26B:
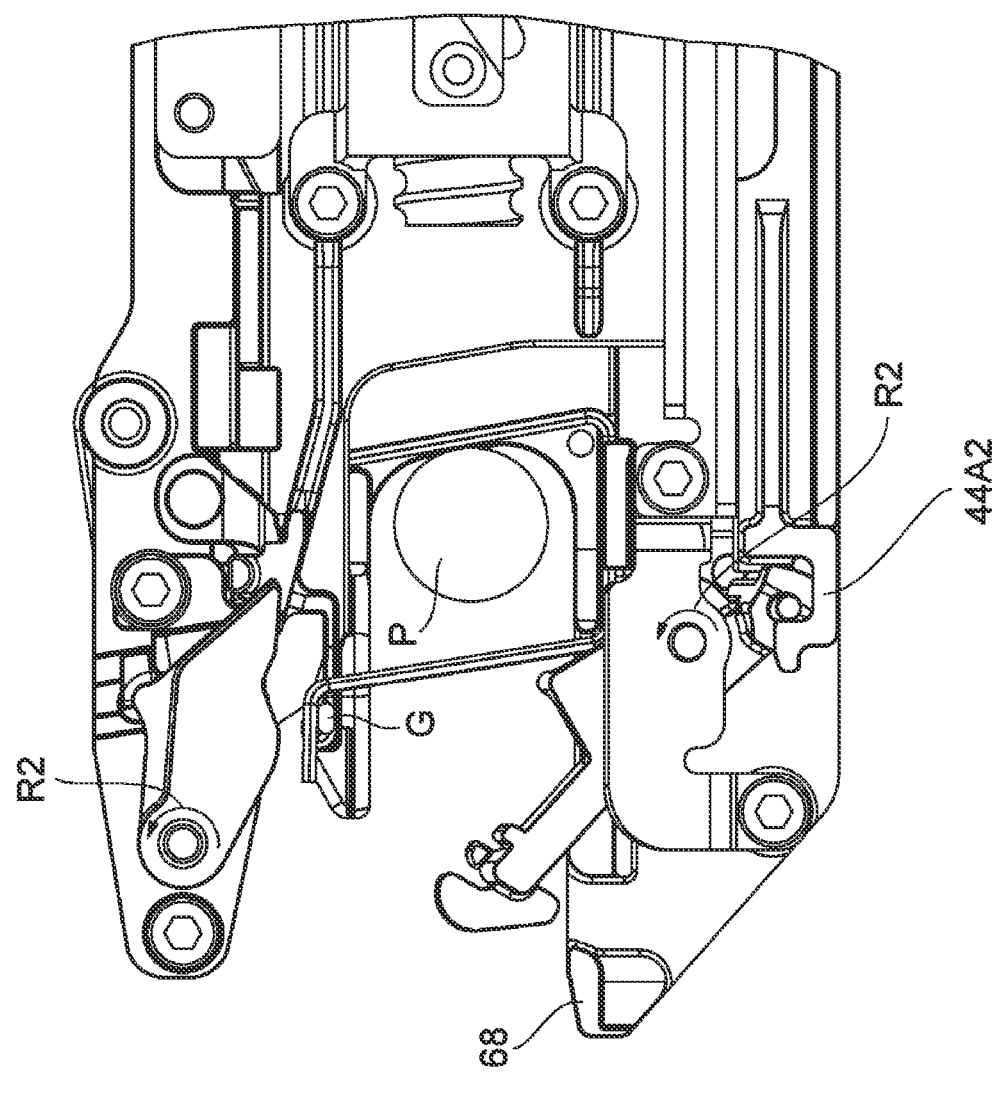
FIG. 26B is a partially enlarged view and an enlarged perspective view of the front end portion of the binding machine in the top view when the slider further retracts.

FIGS. 26A. 26B, and 26C are partially enlarged views and a partially enlarged perspective view of the front end portion of the binding machine 10 in the front view and the top view when the slider 44 further retracts.

The second protruded portion 44A12 of the first front end portion 44A1 of the slider 44 pushes the surface of the wall portion of the first arm 22 facing the forward direction X1 in the rearward direction X2 while being in contact with the surface, the wall portion of the first arm 22 moves to penetrate through the region between the first protruded portion 44A11 and the second protruded portion 44A12, and thus the first arm 22 is further rotated in the second rotation direction R2.

When the first arm 22 further rotates in the second rotation direction R2 and rotates to an initial position illustrated in FIG. 21B from this state, the ball member biased by the elastic member is fitted in the recessed portion provided in the lower surface of the first arm 22. Therefore, the first arm 22 is held at the initial position.

Figure 26C:
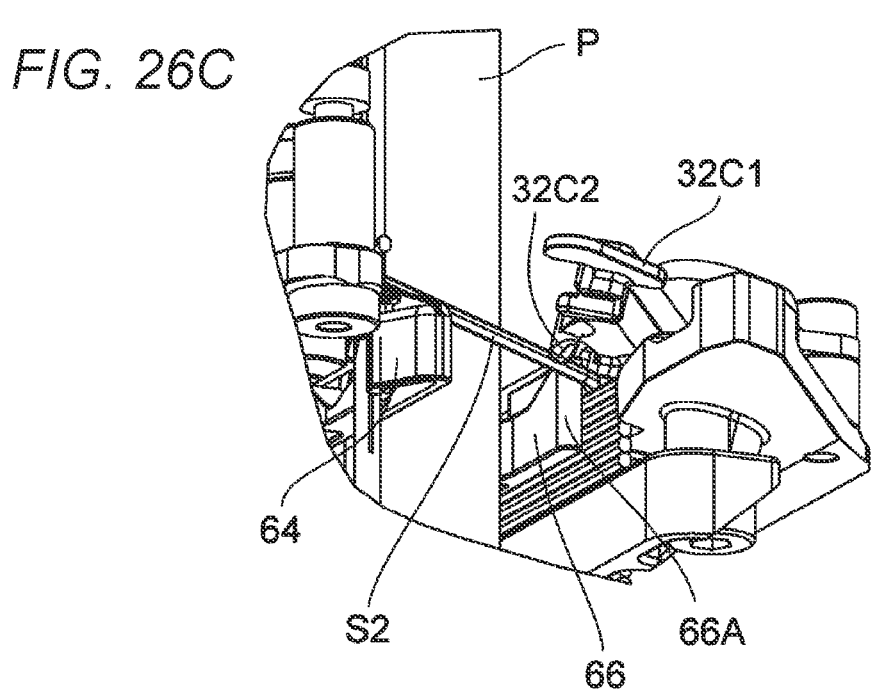
FIG. 26C is a partially enlarged perspective view of the front end portion of the binding machine when the slider further retracts.

The third surface of the second front end portion 44A2 of the slider 44 pushes the surface of the rear end portion of the second arm 32 facing the forward direction X1 in the rearward direction X2 while being in contact with the surface, and thus the second arm 32 is further rotated in the second rotation direction R2. Since the second leg portion S2 is engaged with the first object G. the protrusion 32C2 for bending back of the second arm 32 cannot further displace the second leg portion S2 in the second rotation direction R2. Therefore, the protrusion 32C2 for bending back of the second arm 32 moves over the second leg portion S2 while slightly pushing down the second leg portion S2 in the downward direction Z2. As illustrated in FIG. 26C, the binding machine 10 has a configuration in which the biasing force toward the upward direction Z1 by the pusher 16 is applied to the staple S via the staple S in the downward direction Z2, and thus the protrusion 32C2 for bending back moves over the second leg portion S2 against the biasing force.

When the second arm 32 further rotates in the second rotation direction R2 and rotates to the initial position illustrated in FIG. 21B from this state, the ball member biased by the elastic member is fitted in a recessed portion provided in a lower surface of the second arm 32. Therefore, the second arm 32 is held at the initial position.

After the binding operation ends, when the motor 54 rotates the ball screw 50 counterclockwise, the second claw portion 48C2 of the switching block 48 moves in the downward direction Z2 while moving in the rearward direction X2 along the inclined surface of the second protrusion 46A2 provided on the base 46, and thus the first claw portion 48C1. the second claw portion 48C2, and the third claw portion 48C3 of the switching block 48 are respectively inserted into the regions inside the first groove 42G1, the second groove 42G2, and the third groove 42G3. At this time, the first arm 22 and the second arm 32 approximately return to positions in the initial state. In addition, when the motor 54 rotates the ball screw 50 counterclockwise, the switching block 48 moves in the rearward direction X2, and a rear surface of the second claw portion 48C2 of the switching block 48 comes into contact with a side surface of the second groove 42G2 facing the forward direction X1. Therefore, the switching block 48 moves the driver 42 in the rearward direction X2 by the rear surface of the second claw portion 48C2 while pressing the surface of the base 46 in the downward direction Z2 by the elastic member 49. Therefore, the driver 42 can be returned to the initial state.

According to the above process, the second leg portion S2 is engaged with the first object G. As described above, since the second leg portion S2 is engaged with the first object G in a state where the second leg portion S2 has passed (penetrated) through the gap between the first object G and the second object P in the top view; the second object P is surrounded by the staple S. Therefore, the second object P and the staple S are restrained from being easily disengaged from each other. Further, even when the second object P grows and the second leg portion S2 is bent, the engagement with the first object G is strengthened, and thus the first object G and the staple S are also restrained from being easily disengaged from each other.

However, the binding machine 10 according to the present embodiment can be modified. For example, the first displacement portion 20 may be configured to plastically deform the tip end portion S1A of the first leg portion S1 by the first arm 22 without using the contact member 24. For example, a part obtained by integrating the first arm 22 and the contact member 24 may be provided, and the tip end portion S1A of the first leg portion S1 may be plastically deformed by rotating the part. At this time, by providing the first arm 22 such that the rotation shaft 22AX of the first arm 22 is inclined and the first arm 22 descends as rotating in the first rotation direction R1, the first arm 22 may have a configuration in which the tip end portion passes under the first portion S1B. On the contrary, by providing the first arm 22 such that the first arm 22 rises as rotating in the first rotation direction R1, the first arm 22 may have a configuration in which the tip end portion passes above the first portion S1B. For example, the tip end portion S1A of the first leg portion S1 folded back by the contact member 24 may pass through the upward direction Z1 with respect to the first portion S1B and may be bent to intersect the first portion S1B in the top view: On the other hand, the second leg portion S2 may be bent to advance in the downward direction Z2 separated from the plane PL penetrating through the second leg portion S2 and the main body portion S3.

Further, various modifications can be made without departing from the gist of the present invention. For example, it is possible to add other known configurations to a part of constituent elements of an embodiment within the scope of the ordinary creativity of a person skilled in the art. In addition, a part of constituent elements of an embodiment may be replaced with other known configurations. The constituent elements disclosed in the present application can be reasonably combined or replaced with other known constituent elements by the exhibition of the ordinary creativity of a person skilled in the art.

The invention according to the present application can be implemented as a binding machine or a binding method described as the following notes in addition to the first embodiment described above.

That is, the present application further discloses binding machines described below:

Note 1

A binding machine for binding a first object and a second object by using a staple that includes a first leg portion, a second leg portion, and a main body portion connecting the first leg portion and the second leg portion, and that has an opening formed between the first leg portion and the second leg portion, a tip end portion of the first leg portion being bent in an outward direction, the binding machine includes:
a movement portion including a driver configured to move in a forward direction so as to move the staple in the forward direction:
a first displacement portion including a first outer wall portion through which a tip end portion of the first leg portion passes while coming into contact therewith when the staple moves in the forward direction by the driver, and configured to displace the first leg portion so as to be engageable with the first object; and
a second displacement portion configured to displace the second leg portion so as to surround the second object by using the first leg portion, the second leg portion, and the main body portion, and to be engageable with the first object.

Note 1A

A binding machine described in the present application and to which the present configuration is applicable includes the binding machine according to Note 1, in the binding machine according to Note 1,
the first displacement portion includes a first inner wall portion provided inside the first leg portion when the staple moves in the forward direction by the driver, and
a gap between the first outer wall portion and the first inner wall portion reduces as advancing in the forward direction.

Note 1A1

The binding machine described in the present application and to which the present configuration is applicable includes the binding machine according to Note 1A, in the binding machine according to Note 1A,
the first outer wall portion includes
a first region where the gap with the first inner wall portion reduces at a first reduction rate, and
a second region provided in the forward direction with respect to the first region and where the gap with the first inner wall portion reduces at a second reduction rate smaller than the first reduction rate.

Note 2

A binding machine for binding a first object and a second object by using a staple that includes a first leg portion, a second leg portion, and a main body portion connecting the first leg portion and the second leg portion, and that has an opening formed between the first leg portion and the second leg portion, the binding machine includes:
a first displacement portion including a movement portion including a slider configured to move in a forward direction, and a first arm configured to be pushed by a first front end portion of the slider moving in the forward direction so as to rotate, and configured to engage the first leg portion with the first object by using the first arm: and a second displacement portion including a second arm configured to be pushed by a second front end portion of the slider moving in the forward direction so as to rotate, and a wall portion provided inside the second leg portion of the staple and through which a tip end portion of the second leg portion passes while coming into contact therewith, the tip end portion of the second leg portion being displaced in an inward direction of the staple by the rotation of the second arm.

Note 2A

The binding machine described in the present application and to which the present configuration is applicable includes the binding machine according to Note 2, in the binding machine according to Note 2, the second displacement portion is configured to displace the second leg portion in the inward direction by the rotation of the second arm, and is configured to bend the tip end portion of the second leg portion in an outward direction at the same time by bringing the tip end portion of the second leg portion into contact with the wall portion and passing through the wall portion, and then the first displacement portion is configured to bend a tip end portion of the first leg portion in the inward direction of the staple by a contact member advancing in the inward direction of the staple by the rotation of the first arm in a first rotation direction.

Note 2B

The binding machine described in the present application and to which the present configuration is applicable includes the binding machine according to Note 2 or 2A, in the binding machine according to Note 2 or 2A, the second arm is configured to be pushed by the second front end portion of the slider moving in the forward direction and is configured to rotate in the first rotation direction, and the second arm has a rotation shaft inclined so that a front end of the second arm moves in an upward direction as the second arm rotates in the first rotation direction.

Note 2C

The binding machine described in the present application and to which the present configuration is applicable includes the binding machine according to any one of Notes 2 to 2B, in the binding machine according to any one of Notes 2 to 2B, the contact member of the first displacement portion is configured to bend the tip end portion of the first leg portion to pass under the first leg portion.

Note 3

A binding machine for binding a first object and a second object by using a staple that includes a first leg portion, a second leg portion, and a main body portion connecting the first leg portion and the second leg portion, and that has an opening formed between the first leg portion and the second leg portion, the binding machine includes:

a movement portion including a driver and a slider, and configured to execute a first moving operation in which the driver and the slider move in a forward direction, and a second moving operation in which of the driver and the slider moving in the forward direction by the first moving operation, the slider further moves in the forward direction:

a first displacement portion configured to displace the first leg portion so as to be engageable with the first object by a first front end portion of the slider moving in the forward direction by the second moving operation; and a second displacement portion configured to displace, by a second front end portion of the slider moving in the forward direction by the second moving operation, the second leg portion so as to surround the second object by the first leg portion, the second leg portion, and the main body portion, and to be engageable with the first object.

Note 3A

The binding machine described in the present application and to which the present configuration is applicable includes the binding machine according to Note 3, in the binding machine according to Note 3, in the first moving operation, the driver is configured to separate the staple connected to another staple from the other staple by moving the staple in the forward direction.

Note 3B

The binding machine described in the present application and to which the present configuration is applicable includes the binding machine according to Note 3 or 3A, in the binding machine according to Note 3 or 3A, in the first moving operation, the driver is configured to displace a tip end portion of the first leg portion by moving the staple in the forward direction and bringing the tip end portion of the first leg portion into contact with a first outer wall portion included in the first displacement portion.

Note 4A

A binding machine includes:

a driver for separating one staple from another staple:

a slider configured to move in a forward direction:

a first displacement portion including a first arm configured to rotate in a first rotation direction by the slider moving in the forward direction; and a second displacement portion including a second arm configured to rotate in the first rotation direction by the slider moving in the forward direction.

Note 4B

A binding machine includes:

a driver for separating one staple from another staple:

a slider configured to move in a forward direction:

a first displacement portion including a first arm configured to rotate in a first rotation direction by the slider moving in the forward direction; and a second displacement portion including a second arm configured to rotate in a direction different from the first rotation direction by the slider moving in the forward direction.

Note 4C

In the binding machine according to Note 4A or 4B, the binding machine is configured to execute a first moving operation in which the driver and the slider move, and a second moving operation in which of the driver and the slider, only the slider moves.

Note 5

A binding machine for binding a first object and a second object by using a staple that includes a first leg portion, a second leg portion, and a main body portion connecting the first leg portion and the second leg portion, and that has an opening formed between the first leg portion and the second leg portion, the binding machine includes:

a movement portion including a driver configured to move in a forward direction so as to move the staple in the forward direction, and a slider configured to move in the forward direction:

a first displacement portion including a first arm configured to be pushed by a first front end portion of the slider moving in the forward direction so as to rotate, and configured to engage the first leg portion with the first object by using the first arm; and a second displacement portion including a second arm configured to be pushed by a second front end portion of the slider moving in the forward direction so as to rotate, and configured to engage the second leg portion with the first object by using the second arm.

Note 5A1

The binding machine described in the present application and to which the present configuration is applicable includes the binding machine according to Note 1, the binding machine according to Note 1 further including:

a motor; and a ball screw configured to be rotated by the motor, in which the movement portion includes a nut part formed with a female screw screwed with the ball screw and configured to move in the forward direction integrally with the slider by the rotation of the female screw.

Note 5A2

The binding machine described in the present application and to which the present configuration is applicable includes the binding machine according to Note 5A1, the binding machine according to Note 5A1 including:

a base on which the driver is placed:

a block held by the nut part: and an elastic member disposed between the nut part and the block and pressing the block against a surface of the base, in which the driver is configured to move in the forward direction by bringing a front surface of the block into contact with a side surface of the driver.

Note 5A3

The binding machine described in the present application and to which the present configuration is applicable includes the binding machine according to Note 5A1, in the binding machine according to Note 5A1, the driver is configured to move in the forward direction by forming, in the driver, a groove extending in a front-rear direction and exposing a surface of the base, and by bringing the front surface of the block into contact with a side surface of the groove formed in the driver.

Note 5A4

The binding machine described in the present application and to which the present configuration is applicable includes the binding machine according to Note 1A2, in the binding machine according to Note 1A2, the base includes a protrusion that is configured to move the front surface of the block advancing in the forward direction in an upward direction with respect to the side surface of the groove formed in the driver with which the front surface is in contact.

Note 5A5

The binding machine described in the present application and to which the present configuration is applicable includes the binding machine according to any one of Notes 5A1 to 5A4, in the binding machine according to any one of Notes 5A1 to 5A4, a second groove extending in the front-rear direction and exposing the surface of the base is formed in the driver, and the driver is configured to move in a rearward direction by bringing a rear surface of the block into contact with a side surface of the second groove of the driver.

Note 5A6

The binding machine described in the present application and to which the present configuration is applicable includes the binding machine according to Note 5A5, in the binding machine according to Note 5A5, the base includes a second protrusion that is configured to move the rear surface of the block advancing in the rearward direction in the upward direction with respect to the side surface of the second groove of the driver with which the rear surface is in contact.

Note 5A7

The binding machine described in the present application and to which the present configuration is applicable includes the binding machine according to Note 5A5 or 5A6, in the binding machine according to Note 5A5 or 5A6, the block includes a first claw portion provided with the front surface configured to be in contact with the side surface of the groove, and a second claw portion provided with the rear surface configured to be in contact with the side surface of the second groove.

Note 5B1

The binding machine described in the present application and to which the present configuration is applicable includes the binding machine according to Note 5, in the binding machine according to Note 5, the second arm is configured to be pushed by the second front end portion of the slider moving in the forward direction and is configured to rotate in a first rotation direction, and the second arm has a rotation shaft inclined so that a front end of the second arm moves in an upward direction as the second arm rotates in the first rotation direction.

Note 5B2

The binding machine described in the present application and to which the present configuration is applicable includes the binding machine according to Note 5 or 5B1, in the binding machine according to Note 5 or 5B1, the second arm includes a rear end portion extending in a rearward direction with respect to the rotation shaft of the second arm in a state before rotation, and the rear end portion of the second arm includes a first rear end surface with which a first surface of the second front end portion of the slider moving in the forward direction is in contact, and formed at a position separated from the rotation shaft of the arm by a first distance, and a second rear end surface with which a second surface of the second front end portion of the slider further moving in the forward direction is in contact, and formed at a position separated from the rotation shaft of the arm by a second distance smaller than the first distance.

Note 5B3

The binding machine described in the present application and to which the present configuration is applicable includes the binding machine according to Note 5B2, in the binding machine according to Note 5B2, the second surface of the slider configured to be in contact with the second rear end surface of the second arm is formed in the forward direction with respect to the first surface of the slider configured to be in contact with the first rear end surface of the arm.

Note 5B4

The binding machine described in the present application and to which the present configuration is applicable includes the binding machine according to Note 5B2 or 5B3, in the binding machine according to Note 5B2 or 5B3, in a top view, a first angle formed by a normal line of the first rear end surface at a first contact point in contact with the first surface of the slider and a straight line connecting the first contact point and the rotation shaft is closer to 90 degrees than a second angle formed by a normal line of the second rear end surface at a second contact point in contact with the second surface of the slider and a straight line connecting the second contact point and the rotation shaft.

Note 5B5

The binding machine described in the present application and to which the present configuration is applicable includes the binding machine according to any one of Notes 5 to 5B4, in the binding machine according to any one of Notes 5 to 5B4, the second displacement portion includes a wall portion provided inside the second leg portion of the staple moving in the forward direction by the driver and through which a tip end portion of the second leg portion passes while being in contact therewith, the tip end portion of the second leg portion being displaced in an inward direction of the staple by the rotation of the second arm.

Note 5B6

The binding machine described in the present application and to which the present configuration is applicable includes the binding machine according to Note 5B5, in the binding machine according to Note 5B5, a period in which the tip end portion of the second leg portion of the staple and the wall portion are in contact with each other and a period in which the first surface of the second front end portion of the slider and the first rear end surface of the second arm are in contact with each other, overlap with each other in at least a partial period.

Note 5B7

The binding machine described in the present application and to which the present configuration is applicable includes the binding machine according to Note 5B5 or 5B6, in the binding machine according to Note 5B5 or 5B6, after the period in which the tip end portion of the second leg portion of the staple and the wall portion are in contact with each other, the contact between the second surface of the second front end portion of the slider and the second rear end surface of the second arm is started.

Note 5B8

The binding machine described in the present application and to which the present configuration is applicable includes the binding machine according to Note 5B2 or any one of Notes 5B3 to 5B7 based on Note 5B2, in the binding machine according to Note 5B2 or any one of Notes 5B3 to 5B7 based on Note 5B2, the second front end portion of the slider includes a third surface provided in the forward direction with respect to the first surface and the second surface and formed to face the rearward direction, and the second arm is configured to rotate in a second rotation direction opposite to the first rotation direction, which is a direction in which the second arm is rotated by the slider moving in the forward direction, by being pushed by the third surface of the slider moving in the rearward direction.

Note 5B9

The binding machine described in the present application and to which the present configuration is applicable includes the binding machine according to any one of Notes 5, 5B1 to 5B8, in the binding machine according to any one of Notes 5, 5B1 to 5B8, the second arm includes a main body portion that comes into contact with the second leg portion of the staple to displace the second leg portion in the first rotation direction when the second arm rotates in the first rotation direction by the slider moving in the forward direction: and a protrusion provided at a position advanced in the first rotation direction with respect to the main body portion, and protruding in a downward direction in order to come into contact with the second leg portion of the staple to displace the second leg portion in the second rotation direction opposite to first rotation direction when the second arm rotates in the second rotation direction by the slider moving in the rearward direction.

Note 5C1

The binding machine described in the present application and to which the present configuration is applicable includes the binding machine according to Note 5, in the binding machine according to Note 5, the first front end portion of the slider includes a first protruded portion that protrudes in an upward direction in order to rotate the first arm in a first rotation direction by coming into contact with the first arm while moving in the forward direction.

Note 5C2

The binding machine described in the present application and to which the present configuration is applicable includes the binding machine according to Note 5C1, in the binding machine according to Note 5C1, the first front end portion of the slider includes a second protruded portion that is configured to rotate the first arm in a second rotation direction opposite to the first rotation direction by coming into contact with the first arm while moving in a rearward direction.

Note 5C3

The binding machine described in the present application and to which the present configuration is applicable includes the binding machine according to Note 5C2, in the binding machine according to Note 5C2, the first arm includes a portion that is configured to move to pass through a region between the first protruded portion and the second protruded portion while rotating in the first rotation direction by being in contact with the first protruded portion moving in the forward direction.

Note 5C4

The binding machine described in the present application and to which the present configuration is applicable includes the binding machine according to any one of Notes 5, 5C1 to 5C3, in the binding machine according to any one of Notes 5, 5C1 to 5C3, the first displacement portion includes a contact member that is configured to advance in an inward direction of the staple by the rotation of the first arm in the first rotation direction.

Note 5C5

The binding machine described in the present application and to which the present configuration is applicable includes the binding machine according to any one of Notes 5, 5C1 to 5C4, in the binding machine according to any one of Notes 5, 5C1 to 5C4, the contact member is configured to advance in a direction approaching the second arm while advancing in a downward direction by the rotation of the first arm in the first rotation direction.

Second Embodiment

[Configuration of Staple]

First, a configuration of a staple S100 according to the present embodiment will be described. The staple S100 is formed of a plastic deformable wire material that has plasticity. The staple S100 may be referred to as a wire or a clip. The staple S100 includes, for example, a metal wire material or a metallic wire (including one whose surface is coated by using a plating process or a resin).

The staple S100 includes a first leg portion S110, a second leg portion S120, and a main body portion S130 connecting the first leg portion S110 and the second leg portion S120. In a state before binding, the first leg portion S110 and the second leg portion S120 of the staple S100 are separately provided, and thus an opening is provided between the first leg portion S110 and the second leg portion S120.

In addition, a direction from a closed portion of the main body portion S130 (a portion extending in a direction intersecting extending directions of the first leg portion S110 and the second leg portion S120 in order to connect the first leg portion S110 and the second leg portion S120) to the opening in the body portion S130 is referred to as the opening direction D1. When the staple S100 is set in a binding machine 100, the opening direction D1 of the staple S100 coincides with the forward direction X1, and coincides with a movement direction of the staple S100.

The main body portion S130 is a portion connecting the first leg portion S110 and the second leg portion S120, and surrounding the second object P such as a stem. As illustrated in FIG. 27B, in a bound state, the first leg portion S110 and the second leg portion S120 are engaged with the first object G which is the same guide element, and thus it is possible to dispose the second object P in a region surrounded by the main body portion S130, the first leg portion S110, and the second leg portion S120.

Figure 27A:
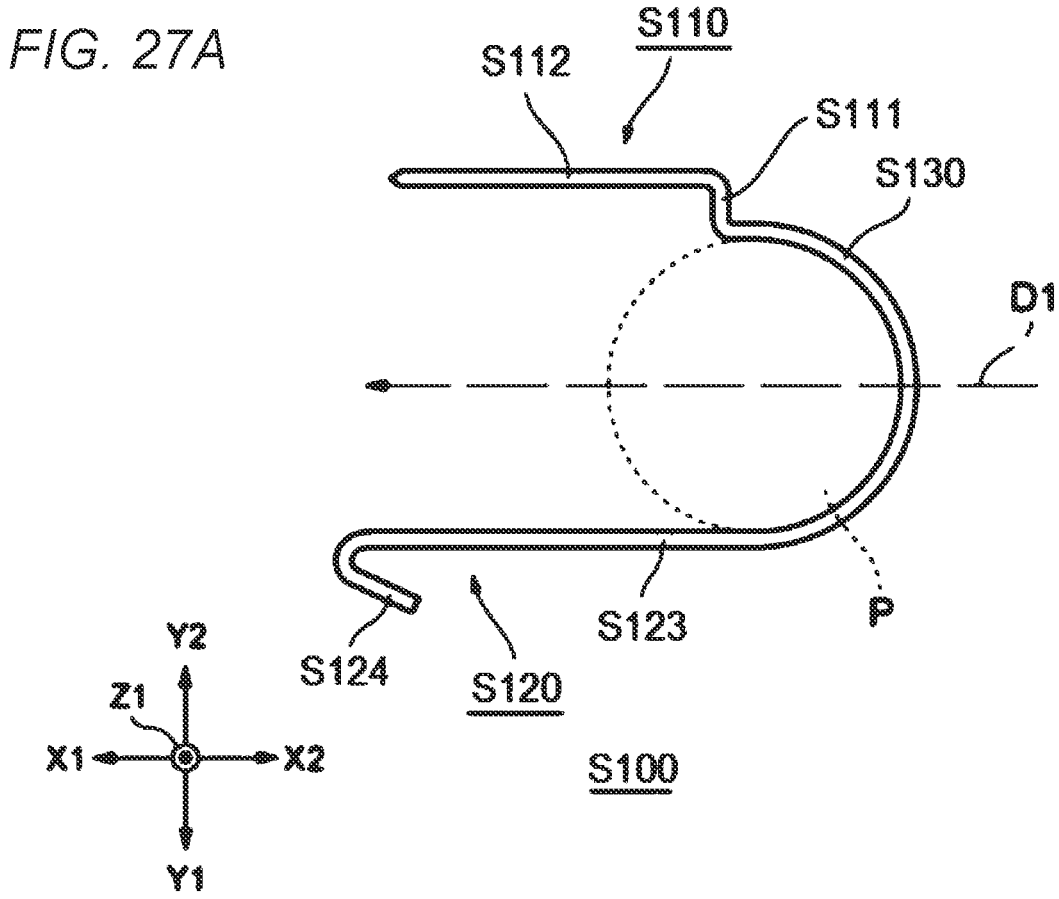
FIG. 27A is a diagram illustrating an example of the staple before the binding in a top view.
Figure 27B:
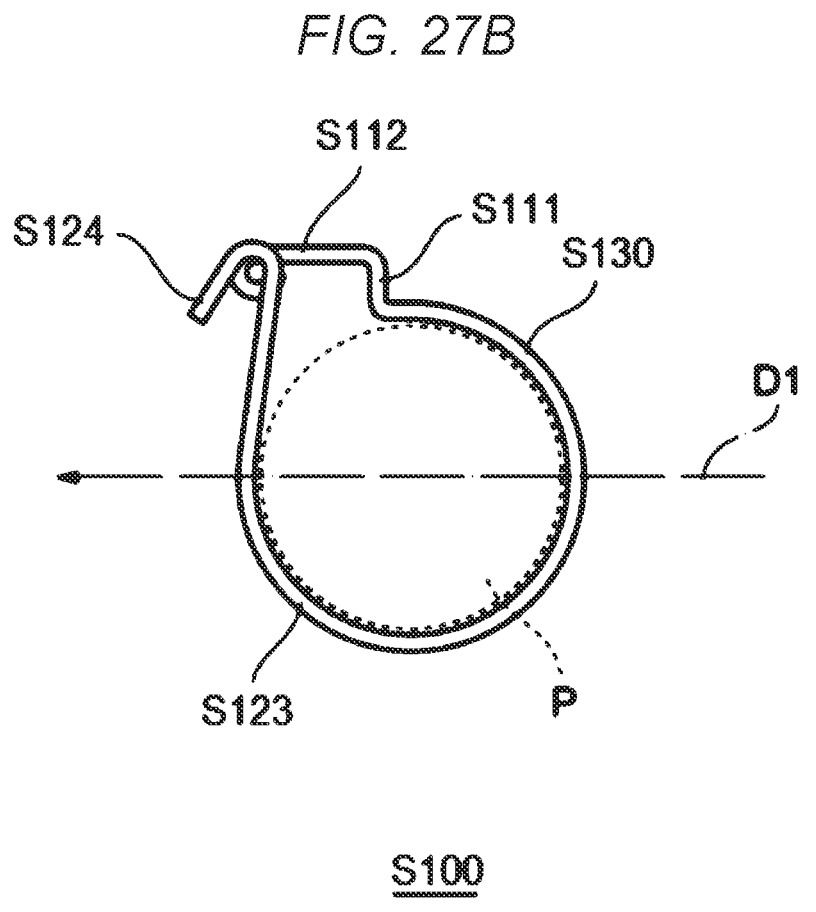

As long as the opening for disposing the second object P therein is provided, the main body portion S130 can be formed in various shapes such as a rectangle and a parallelogram in conformity with a shape of the second object P. As illustrated in FIG. 27A, the main body portion S130 according to the present embodiment is formed to be curved in a C-like shape or an arc shape so as to open in the leftward direction of the paper surface.

The first leg portion S110 and the second leg portion S120 are portions for being engaged with the first object G. As illustrated in FIG. 27A, the first leg portion S110 includes a first portion S111 that is connected to one end portion of the main body portion S130 and is bent and extends outward, and a second portion S112 that is further bent from the first portion S111 and extends in the opening direction D1. The first portion S111 connecting the main body portion S130 and the second portion S112 may be referred to as a crank portion.

The second leg portion S120 includes a third portion S123 that is connected to the other end portion of the main body portion S130 and extends in the opening direction D1, and a fourth portion S124 that is bent outward from a tip end portion of the third portion S123. The fourth portion S124 may be referred to as a hook portion or a tip end portion.

As illustrated in FIG. 27B, the third portion S123 is a portion that is bent to close the opening formed by the main body portion S130. In a state before bending, the third portion S123 extends in the opening direction D1, that is, extends substantially parallel to the second portion S112. Therefore, it is preferable that the third portion S123 is formed to be longer than a width of the opening formed by the main body portion, that is, a distance between the one end portion and the other end portion of the main body portion S130 and to be longer than the second portion S112. However, when an outer diameter of the first object G is large and when it is desired to increase the number of turns when the tip end portion of the first leg portion S110 is curved in a spiral shape (to be described later), the second portion S112 may be formed to be longer than the third portion S123.

The fourth portion S124 is a portion that is engaged with the first object G which is the guide element. The fourth portion S124 is bent in the outward direction from a tip end of the third portion S123. Since the third portion S123 has elasticity in a direction in which the closed opening is expanded and returns to an original position, the fourth portion S124 can apply tension to the first object G in the direction in which the opening is expanded, that is, a direction away from the first leg portion. Accordingly, it is possible to restrain the first object G from being bent and the staple S100 from falling off and the like.

As illustrated in FIG. 27B, a portion of the first leg portion S110 that is displaced to be engaged with the first object G may be, for example, with a radius of a maximum circle inscribed in the main body portion S130 (corresponding to a radius of the second object P in FIG. 27B) as a reference, a portion away from a tip end of the first leg portion S110 by a distance equal to or less than this radius (an example of the "first distance"). A portion of the second leg portion S120 that is displaced to be engaged with the first object G may be, for example, with the radius of the maximum circle inscribed in the main body portion S130 as a reference, a portion away from a tip end of the second leg portion S120 by a distance equal to or less than twice this radius (an example of the "second distance"). According to such a configuration, it is possible to close the opening by using the second leg portion S120.

A shape of the staple S100 is not limited to that illustrated in FIG. 27A. For example, it will be understood by a person skilled in the art that the first leg portion S110 and the second leg portion S120 are not necessarily parallel to each other, and for example, even when the width of the opening becomes narrower toward the tip end, or the width of the opening becomes wider toward the tip end, it is possible to bend the staple S100 such that at least a part of the technical effects described above is exhibited. In addition, it will be understood by a person skilled in the art that even when the first leg portion S110 and the second leg portion S120 have the same length, the tip end of the first leg portion S110 is surplus, but it is possible to bend the staple S100 such that at least a part of the technical effects described above is exhibited.

Further, the tip end portion of the second leg portion S120 may not be bent in advance as in the fourth portion S124. It will be understood by a person skilled in the art that even when the tip end portion of the second leg portion S120 is not bent in advance, the second leg portion S120 can be displaced so as to be engageable with the first object G by a second displacement portion 300, and thus at least a part of the technical effects described above is exhibited.

An example of the configuration of the binding machine 100 for bending the staple S100 illustrated in FIG. 27A as illustrated in FIG. 27B will be described below:

[Configuration of Binding Machine]

Hereinafter, the binding machine 100 according to the second embodiment will be described.

Figure 28:
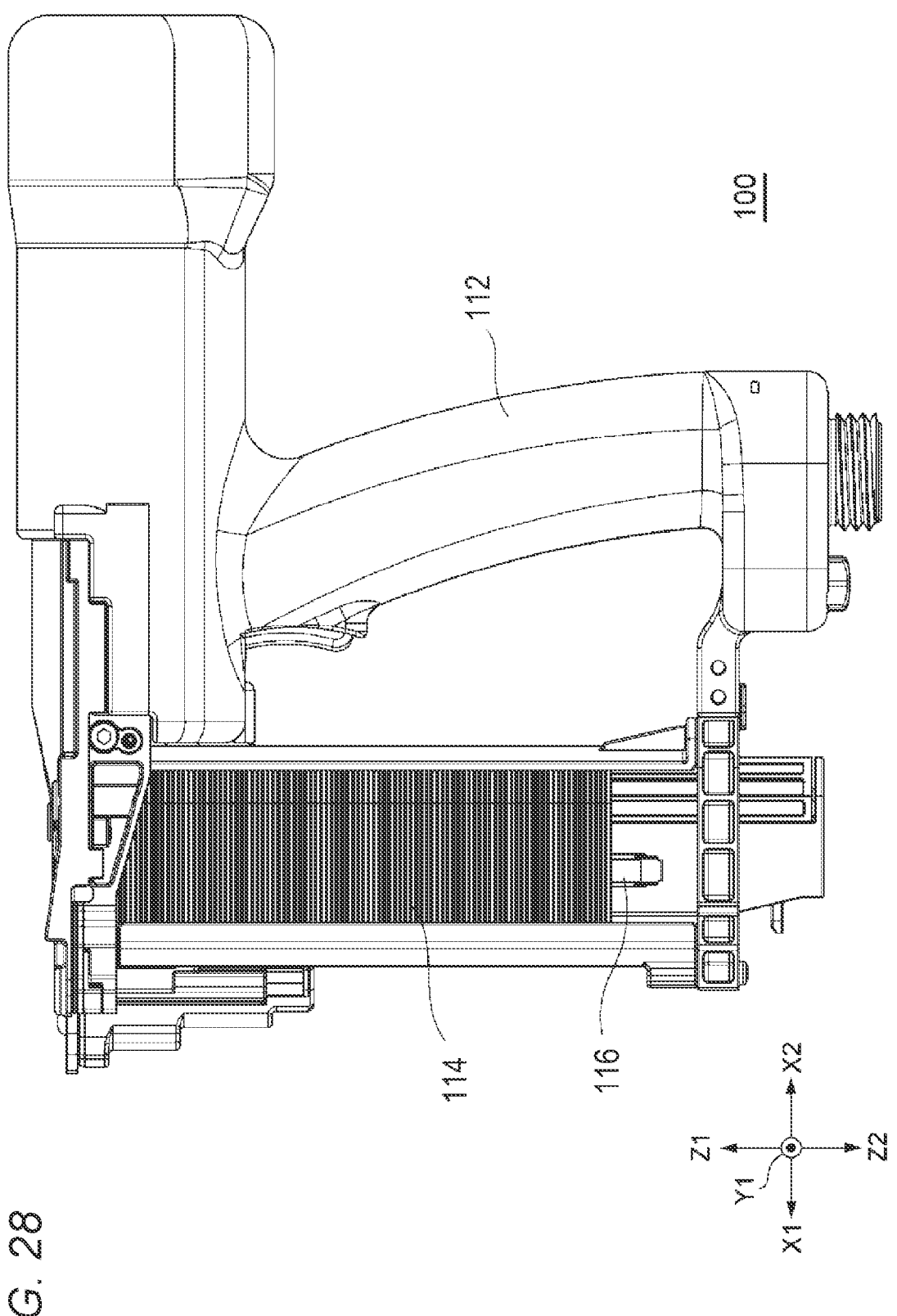
FIG. 28 is a right side view of a binding machine according to a second embodiment.

In order to describe a relation between relative directions, for the sake of convenience, a leftward direction of the paper surface in FIG. 28 may be referred to as the forward direction X1, a rightward direction of the paper surface may be referred to as the rearward direction X2, an upper direction of the paper surface may be referred to as the upward direction Z1, a lower direction of the paper surface may be referred to as the downward direction Z2, a near-side direction perpendicular to the paper surface may be referred to as the rightward direction Y1, and a far-side direction perpendicular to the paper surface may be referred to as the leftward direction Y2. The top view refers to the viewpoint when the binding machine 100 and the like is seen from a position at the upward direction Z1 toward the downward direction Z2, the front view refers to the viewpoint when the binding machine 100 and the like is seen from a position at the forward direction X1 toward the rearward direction X2, and the side view refers to the viewpoint when the binding machine 100 and the like is seen toward the rightward direction Y1 or the leftward direction Y2.

Further, when the staple S100 is set in the binding machine 100, a direction from a region surrounded by the staple S100 (a region into which the second object P to be described later is inserted) toward an outer side of the staple S100 may be referred to as an outward direction, and a direction from the outer side of the staple S100 toward the region surrounded by the staple S100 may be referred to as an inward direction with the staple S100 as a reference.

Figure 29:
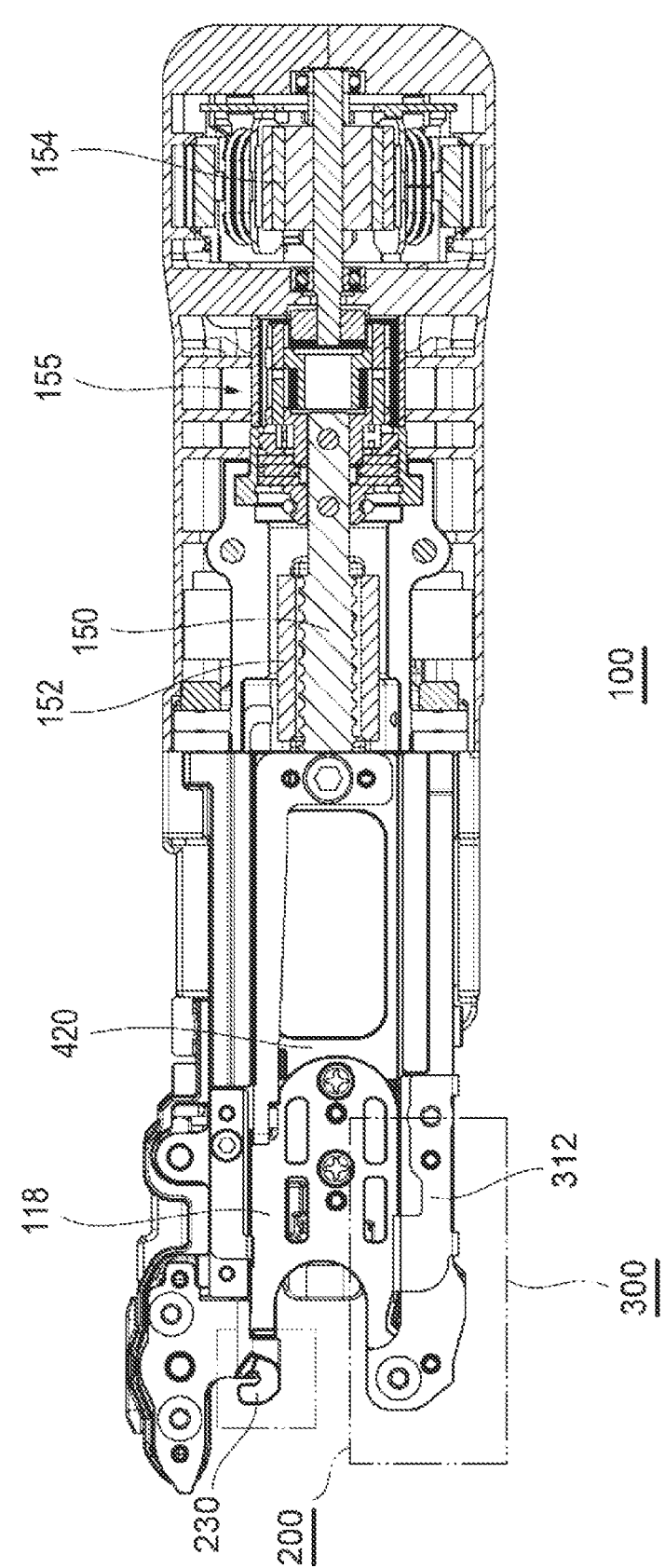
FIG. 29 is a sectional view of the binding machine according to the second embodiment in the top view.

FIG. 28 is a sectional view of the binding machine 100 in a right side view. FIG. 29 is a sectional view (a plan view) of the binding machine 100 in an initial state (a standby state) in the top view (However, for the sake of convenience, FIG. 29 is rotated by 90 degrees. Hereinafter, the drawings may be rotated in the same manner for the sake of convenience. Further, in order to make the description easier to understand, a part of the configuration may be omitted in the drawings.

[Schematic Configuration of Binding Machine 100]

The binding machine 100 binds the first object G and the second object P by using the staple S100 having the formed opening.

The first object G is, for example, a wire, a beam, a string, a rod, a pipe, a branch of a tree, or the like. The first object G may be referred to as a guide element. The second object P is, for example, a stem, a vine, a branch, a fruit of a plant, a tree, or the like. The second object P may grow, or may be deformed. The binding machine 100 restricts the movement of the second object P with respect to the first object G and binds the first object G and the second object P by displacing the first leg portion S110 of the staple S100 so as to engage with the first object G, and displacing the second leg portion S120 thereof so as to engage with the first object G such that the staple S100 surrounds the second object P.

The binding machine 100 includes a first displacement portion 200 that displaces the first leg portion S110 of the staple S100 so as to be engageable with the first object G, and the second displacement portion 300 that displaces the second leg portion S120 of the staple S100 so as to be engageable with the first object G. The second displacement portion 300 is configured to bind the first object G and the second object P by engaging the tip end portion S124 of the second leg portion S120 with the first object G in a state where the second object P is surrounded by the first leg portion S110, the second leg portion S120, and the main body portion S130 of the staple S100.

More specifically, the binding machine 100 includes a grip 112 extending in the up-down direction so as to be gripped by the user and provided with a switch for driving the binding machine 100, a magazine 114 (FIG. 28) configured to accommodate a plurality of the staples S100 stacked in the up-down direction, a pusher 116 for biasing the plurality of staples S100 accommodated in the magazine 114 toward the upward direction Z1, a driver 420 (FIG. 29) that pushes the staple S100 positioned at an upper end toward the forward direction X1 coinciding with the opening direction D1 to separate the staple S100 positioned at the upper end from another staple S100 and move the staple S100 in the forward direction X1, a movement mechanism for moving the driver 420, the first displacement portion 200 for displacing the first leg portion S110 of the staple S100 by curving or bending the first leg portion S110 (FIG. 29. The first displacement portion 200 may be referred to as a clincher portion.), the second displacement portion 300 (FIG. 29) for displacing the second leg portion S120 of the staple S100 by curving or bending the second leg portion S120, and a lid 170 for assisting the plastic deformation of the first leg portion S110 by the first displacement portion 200 by vertically moving according to the advance and retraction of the driver 420.

[Driver and Movement Mechanism for Driver]

The driver 420 of the binding machine 100 has a function of moving in the forward direction X1 to move the staple S100 in the forward direction. The driver 420 is configured to separate the staple S100 positioned at the upper end, which is connected to the another staple S100, from the another staple S100 by moving the staple S100 in the forward direction. The driver 420 is configured to plastically deform the first leg portion S110 by further moving the separated staple S100 in the forward direction X1 and bringing the first leg portion S110 into contact with the first displacement portion 200, and to plastically deform the second leg portion S120 by bringing the second leg portion S120 into contact with a first guiding wall 312 and a second guiding wall 320 (FIG. 35A and the like) included in the second displacement portion 300.

A nut part 152 (FIG. 29) of the binding machine 100 has a function of moving the driver 420 in the forward direction X1 and the rearward direction X2. The nut part 152 according to the present embodiment is formed with a female screw that is screwed to a male screw of a ball screw: 150 via a ball member (not shown). Therefore, the nut part 152 moves in the forward direction X1 when the ball screw: 150 rotates clockwise, and the nut part 152 moves in the rearward direction X2 when the ball screw 150 rotates counterclockwise. The nut part 152 is fixed to the driver 420.

The nut part 152 and the driver 420 are configured to move in the forward direction X1 and the rearward direction X2, and thus the nut part 152 and the driver 420 may be referred to as movement portions.

A motor 154 (FIG. 29) rotates the ball screw: 150. The motor 154 is provided at a rear end portion of the binding machine 100. The binding machine 100 may include a battery that is detachably provided, and the motor 154 may be configured to be rotationally driven by a power source of the battery. The binding machine 100 according to the present embodiment further includes a speed reducer 155 engaged with an output shaft of the motor 154, and the motor 154 increases a torque by the speed reducer 155 to rotate the ball screw 150. In addition, a printed wiring board on which a CPU corresponding to a control device for controlling the motor 154 is mounted, is mounted on the rear end portion of the binding machine 100.

The ball screw 150 (FIG. 29) is provided by extending a substantially central portion of the binding machine 100 in the front-rear direction. As described above, the ball screw 150 is formed with the male screw that is screwed to the female screw of the nut part 152 via the ball member (not shown).

The base supports the driver 420. The base includes a support surface that comes into contact with or faces a bottom surface of the driver 420 so as to support the driver 420 from the downward direction Z2, and a wall portion extending in the front-rear direction in order to come into contact with or face a left side surface of the driver 420 so as to support the driver 420 from the leftward direction Y2. Further, the base includes a wall portion extending in the front-rear direction in order to come into contact with or face a right end of the driver 420 so as to support the driver 420 from the rightward direction Y1. According to such a configuration, the base guides the driver 420 to move in the front-rear direction.

A separation block 118 (FIG. 29) separates the staple S100 positioned at the upper end from the staple S100 positioned in the downward direction Z2. The separation block 118 is configured to prohibit the movement of the staple S100 in the downward direction Z2 toward the forward direction X1 by being provided inside the staple S100 positioned in the downward direction Z2. A recessed portion for inserting the second object P is formed in a front end surface of the separation block 118. Therefore, the separation block 118 also functions as the second insertion portion into which the second object P is inserted.

According to the above configuration, when the motor 154 rotates the ball screw 150 clockwise, the nut part 152 and the driver 420 fixed to the nut part 152 move in the forward direction X1, and when the motor 154 rotates the ball screw 150 counterclockwise, the nut part 152 and the driver 420 fixed to the nut part 152 move in the rearward direction X2.

The binding machine 100 may further include a Hall sensor or other sensor for obtaining a rotation amount of the motor 154 in order to control a movement amount of the driver 420, the binding machine 100 may further include a magnet attached to the nut part 152 in order to detect and control the position of the nut part 152 in the front-rear direction, and a Hall sensor or other sensor for obtaining a position of the magnet attached to the nut part 152, and the control device is configured to control the motor 154 based on information obtained by these sensors.

The driver 420 (FIG. 29) is formed in a plate shape and includes a front end portion having a front end surface in contact with the main body portion S130 of the staple S100.

The front end surface of the driver 420 includes a flat surface that extends in the left-right direction in the top view in accordance with a shape of the crank portion S111 of the staple S100, a curved surface that is connected to the flat surface and is curved to be recessed in the rearward direction in the top view in conformity with a shape of the main body portion S130 of the staple S100, and a ceiling surface that covers upper surfaces of the main body portion S130 of the staple S100 and the crank portion S111. When the driver 420 advances, the curved surface comes into contact with the main body portion S130, and the flat surface comes into contact with the crank portion S111, and thus the crank portion S111 can be restrained from being bent. A portion where the flat surface being in contact with the crank portion S111 is provided may be referred to as a shoulder portion of the driver 420, and a portion where the curved surface being in contact with the main body portion S130 is provided may be referred to as a curved portion of the driver 420.

As described above, the binding machine 100 includes the motor 154, the control device for controlling the motor 154, the speed reducer 155 for increasing the torque of the motor 154, the ball screw 150 connected to the speed reducer 155, and the nut part 152 configured to move in the front-rear direction, which is a central axis direction of the ball screw: 150 by the clockwise rotation or the counterclockwise rotation of the ball screw 150, and the driver 420 is fixed to the nut part 152 by means such as bolt fixing. Therefore, the driver 420 is configured to move integrally with the nut part 152 in the front-rear direction.

[Crank Holding Mechanism]

Figure 30A:
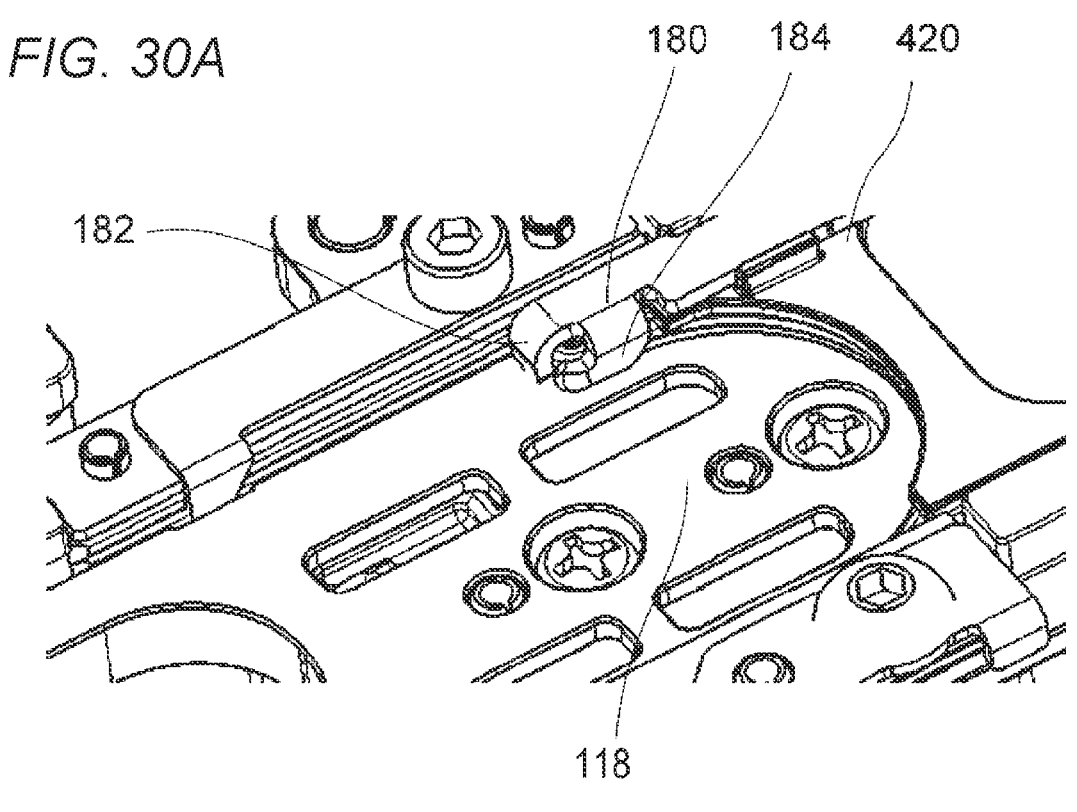
FIG. 30A is a perspective view of a crank holding mechanism according to the second embodiment.
Figure 30B:
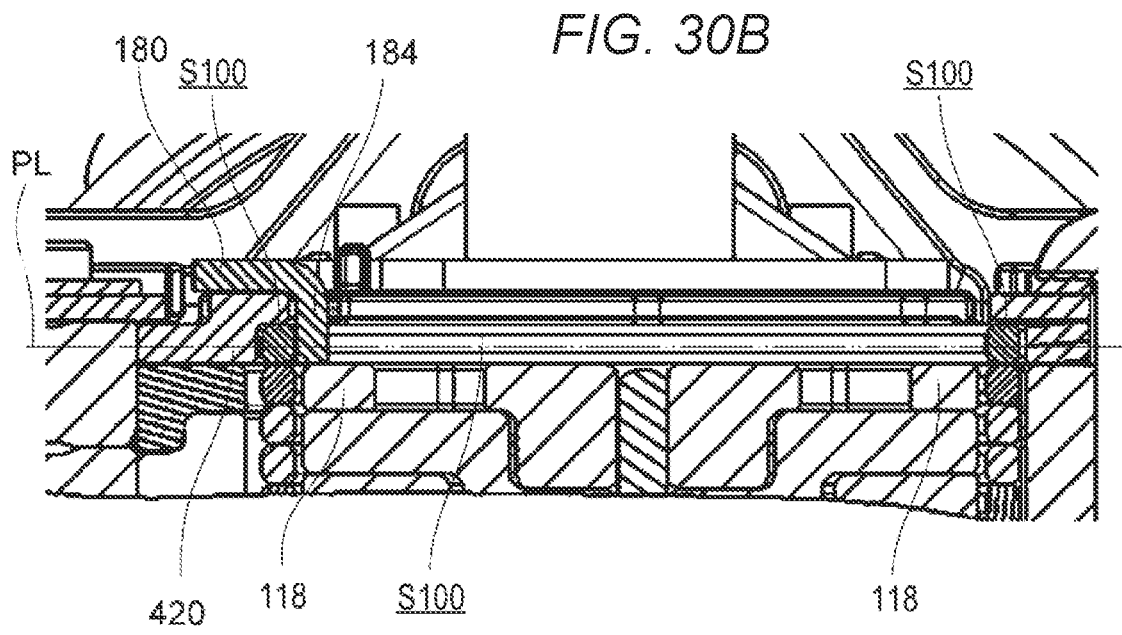
FIG. 30B is a vertical sectional view obtained by penetrating through a second holding mechanism of the crank holding mechanism according to the second embodiment in a front view.

The binding machine 100 may further include a crank holding mechanism 180 for restraining the bending of the crank portion S111 of the staple S100. FIG. 30A is a perspective view of the crank holding mechanism 180, and FIG. 30B is a vertical sectional view penetrating through a second holding portion 184 of the crank holding mechanism 180 in the front view:

The crank holding mechanism 180 includes a first holding portion 182 that supports the crank portion S111 of the staple S100 from the inward direction (the forward direction X1) of the staple S100, and the second holding portion 184 that supports the main body portion S130 connected to the crank portion S111 from the inward direction (the rightward direction Y1) of the staple S100. A surface of the first holding portion 182 facing the rearward direction comes into contact with a front surface of the crank portion S111 to support the crank portion S111. Since a rear surface of the crank portion S111 is in contact with the flat surface of the driver 420 facing the forward direction, it is possible to support the crank portion S111 of the staple S100 in a sandwiching manner from the outer side and the inner side of the staple S100 (from the front-rear direction).

On the other hand, a surface of the second holding portion 184 facing the outward direction (the leftward direction Y2) comes into contact with an inner side surface of the main body portion S130 of the staple S100 to support the main body portion S130. Since an outer side surface of the main body portion S130 comes into contact with the curved surface of the driver 420, it is possible to support the main body portion S130 in a sandwiching manner from the outer side and the inner side of the staple S100. In addition to the above configuration, it is possible to support the staple S100 from the up-down direction by the ceiling surface of the driver 420 and an upper surface of the separation block 118. Accordingly, it is possible to support the staple S100 from four directions, that is, the upward, downward, leftward, and rightward directions. Therefore, it is possible to advance the staple S100 while maintaining the shapes of the curved main body portion S130 and the crank portion S111 which is likely to bend by bending.

The crank holding mechanism 180 may be entirely or partially constituted by a biasing member. For example, when the crank holding mechanism 180 is constituted by an elastic member and is in a state of being biased in the rearward direction, it is possible to press the first holding portion 182 against the front surface of the crank portion S111 and support the crank portion S111.

Further, the binding machine 100 may include a mechanism for moving the crank holding mechanism 180 after the binding. For example, the binding machine 100 may include a mechanism in which the crank holding mechanism 180 is set to the state of being biased in the rearward direction, the upper surface of the separation block 118 in contact with the bottom surface of the crank holding mechanism 180 is inclined in the upward direction, and the advancing crank holding mechanism 180 moves in the upward direction along an inclined surface, and thus the engagement with the crank portion S111 of the staple S100 is automatically released.

The crank holding mechanism 180 may include only one of the first holding portion 182 and the second holding portion 184.

[First Displacement Portion]

The first displacement portion 200 has a function of displacing the first leg portion S110 so as to be engageable with the first object G.

The first displacement portion 200 according to the present embodiment includes a hole 210 formed with a cylindrical inner wall surface where the tip end portion of the first leg portion S110 advances in the downward direction while being curved in an arc shape or a spiral shape by the tip end of the second portion S112 of the first leg portion S110 of the staple S100 being inserted as the first displacement portion 200 advancing by the driver 420, and a groove portion 211 for guiding the tip end portion of the first leg portion S110 to the hole 210. Since the hole 210 is provided in the forward direction X1 with respect to the first leg portion S110, it is possible to bring the tip end of the second portion S112 into contact with the inner wall surface of the hole 210 by the advance of the staple S100, and displace the tip end of the second portion S112 in accordance with a shape of the inner wall surface.

Figures 31A, 31B:
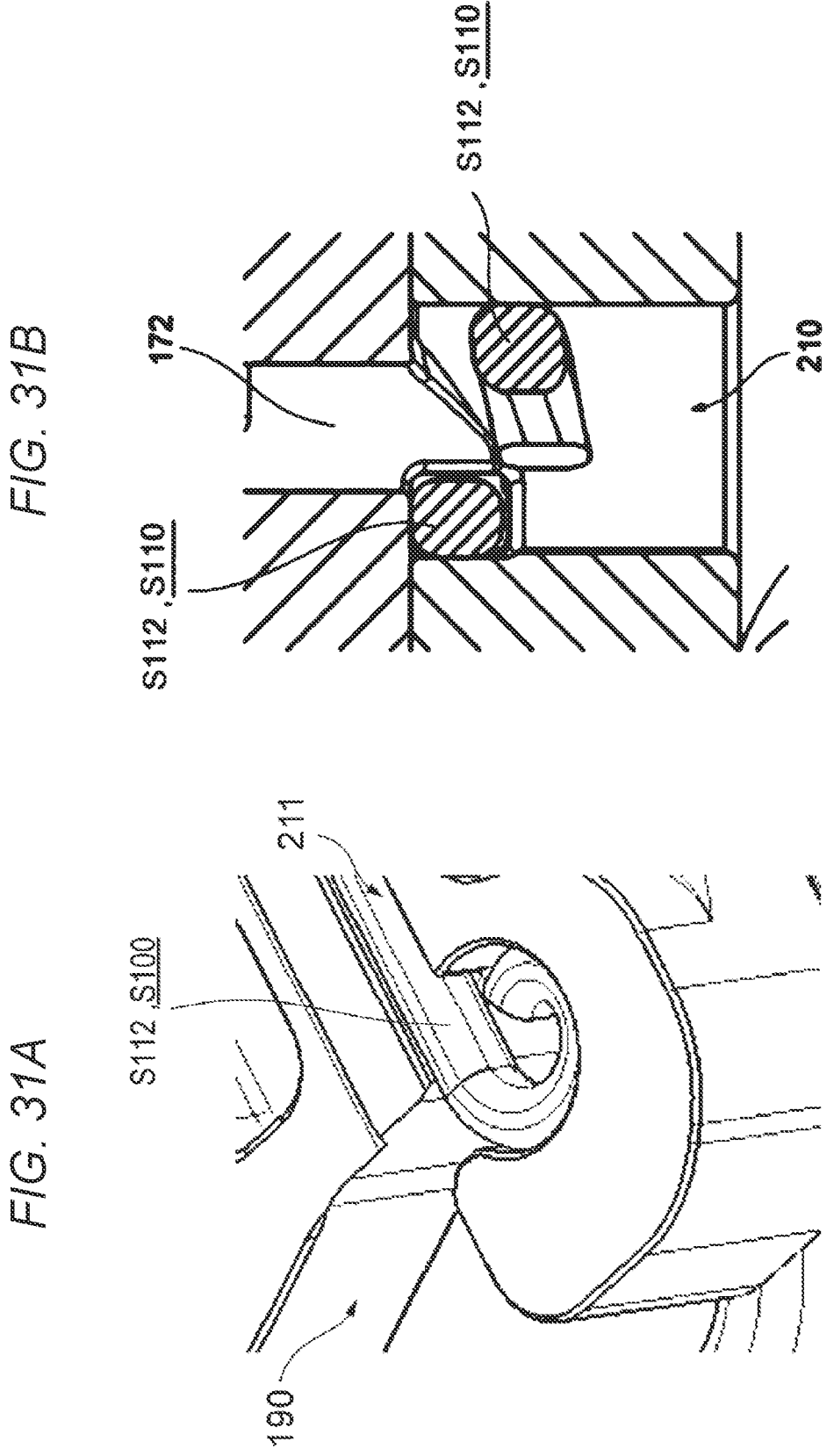
FIG. 31A is a perspective view of a hole according to the second embodiment.
FIG. 31B is a vertical sectional view illustrating a state where a guiding protrusion is inserted into the hole in the second embodiment.
Figure 31C:
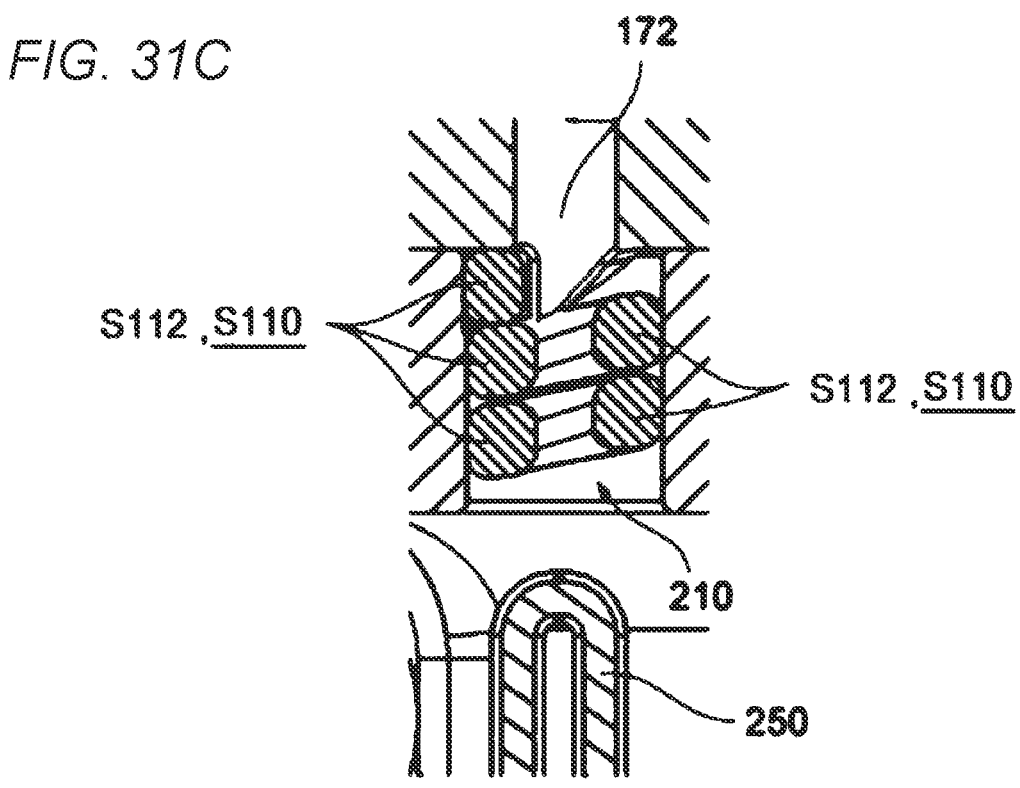
FIG. 31C is a vertical sectional view illustrating a state where the guiding protrusion is inserted into the hole in the second embodiment.

FIG. 31A is a perspective view of the hole 210, and FIGS. 31B and 31C are vertical sectional views illustrating states where a guiding protrusion 172 is inserted into the hole 210 and advances. The hole 210 is provided to penetrate through, in the up-down direction, the base on which the groove portion 211 as an advance path of the first leg portion S110 is formed. Further, in order to make the shape of the staple S100 easier to understand, the first object G is omitted from FIG. 31A and the like.

In order to smoothly bring the tip end of the second portion S112 of the first leg portion S110 advancing by being pushed in the forward direction by the driver 420 into contact with the cylindrical inner wall surface of the hole 210 from the groove portion 211, on the surface of the base, the groove portion 211 extending in the front-rear direction for the first leg portion S110 to advance is formed, and the hole 210 is formed for an outer side surface of the groove portion 211 to be smoothly connected to the cylindrical inner wall surface (for a tangent line of the inner wall surface at a connection point between the inner wall surface and the groove to coincide with the outer side surface of the groove in the top view).

As illustrated in FIG. 31A, the base is formed with a guide introduction portion 190 that penetrates through the base in the up-down direction and communicates with the hole 210 from an upper end to a lower end. By inserting the tip end of the second portion S112 of the first leg portion S110 into the hole 210 in a state where, for example, a guide string which is the first object G (FIG. 37 and the like) as a guide element is disposed along a central axis of the hole 210 from the guide introduction portion 190, the tip end of the second portion S112 advances in a spiral manner to surround the first object G. Therefore, it is possible to engage the first leg portion S110 with the first object G. In addition, since the first object G is inserted into the hole 210, the hole 210 also functions as the first insertion portion. The inventors of the present application have paid attention to a point that the advance of the second portion S112 toward the downward direction Z2 can be promoted by inserting, into the hole 210, the guiding protrusion 172 for guiding the advance of the tip end of the first leg portion S110 toward the downward direction Z2.

The guiding protrusion 172 is inserted into the hole 210 adjacent to the first object G such that the tip end of the first leg portion S110 comes into contact with the guiding protrusion 172. As illustrated in FIGS. 31B and 31C, the guiding protrusion 172 includes an inclined surface that is inclined to protrude in the downward direction as the guiding protrusion 172 advances in a rotation direction (a counterclockwise direction in FIG. 31A) of the tip end of the second portion S112. According to such a configuration, the tip end of the second portion S112 comes into contact with the inclined surface of the guiding protrusion 172 and is guided to advance in the downward direction.

In order to strengthen the engagement between the first object G and the first leg portion S110, an inner diameter of the inner wall surface of the hole 210 is preferably less than the total value of twice a wire diameter of the staple S100 and the outer diameter of the first object G. A part of the first object G or the staple S100 is crushed by setting the inner diameter in this manner, and thus it is possible to strengthen the engagement between the staple S100 and the first object G.

The inner wall surface formed in the hole 210 may not be a cylindrical surface. For example, the hole 210 may be configured to strengthen the engagement between the first object G and the first leg portion S110 in the downward direction Z2 with respect to the hole 210 by forming the inner wall surface of the hole 210 to have a circular cross section whose diameter decreases toward the downward direction Z2. Further, the inner wall surface formed in the hole 210 may be a curved surface formed in a groove provided in an arc shape for displacing the first leg portion S110 in an arc shape.

In addition, as illustrated in FIG. 31C, it is preferable to adjust the movement amount of the driver 420 and a formation position of the hole 210 such that the tip end of the second portion S112 extends around at least two turns (720 degrees or more) and surrounds the first object G. Since the tip end of the second portion S112 extends around at least two turns (720 degrees or more) and surrounds the first object G, it is possible to strengthen the engagement between the first object G and the first leg portion S110.

[Movement Mechanism for Lid]

Figure 32A:
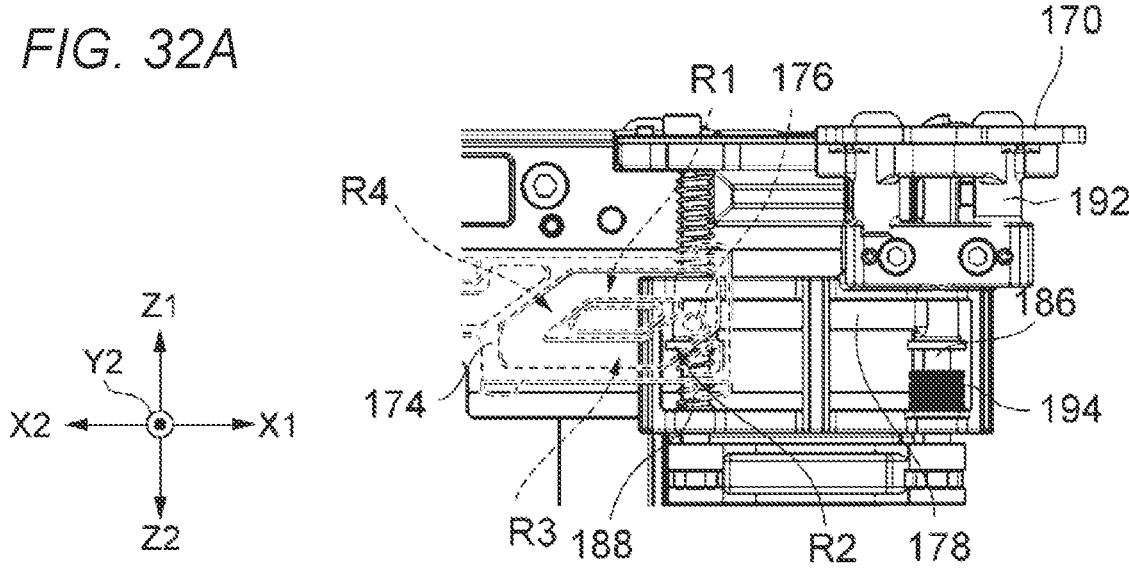
FIG. 32A is a schematic diagram illustrating a configuration in which a moving operation of the driver and a vertical movement of a lid are interlocked in the second embodiment.

Further, the inventors of the present application have paid attention to a point that the advance of the tip end of the first leg portion S110 toward the downward direction Z2 in a spiral manner against a reaction force received by the first leg portion S110 can be promoted by closing the hole 210 from above by using the lid 170 (FIG. 32A and the like).

Therefore, the inventors of the present application have reached a concept of a configuration in which the guiding protrusion 172 is provided in the lid 170, and further have reached a concept of a configuration in which by interlocking a moving operation of the driver 420 and a vertical movement of the lid 170, the hole 210 is closed by the lid 170 during the binding operation, the lid 170 rises and the hole 210 is opened after the binding. The lid 170 has a lower surface (a bottom surface) perpendicular to a central axis of the cylindrical surface included in the hole 210 and facing the hole 210, the lid 170 closes the hole 210 by bringing the lower surface close to the hole 210, and the lid 170 opens the hole 210 by separating the lower surface from the hole 210.

The closing includes covering a part of the opening of the hole 210 in order to restrain the movement of the first leg portion S110 in the upward direction Z1. Further, since the lid 170 is provided in the upward direction Z1 with respect to the hole 210, a through hole extending in the up-down direction for insertion of the first object G inserted into the hole 210 is formed.

Hereinafter, a configuration for interlocking the moving operation of the driver 420 and the vertical movement of the lid 170 will be described with reference to FIGS. 32A to 32D and 33A to 33B.

FIG. 32A is sectional view of the binding machine 100 in a left side view.

As illustrated in FIG. 32A, the binding machine 100 includes a front-rear movement part 174 that moves in the front-rear direction in a manner of being interlocked with the driver 420 as a movement mechanism of the lid 170. A path is formed in the front-rear movement part 174. The path includes a first path R1 extending in the forward direction, a second path R2 connected to a front end of the first path R1 and extending in a direction inclined toward the downward direction and the rearward direction, a third path R3 connected to a rear end of the second path R2 and extending in the rearward direction, and a fourth path R4 connected to a rear end of the third path R3, extending in a direction inclined toward the upward direction and the forward direction, and connected to a rear end of the first path R1. Each path is defined by, for example, four wall surfaces of a wall portion formed in a parallelogram shape protruding in the leftward direction Y2.

However, among the four paths, two paths opposed to each other may not necessarily be formed in parallel, or may be formed by a curved line. In particular, the second path R2 and the fourth path R4 may not be parallel to each other. Path lengths of the second path R2 and the fourth path R4 can be changed by changing inclination angles of the second path R2 and the fourth path R4. Accordingly, a timing for vertically moving the lid 170 can be changed by changing the angles of the second path R2 and the fourth path R4.

The lid 170 preferably moves in the downward direction so as to close the hole 210 when the tip end of the first leg portion S110 reaches the hole 210 or immediately before the tip end of the first leg portion S110 reaches the hole 210.

Further, it is preferable that the crank holding mechanism 180 is automatically disengaged from the crank portion S111 before a pushing member 250 to be described later moves in the upward direction Z1.

In the present embodiment, the inclination angles of the second path R2 and the fourth path R4 are set to be different from each other such that at a time point when the tip end of the first leg portion S110 reaches the hole 210, after the operation of closing the hole 210 by the lid 170 ends, and the engagement with the crank portion S111 is automatically released, the pushing member 250 to be described later can move in the upward direction Z1 to discharge a spiral portion.

Further, the movement mechanism includes a pin 176 that advances along a path, a link 178 that is fixed to the pin 176, and two shaft portions that restrict the movement of the link 178 in the front-rear direction.

The pin 176 is formed, for example, in a columnar shape protruding in the leftward direction Y2, and is configured to advance along the four wall surfaces of the wall portion formed in the parallelogram shape.

The link 178 is provided to extend in the front-rear direction, is engaged with a first shaft portion 186 at a front end portion, and is engaged with a second shaft portion 188 at a rear end portion. Each shaft portion extends in the up-down direction and is fixed to a main body of the binding machine 100, and thus the movement of the link 178 toward the front-rear direction is restricted by the two shaft portions.

The movement mechanism further includes an up-down movement part 192 engaged with the two shaft portions, and a plurality of elastic members inserted between the up-down movement part 192 and the link 178. The movement mechanism is configured to vertically move the up-down movement part 192 based on the matter that an elastic force generated by the elastic member pushed by the link 178 is varied when the link 178 vertically moves as the pin 176 vertically moves. Since the lid 170 is connected to the up-down movement part 192, it is possible to interlock the vertical movement of the pin 176 and the vertical movement of the lid 170. Further, the vertical movement of the pin 176 is interlocked with the front-rear movement part 174 that moves in the manner of being interlocked with the driver 420. Therefore, it is possible to interlock the movement of the driver 420 and the vertical movement of the lid 170.

FIG. 32A shows a position of the pin 176 in the initial state. In the initial state, the pin 176 is positioned on the second path R2. At this time, the lid 170 closes the hole 210.

Figure 32B:
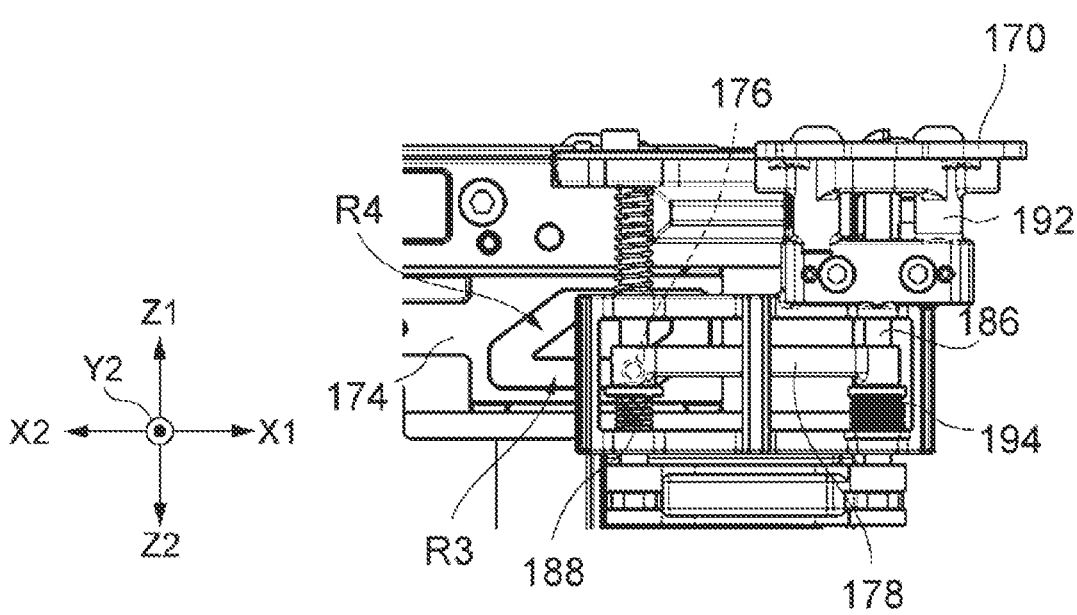
FIG. 32B is a schematic diagram illustrating a configuration in which the moving operation of the driver and the vertical movement of the lid are interlocked in the second embodiment.

FIG. 32B shows a position of the pin 176 when the driver 420 is advancing after the initial state. The driver 420 and the front-rear movement part 174 are configured to move in an interlocked manner, and more specifically, the front-rear movement part 174 delays with a time difference and moves in the forward direction as the driver 420 moves in the forward direction, and the front-rear movement part 174 delays and moves in the rearward direction as the driver 420 moves in the rearward direction.

When the front-rear movement part 174 advances as the driver 420 advances, the pin 176 positioned in the second path R2 formed to be inclined moves in the downward direction Z2 along the second path R2. When the pin 176 moves in the downward direction, the link 178 also moves in the downward direction.

The first shaft portion 186 is engaged with the link 178 and the up-down movement part 192 under the link 178. In addition, a disc spring 194, which is an elastic member, is inserted between the link 178 and the up-down movement part 192 such that the first shaft portion 186 penetrates therethrough.

Therefore, as illustrated in FIG. 32B, the disc spring 194 is compressed when the link 178 descends, and as a result, a force for pressing down the up-down movement part 192 in the downward direction Z2 is increased. Accordingly, the lid 170 connected to the up-down movement part 192 presses the hole 210 toward the downward direction Z2 by using a strong force so as to close the hole 210. Since the tip end of the first leg portion S110 of the staple S100 is inserted (or is to be inserted) in the hole 210, the lid 170 guides the tip end of the first leg portion S110 to advance in the downward direction Z2.

According to the above configuration, it is possible to press down the lid 170 in the downward direction Z2 when the driver 420 advances. Thus, while the pin 176 is descending on the second path R2, the lid 170 descends and can close the hole 210 with the strong force.

Figure 32C:
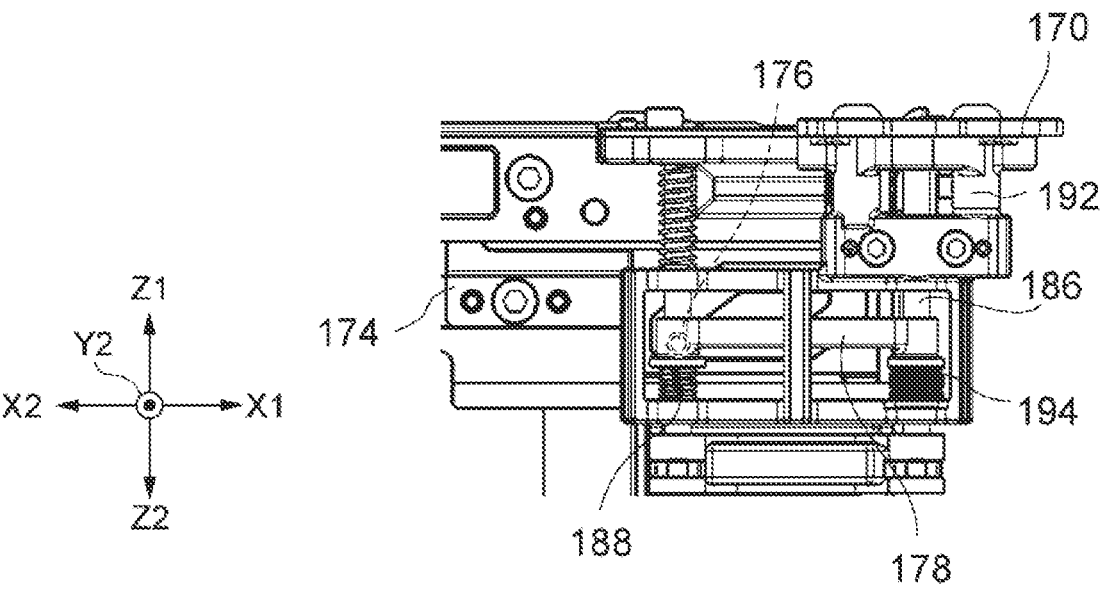
FIG. 32C is a schematic diagram illustrating a configuration in which the moving operation of the driver and the vertical movement of the lid are interlocked in the second embodiment.

As illustrated in FIGS. 32B to 32C, while the driver 420 and the front-rear movement part 174 are further advancing, the pin 176 advances on the third path R3. Therefore, the pin 176 is maintained at a position in the downward direction. Accordingly, by adopting a configuration in which the pin 176 is present on the third path R3 during the execution of the binding operation, it is possible to achieve a mechanism for continuously pressing the hole 210 in the downward direction Z2 by the lid 170 so as to close the hole 210 during the binding operation.

As illustrated in FIG. 32C, when the driver 420 and the front-rear movement part 174 most advance, the pin 176 shifts from the third path R3 to the fourth path R4. Since the fourth path R4 extends in a direction inclined toward the upward direction Z1 and the forward direction X1, the link 178 and the pin 176 move in the upward direction by an elastic force of the disc spring 194. Similarly to the disc spring 194, on the second shaft portion 188, it is possible to vertically move the lid 170 in a well-balanced manner by inserting an elastic member between the link 178 in the upward direction and the up-down movement part 192 in the downward direction.

Figure 32D:
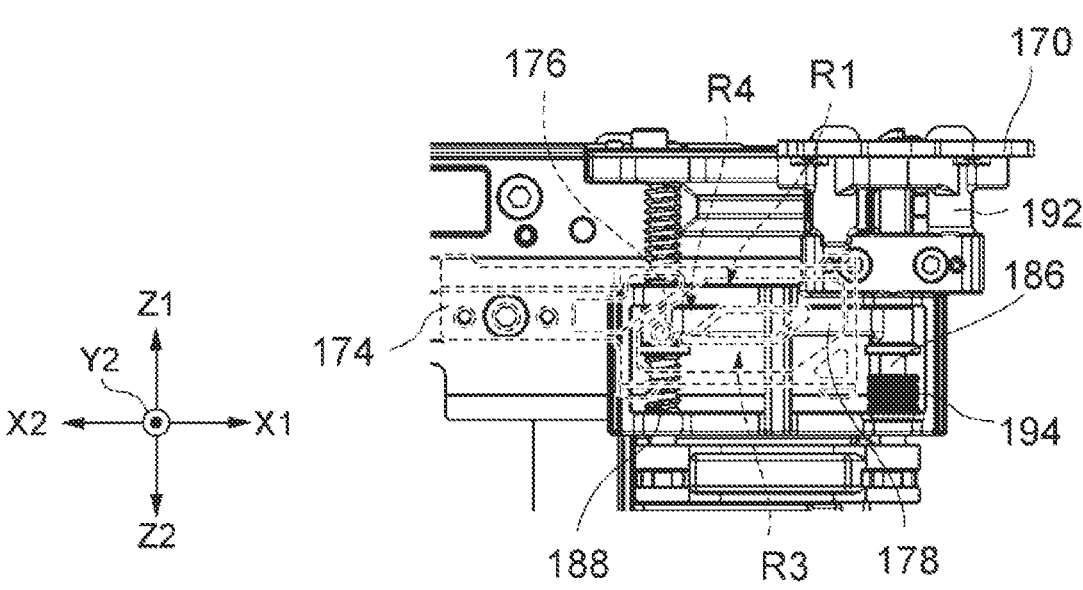
FIG. 32D is a schematic diagram illustrating a configuration in which the moving operation of the driver and the vertical movement of the lid are interlocked in the second embodiment.
Figure 33A:
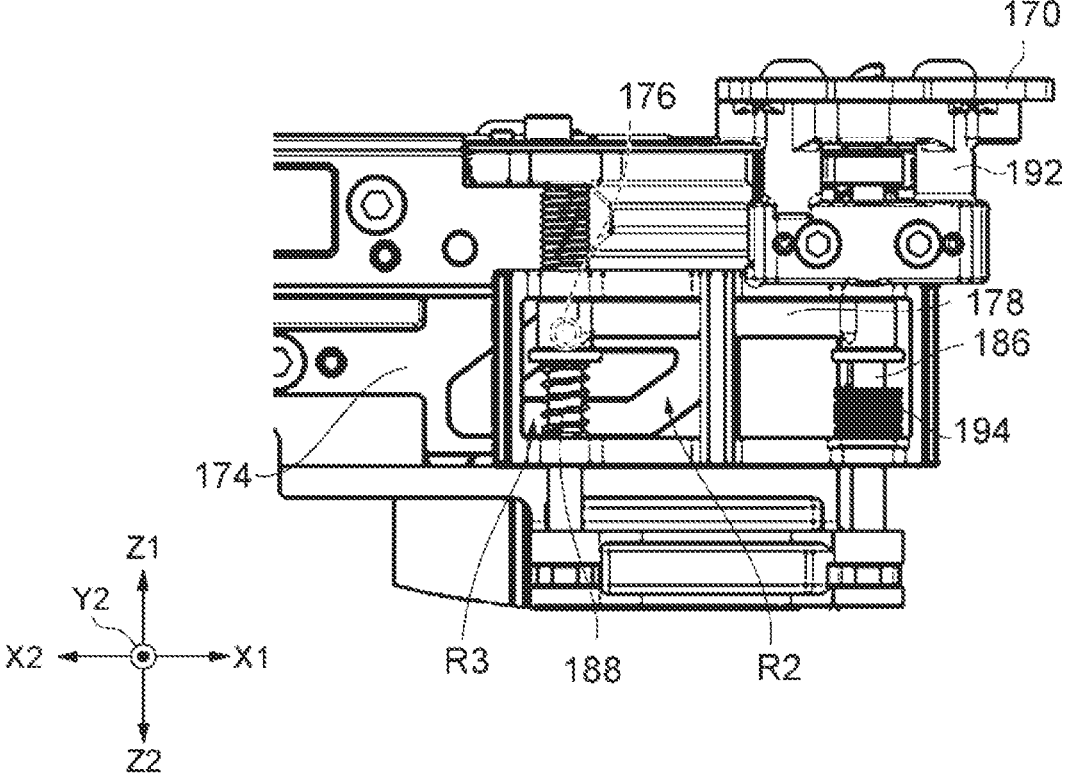
FIG. 33A is a schematic diagram illustrating a configuration in which the moving operation of the driver and the vertical movement of the lid are interlocked in the second embodiment.

FIG. 32D illustrates a state when the advance of the driver 420 has ended, and FIG. 33A illustrates a state where the driver 420 is retracting. As illustrated in FIGS. 32D and 33A, when the driver 420 ends the advance and starts the movement toward the rearward direction, the pin 176 starts the movement toward the upward direction Z1 along the fourth path R4. As the pin 176 moves toward the fourth path R4, the elastic force obtained by the compression of the disc spring 194 is weakened. Therefore, as illustrated in FIG. 33A, when the pin 176 moves in the upward direction Z1, the up-down movement part 192 and the lid 170 move in the upward direction Z1. Therefore, the closing of the hole 210 by the lid 170 is released, and the hole 210 is opened. Accordingly, it is possible to release the first object G engaged with the first leg portion S110 from the binding machine 100. Further, in order to prompt the movement of the up-down movement part 192 toward the upward direction Z1, it is preferable that the elastic members for pressing up the up-down movement part 192 in the upward direction Z1 are respectively inserted onto the first shaft portion 186 and the second shaft portion 188. According to such a configuration, it is possible to smoothly press up the up-down movement part 192 in the upward direction Z1 when the elastic force obtained by the compression of the disc spring 194 is weakened. Further, an elastic member for pressing up in the upward direction Z1 may be provided in a portion of the up-down movement part 192 other than the first shaft portion 186 and the second shaft portion 188.

Figure 33B:
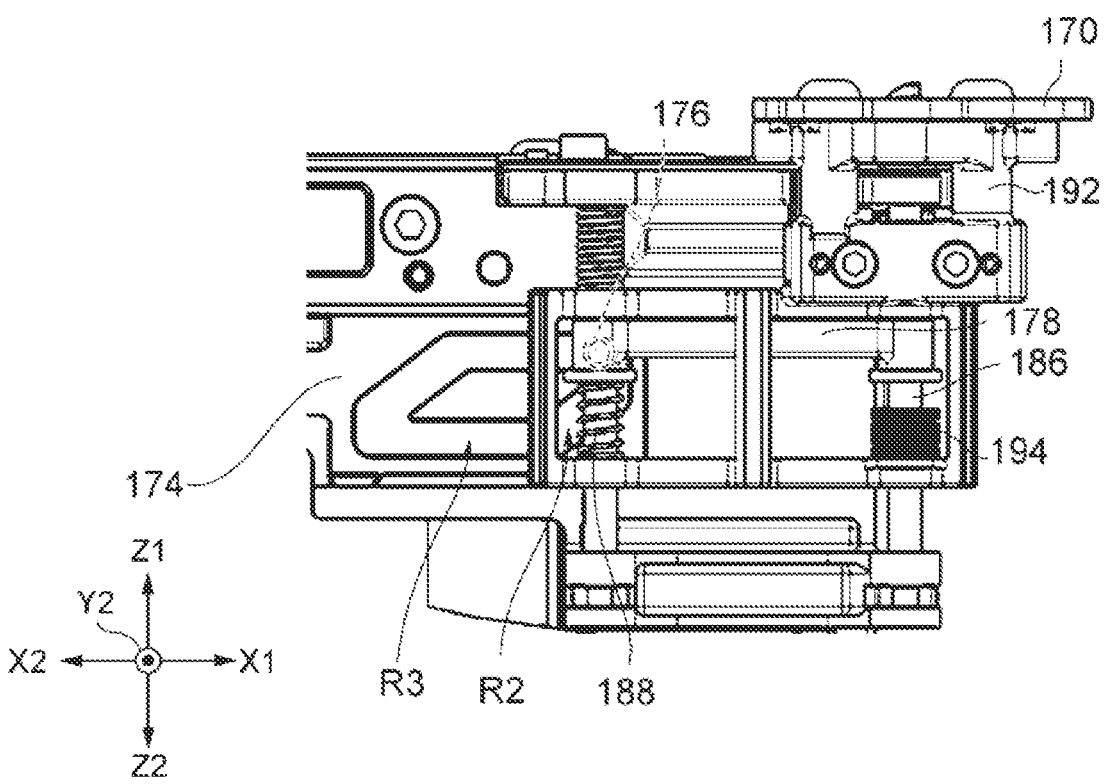
FIG. 33B is a schematic diagram illustrating a configuration in which the moving operation of the driver and the vertical movement of the lid are interlocked in the second embodiment.

FIG. 33B illustrates a state immediately before the retraction of the driver 420 ends. As illustrated in FIGS. 33A to 33B, the pin 176 is maintained at a position in the upward direction where the first path R1 is provided while the driver 420 and the front-rear movement part 174 are moving in the rearward direction. Accordingly, it is possible to achieve a mechanism in which the lid 170 is lifted up in the upward direction Z1 while the driver 420 is returning to the initial state after the binding.

Thereafter, when the pin 176 shifts from the first path R1 to the second path R2, the lid 170 descends and closes the hole 210 with a weak force.

According to the above configuration, it is possible to achieve a configuration of the lid 170 in which the lid 170 descends to guide the first leg portion S110 of the staple S100 to be displaced in the downward direction Z2 and be engaged with the first object G during the binding operation, and the lid 170 rises to enable the removal the first object G engaged with the first leg portion S110 of the staple S100 after the binding ends.

[Holding Mechanism of First Object]

Figure 34:
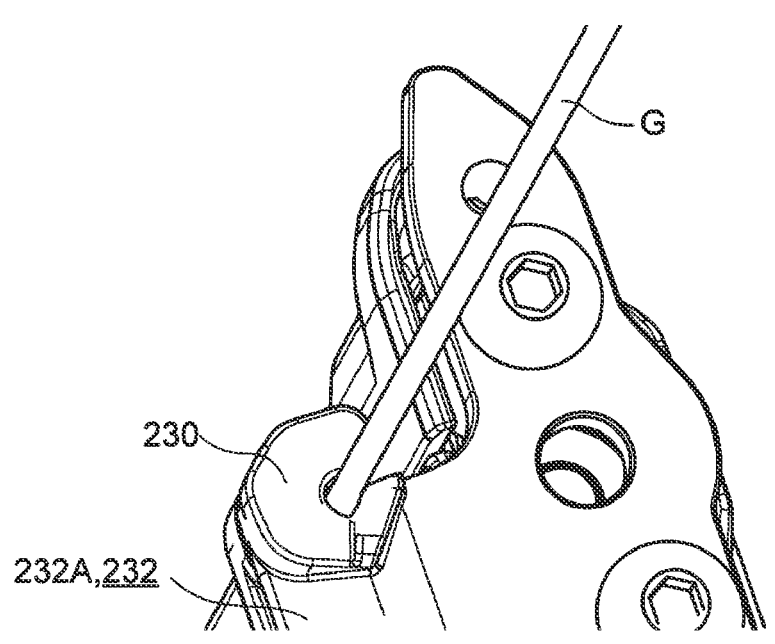
FIG. 34 is a perspective view of a guide holding mechanism according to the second embodiment.

Hereinafter, a guide holding mechanism 230 for holding the first object G in a state of being inserted into the hole 210 will be described. Since the first object G is inserted into the hole 210, the hole 210 may be referred to as an insertion portion. FIG. 34 is a perspective view of the guide holding mechanism 230. As illustrated in FIG. 34, the guide holding mechanism 230 is formed in a plate shape, and the guide holding mechanism 230 includes a through hole vertically penetrating through the guide holding mechanism 230 and a notch communicating the through hole with the outer periphery of the guide holding mechanism 230. The through hole has an inner diameter that is the same as the outer diameter of the first object G or smaller than the outer diameter of the first object G in order to suitably hold the first object G. Further, it is preferable that a central axis of the through hole and the central axis of the hole 210 substantially coincide with each other in the top view: According to such a configuration, when the first object G is held by the guide holding mechanism 230, the first object G can be easily disposed on the central axis of the hole 210. The guide holding mechanism 230 may be provided above and below the hole 210, or may be provided above or below the hole 210.

Further, the guide holding mechanism 230 may be provided as a part of the lid 170. By providing the guide holding mechanism 230 as a part of the lid 170, it is possible to vertically move the guide holding mechanism 230 in a manner of being interlocked with the movement of the driver 420. Further, by forming the inner diameter of the through hole of the guide holding mechanism 230 to be smaller than the inner diameter of the hole 210, it is possible to close a part of a region of the hole 210 excluding a center thereof by the guide holding mechanism 230. Since the first object G is disposed at the center of the hole 210 and the second leg portion S120 advances on the outer periphery of the first object G, by closing a part of the region of the hole 210 excluding the center thereof by the guide holding mechanism 230, it is possible to press the first leg portion S110 in the downward direction and advance the tip end of the first leg portion S110 in a spiral manner against the reaction force received by the first leg portion S110.

Further, by providing the guiding protrusion 172 on a lower surface side of the guide holding mechanism 230, it is possible to guide the advance of the tip end of the first leg portion S110 toward the downward direction.

[Second Displacement Portion]

The second displacement portion 300 has a function of displacing the second leg portion S120 so as to be engageable with the first object G.

The second displacement portion 300 is configured to displace the second leg portion S120 in the inward direction of the staple S100 as the driver 420 moves in the opening direction, and more specifically, is configured to plastically deform the second leg portion S120 so as to be curved in an arc shape in the inward direction of the staple S100.

Figure 35A:
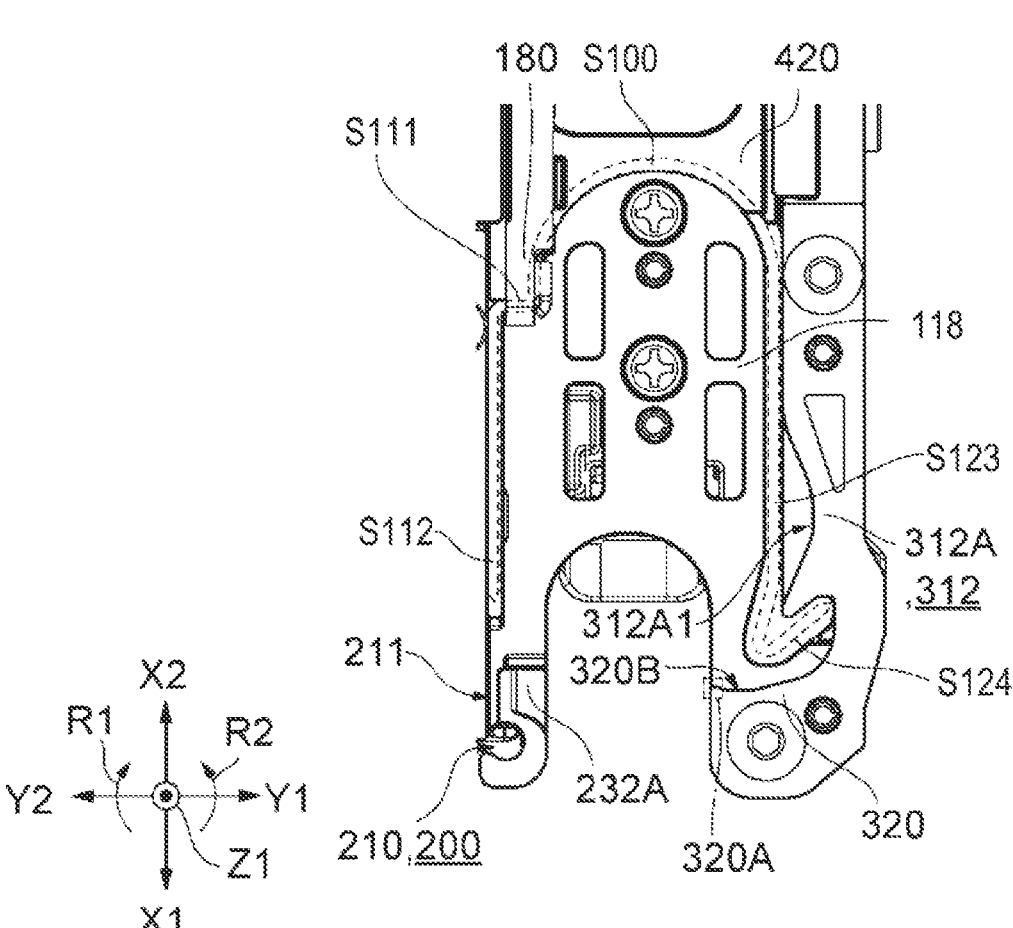
FIG. 35A is a sectional view illustrating a process of engaging the staple with the first object by using the binding machine in the second embodiment in the top view.

Specifically, as illustrated in FIG. 35A to be described later, the second displacement portion includes the first guiding wall 312 that is provided outside the second leg portion S120, and comes into contact with the second leg portion S120 of the staple S100 moving in the opening direction D1 (the opening direction D1 coincides with the forward direction X1, and thus may be referred to as the forward direction X1. The same applies hereinafter) to curve the second leg portion S120. The first guiding wall 312 includes a recessed portion 312A that is recessed in the outward direction (the rightward direction Y1) of the staple S100. Accordingly, the recessed portion 312A includes a first recessed portion region that is provided in the outward direction with respect to the second leg portion S120 in the initial state and has a wall surface having a distance to the second leg portion S120 which increases as the second leg portion S120 moves in the forward direction, and a second recessed portion region that is connected to the first recessed portion region and has a wall surface having a distance to the second leg portion S120 which decreases as the second leg portion S120 moves in the forward direction.

Further, the second displacement portion 300 (FIG. 35A and the like) includes the second guiding wall 320 that is provided in the forward direction X1 with respect to the second leg portion S120 in the initial state before the start of displacement, and comes into contact with the second leg portion S120 of the staple S100 moving in opening direction D1 to curve the second leg portion S120. The second guiding wall 320 is provided to have a wall surface facing the rearward direction X2. The second guiding wall 320 includes a protruded portion 320A that protrudes in the rearward direction X2. The protruded portion 320A includes the protruded portion 320A that is provided in the forward direction with respect to the second leg portion S120 in the front-rear direction and is provided in the inward direction with respect to the second leg portion S120 in the left-right direction in the initial state, and the protruded portion 320A has a protruding amount toward the rearward direction X2 that becomes large, that is, a height from the second guiding wall 320 in the top view that becomes large as advancing toward the leftward direction Y2 (the inward direction of the staple S100).

The inventors of the present application have paid attention to a point that as compared to a case where the protruded portion 320A is not provided, it is possible to smoothly curve the second leg portion S120 so as to advance toward the first leg portion S110 by providing the protruded portion 320A.

[Binding Method Using Binding Machine]

Hereinafter, a binding method using the binding machine 100 will be described. The first object G inserted into the hole 210 and the second object P inserted into the recessed portion (the second insertion portion) formed in the separation block 118 are omitted from the drawings for convenience of description. In addition, for convenience of description, a part of the configuration may be omitted from the drawings.

FIGS. 35A to 35C and FIGS. 36A to 36D are sectional views illustrating a process of engaging the staple S100 with the first object G by using the binding machine 100 in the top view:

As illustrated in FIG. 35A, when the driver 420 moves toward the forward direction, the staple S100 pushed in the forward direction by the driver 420 moves in the forward direction. At this time, the crank holding mechanism 180 supports the crank portion S111 of the staple S100, thereby restraining the crank portion S111 from the bending.

Figure 35B:
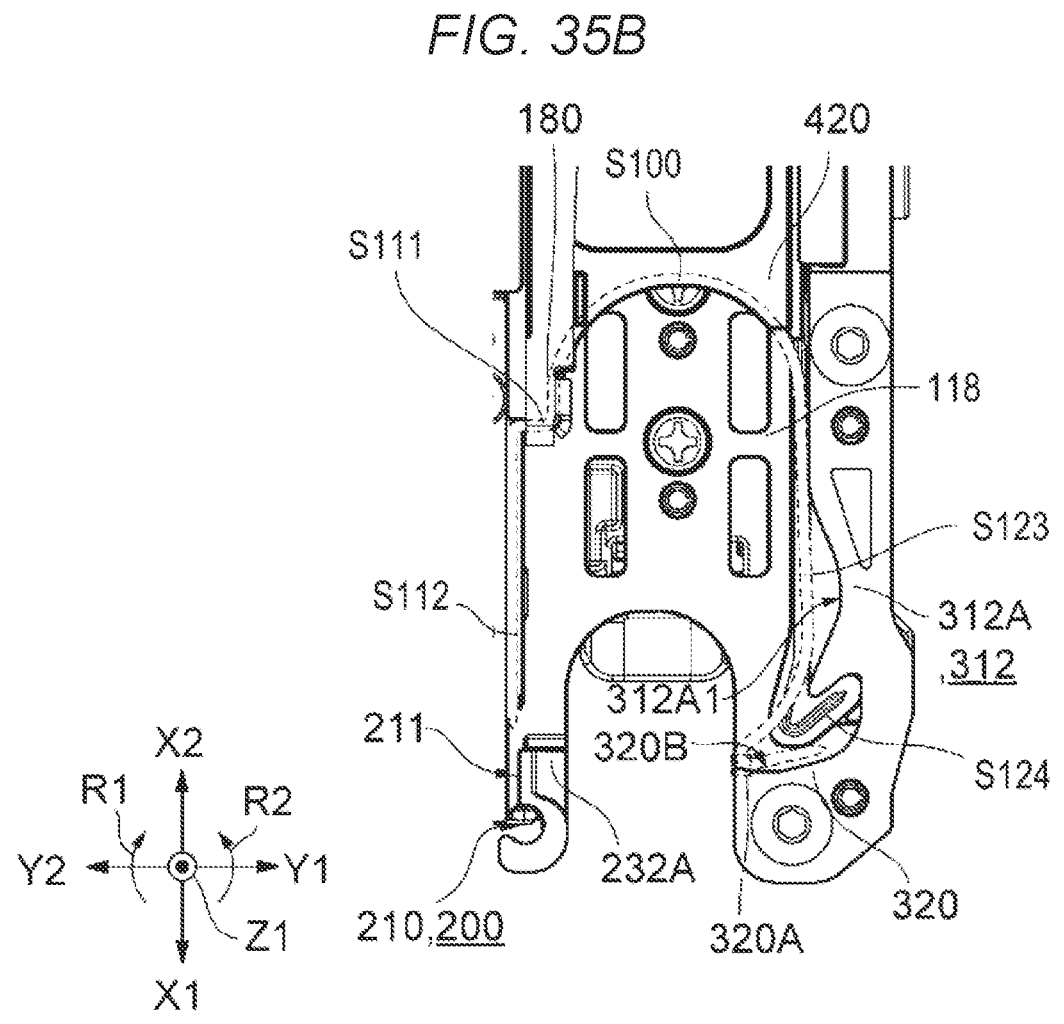

As illustrated in FIG. 35B, since the second guiding wall 320 is provided in the forward direction X1 with respect to the second leg portion S120, the hook portion S124 of the second leg portion S120 comes into contact with the wall surface of the second guiding wall 320 facing the rearward direction X2 and advances along a wall surface 320B of the second guiding wall 320.

Since the wall surface 320B of the second guiding wall 320 has a portion facing the rearward direction X2 and formed to be substantially parallel to the left-right direction, the hook portion S124 cannot advance toward the forward direction X1 (or a movement amount of a hook portion S124 toward the forward direction X1 is smaller than the movement amount of the main body portion S130 of the staple S100 toward the forward direction X1). Therefore, the third portion S123 to be moved toward the forward direction X1 is curved.

On the other hand, the first guiding wall 312 is disposed in the outward direction (the rightward direction Y1) with respect to the second leg portion S120. The first guiding wall 312 has the recessed portion 312A that includes a recessed surface 312A1 formed to face the inward direction of the staple S100 and be recessed in the outward direction (the rightward direction Y1) thereof.

Figure 35C:
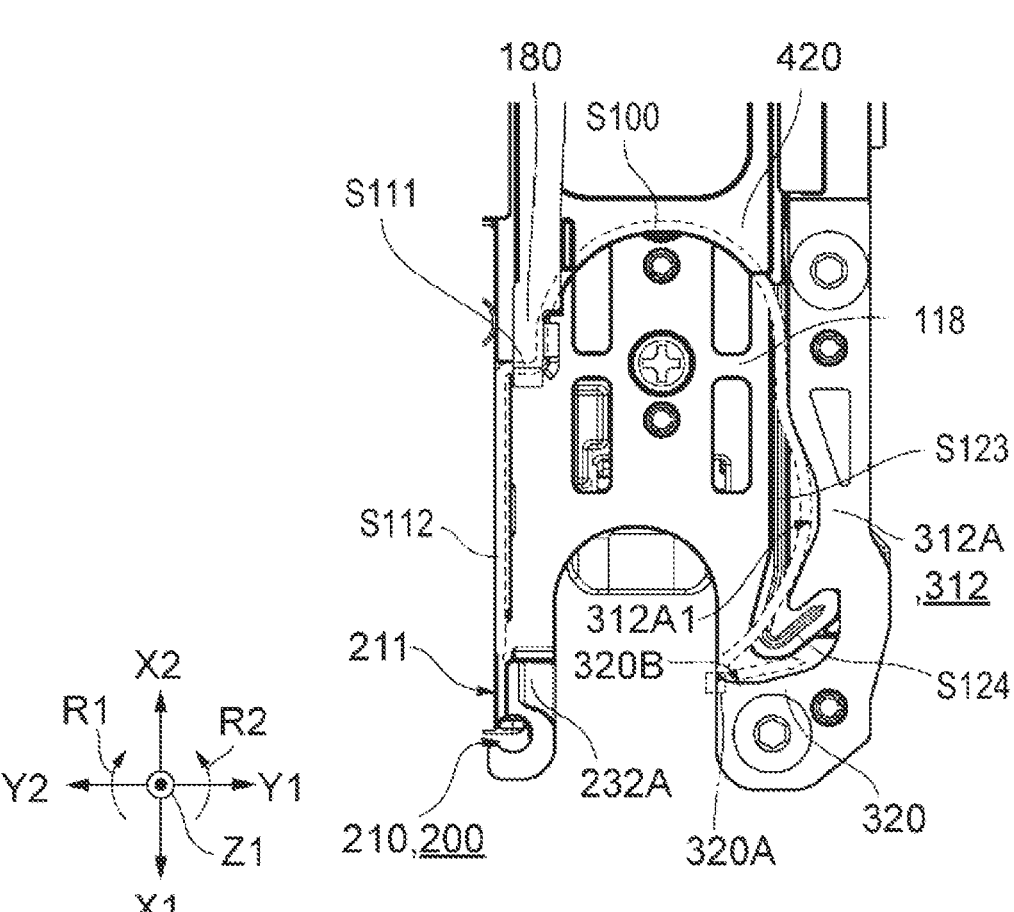
FIG. 35C is a sectional view illustrating the process of engaging the staple with the first object by using the binding machine in the second embodiment in the top view.

Therefore, as illustrated in FIG. 35C, the third portion S123 is curved to come into contact with at least a portion of the recessed surface 312A1 of the recessed portion 312A and expand in the outward direction.

Further, since the pin 176 advances on the third path R3 during the advance of the driver 420, the lid 170 closes the hole 210 toward the downward direction Z2 by using a relatively strong force.

As illustrated in FIG. 35A, the second guiding wall 320 includes the protruded portion 320A that increases the protruding amount toward the rearward direction X2 as advancing toward the inward direction (the leftward direction Y2). Therefore, as illustrated in FIGS. 35B and 35C, the hook portion S124 is guided to advance toward the rearward direction X2 while being in contact with the protruded portion 320A. At this time, since the driver 420 further advances, the third portion S123 is further bent to come into contact with the recessed surface 312A1 of the recessed portion 312A and is curved to largely expand in the outward direction in accordance with a shape of the recessed surface 312A1.

Figure 36A:
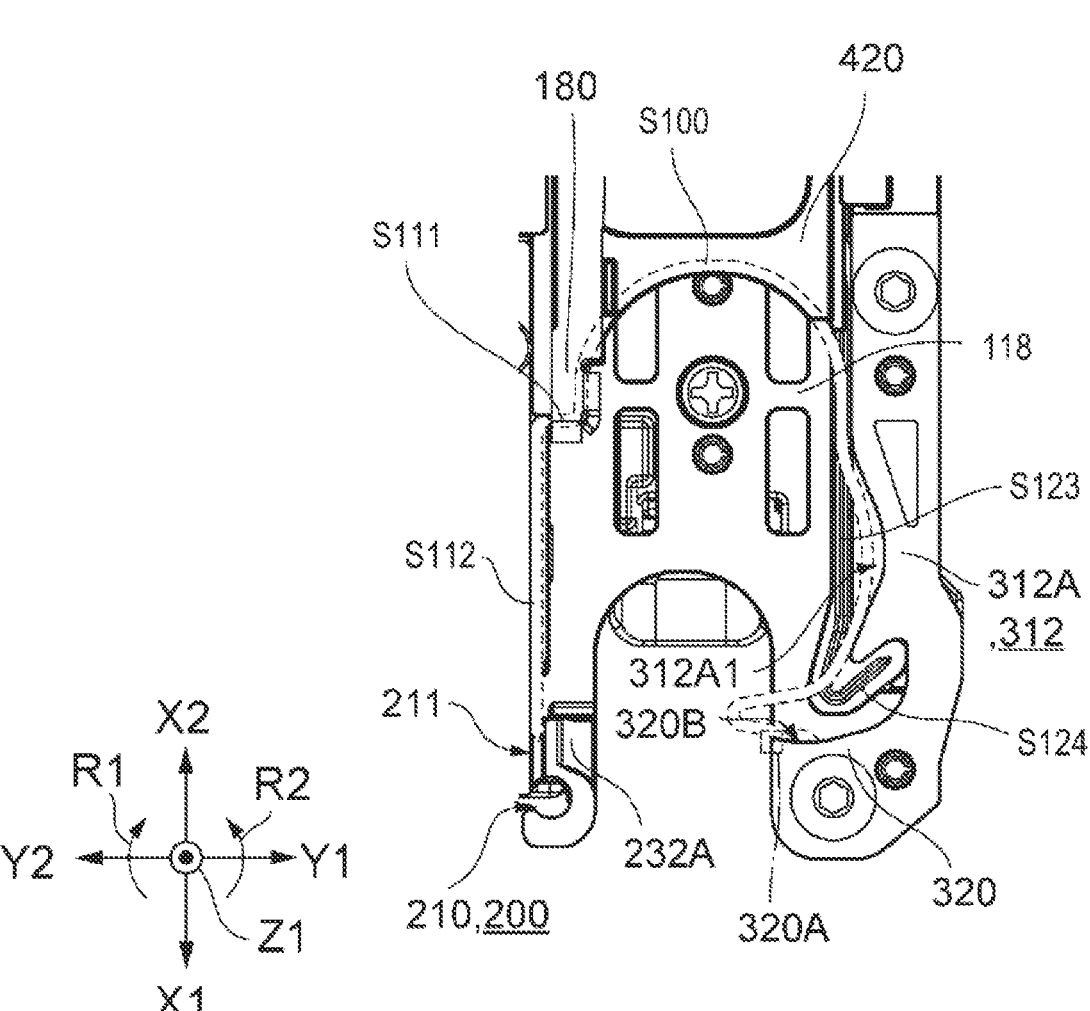
FIG. 36A is a sectional view illustrating the process of engaging the staple with the first object by using the binding machine in the second embodiment in the top view.
Figure 36B:
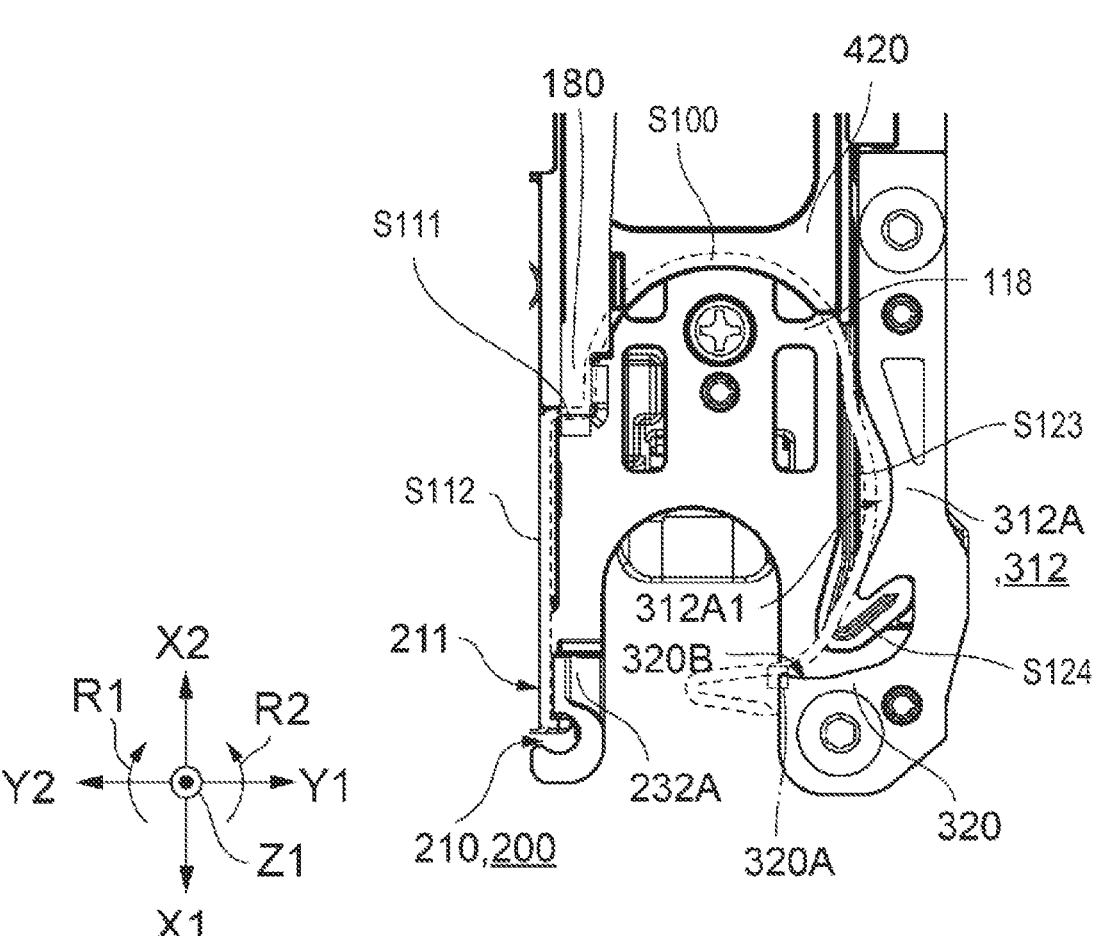
FIG. 36B is a sectional view illustrating the process of engaging the staple with the first object by using the binding machine in the second embodiment in the top view.

As illustrated in FIGS. 36A and 36B, when the hook portion S124 moves over the second guiding wall 320, the hook portion S124 advances in the forward direction X1 due to the elasticity of the second leg portion S120, and the third portion S123 of the second leg portion S120 comes into contact with the protruded portion 320A.

According to the above process, the second leg portion S120 is displaced to be substantially curved in the first rotation direction R1 corresponding to a clockwise direction in the paper surface.

By providing the second guiding wall 320, it is possible to move, in a direction toward the inward direction of the staple S100, the hook portion S124 of the staple S100 moving in the forward direction X1. In addition, since the recessed portion 312A having the recessed surface 312A1 recessed in the outward direction is provided in the first guiding wall 312, it is possible to promote the curving of the second leg portion S120.

Further, since the protruded portion 320A is provided and the hook portion S124 and the third portion S123 are brought into contact with each other, it is possible to control the hook portion S124 to be displaced in a direction toward the first object G as compared with the case where the protruded portion 320A is not provided.

After the hook portion S124 moves over the second guiding wall 320, the tip end of the first leg portion S110 starts entering the hole 210 of the first displacement portion 200. In this way, by adopting a configuration in which after a maximum load associated with the displacement of the second leg portion S120 by the second displacement portion 300 is applied, a maximum load associated with the displacement of the first leg portion S110 by the first displacement portion 200 is applied, it is possible to restrain a large load from being applied to the binding machine 100 at the same time.

As described above, the first displacement portion 200 may be constituted by: for example, the hole 210 formed such that the tip end portion of the first leg portion S110 of the staple S100 surrounds the outer periphery of the first object G as the guide element, or advances along the outer periphery of the first object G in a spiral shape when the staple S100 is moved in the opening direction D1. Since the staple S100 has flexibility and plasticity. when the staple S100 moves in the opening direction D1, the tip end of the first leg portion S110 advances along an inner wall of the hole 210 while being curved in a spiral shape. Accordingly, by moving the staple S100 in the forward direction in a state where the first object G is disposed on an axis of the spiral shape, it is possible to engage with the tip end portion of the first leg portion S110 of the staple S100 in a spiral shape surrounding the outer periphery of the first object G with the first object G as an axis.

At this time, since the pin 176 advances along the third path R3, the guiding protrusion 172 provided on the lid 170 and protruding in the downward direction enters the inside of the hole 210 by the descent of the lid 170 and guides the advance of the first leg portion S110 toward the downward direction. Since the lid 170 presses the first leg portion S110 in the downward direction, it is possible to advance the tip end of the first leg portion S110 in a spiral manner against the reaction force received by the first leg portion S110.

Figure 36C:
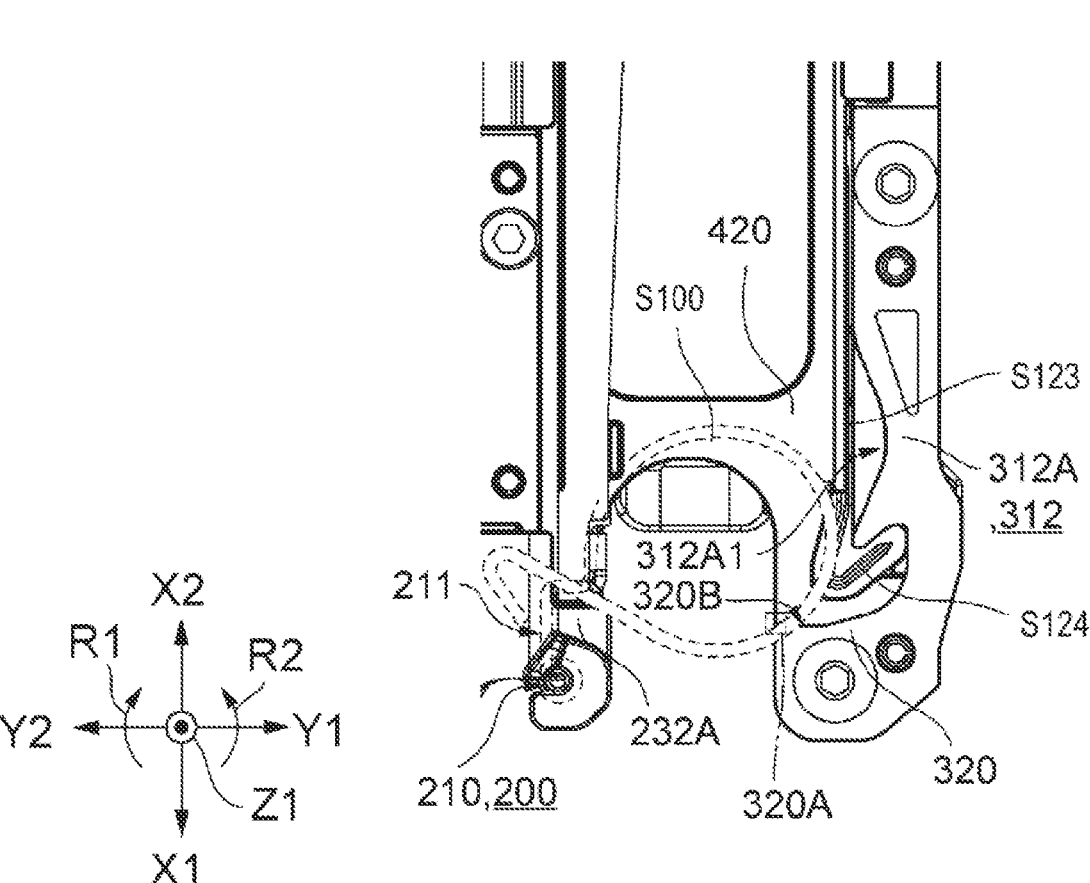
FIG. 36C is a sectional view illustrating the process of engaging the staple with the first object by using the binding machine in the second embodiment in the top view.

When the driver 420 further causes the staple S100 to advance, the hook portion S124 comes into contact with an inclined surface 232A of a guiding wall portion 232 to be described later, and moves in the upward direction Z1. Then, as illustrated in FIG. 36C, the hook portion S124 passes through a region between the first object G inserted into the hole 210 and the second object P inserted into the recessed portion of the separation block 118, and advances to a position where the hook portion S124 intersects the first leg portion S110 in the top view: Since the second leg portion S120 including the hook portion S124 moves in the upward direction Z1 by being in contact with the inclined surface 232A, the second leg portion S120 or the main body portion S130 is displaced in the upward direction Z1 with respect to the second guiding wall 320 as illustrated in FIG. 36C.

Figure 36D:
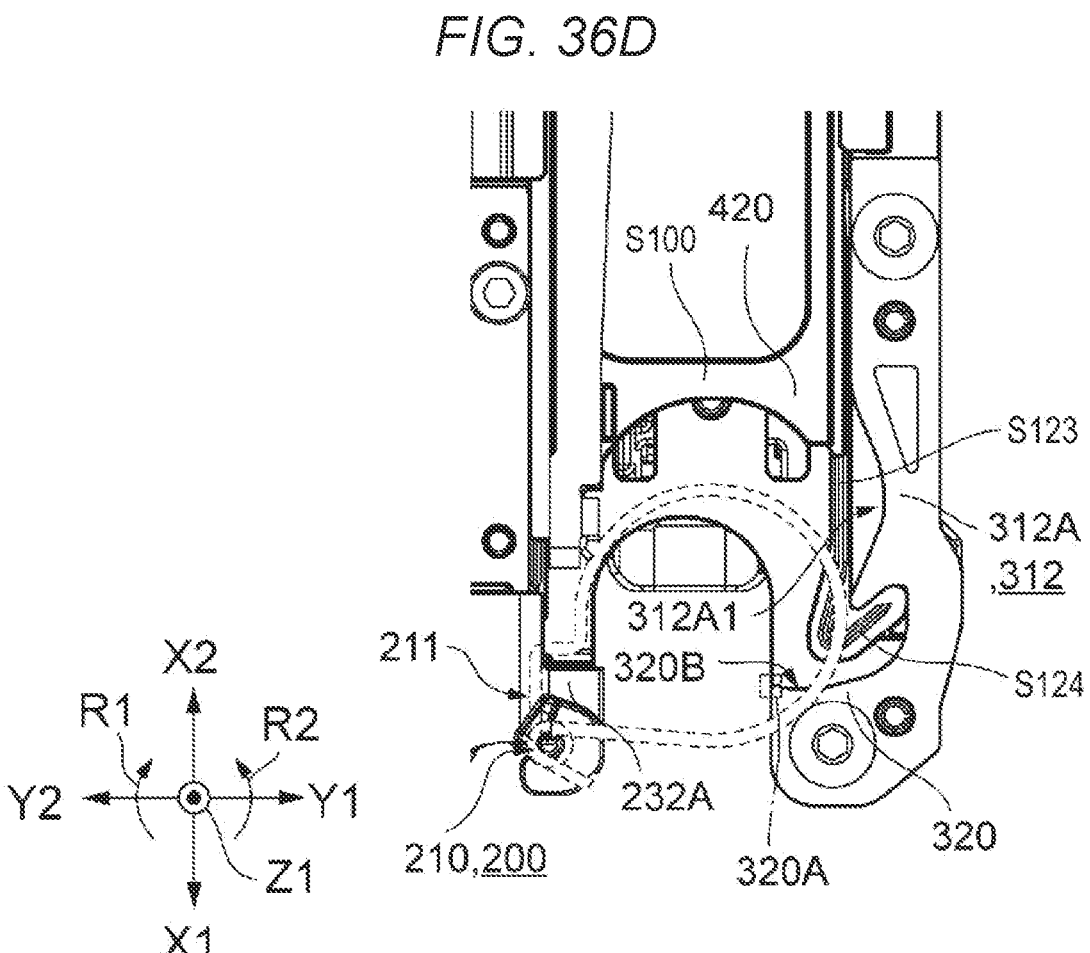
FIG. 36D is a sectional view illustrating the process of engaging the staple with the first object by using the binding machine in the second embodiment in the top view.

FIG. 36D illustrates a state where the driver 420 retracts after the binding. Since the staple S100 exhibits an elastic force so as to restore as the driver 420 retracts, the second leg portion S120 is displaced in the second rotation direction R2, which is a direction opposite to the first rotation direction R1, approaches the first object G, and is engaged with the first object G. At this time, the wall surfaces of the first guiding wall 312 and the second guiding wall 320 may be formed to promote the movement of the hook portion S124 in the upward direction Z1.

Figure 37:
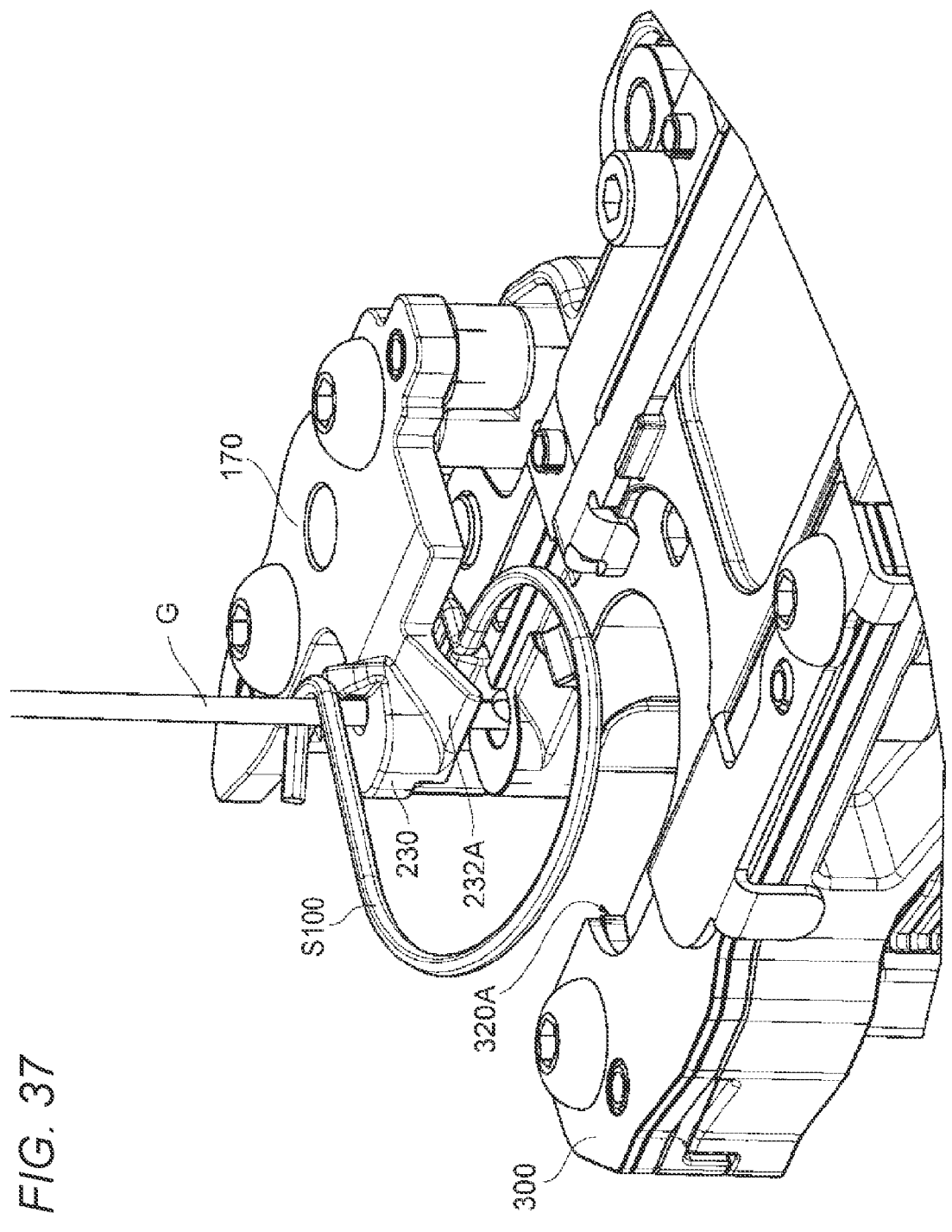
FIG. 37 is a perspective view illustrating a state where the staple is engaged with the first object in the second embodiment.

According to the binding method described above, it is possible to engage the first leg portion S110 and the second leg portion S120 with the first object G so as to surround the second object P by the first leg portion S110, the second leg portion S120 and the main body portion S130. FIG. 37 is a perspective view illustrating a state where the staple S100 is engaged with the first object G.

The second leg portion S120 of the staple S100 is bent in the first rotation direction R1, which is substantially clockwise direction in FIGS. 35A to 35C and 36A to 36D, intersects the first leg portion S110 so as to close the opening of the staple S100 in the state where the second object P is surrounded by the staple S100 in the top view; and then is engaged with the first object G from a side where the second object P is provided. On the other hand, the first leg portion S110 is curved in the second rotation direction R2 and is engaged with the first object G from the outside. Therefore, the first object G can be engaged in a manner of being sandwiched by the first leg portion S110 and the second leg portion S120. Further, even when the second object P grows and comes into contact with the second leg portion S120 and the second leg portion S120 is bent, the engagement with the first object G is strengthened, and thus the first object G and the staple S100 are also restrained from being easily disengaged from each other as the second object P grows.

Further, the tip end of the first leg portion S110 is bent such that the tip end advances in the downward direction Z2 separated from a plane penetrating through the first leg portion S110, the second leg portion S120, and the main body portion S130 before the binding, and is engaged with the first object G. On the other hand, the tip end of the second leg portion S120 is bent such that the tip end advances in the upward direction Z1 separated from the plane penetrating through the first leg portion S110, the second leg portion S120, and the main body portion S130 before the binding, and is engaged with the first object G. Therefore, it is possible to engage both end portions of the staple S100 at different positions of the first object G. Therefore, it is possible to easily generate tension in a region from an engagement position of the first object G with the first leg portion S110 to an engagement position of the first object G with the second leg portion S120. Accordingly, it is possible to restrain the first object G from being bent and the staple S100 from falling off and the like.

As described above, according to the present invention, it is possible to provide the binding machine 100 and the binding method that enable binding which is less likely to be released.

Hereinafter, parts further included in the binding machine 100 will be described.

[Guiding Wall Portion]

Figure 38:
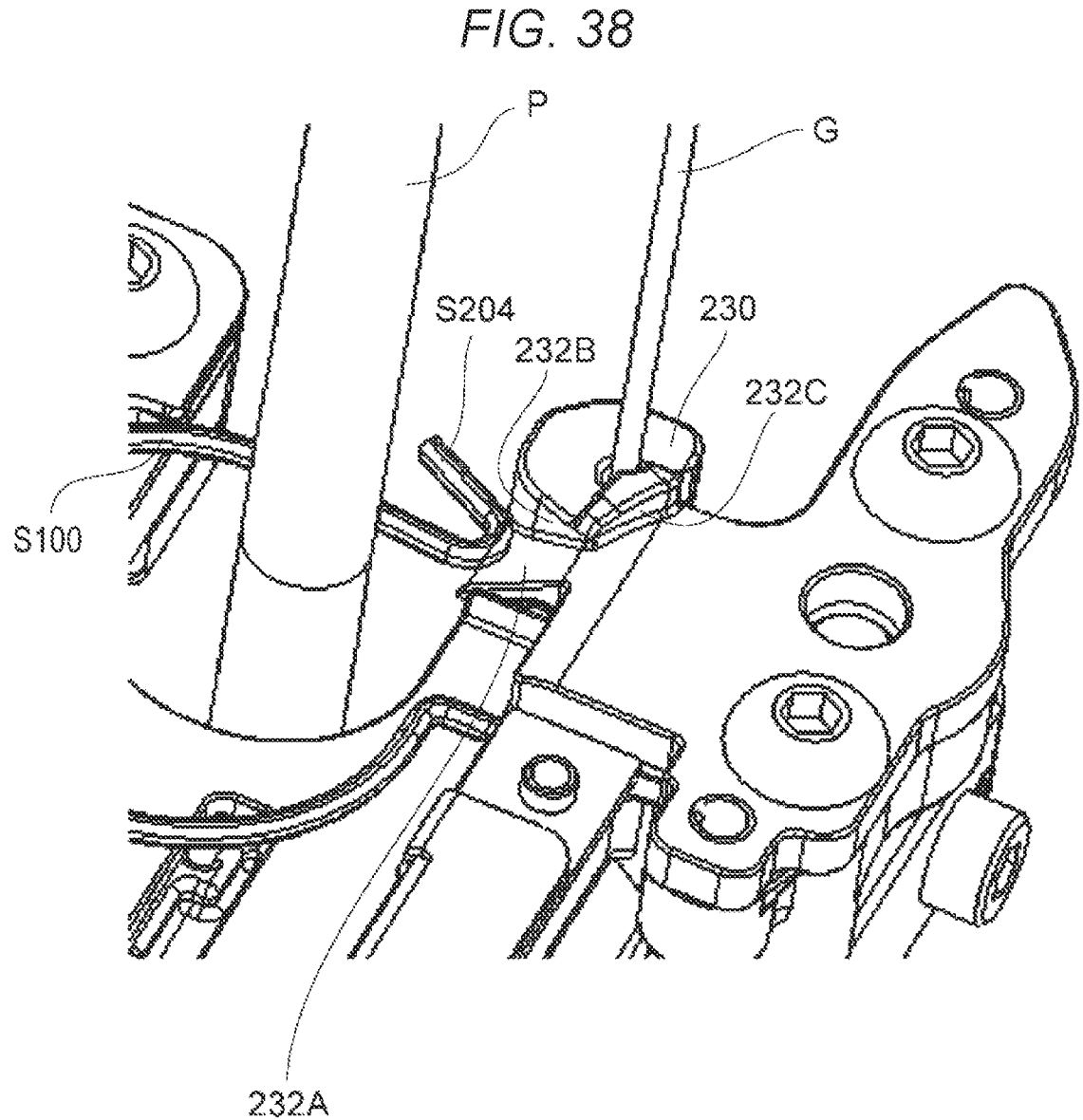
FIG. 38 is a partially enlarged perspective view illustrating a guiding wall portion of the binding machine according to the second embodiment.

The binding machine 100 may include a guiding wall portion 232 for leading or guiding the staple S100 in order to engage the staple S100 with the first object G. FIG. 38 is a partially enlarged perspective view of the binding machine 100 at a portion including the guiding wall portion 232.

As illustrated in FIG. 38, the guiding wall portion 232 according to the present embodiment includes the inclined surface 232A, a first guiding wall surface 232B, and a second guiding wall surface 232C. The guiding wall portion 232 stably engages the hook portion S124 with the first object G by bringing the staple S100 into contact with these three surfaces.

The inclined surface 232A is a surface for moving the hook portion S124 of the staple S100 in the upward direction Z1. In order to displace the hook portion S124 in the upward direction Z1 as advancing toward the first leg portion S110, the inclined surface 232A includes an inclined surface that is provided at a position in the rearward direction X2 with respect to the first object G at a height so as to be in contact with the hook portion S124, and advances in the upward direction Z1 as advancing in the leftward direction Y2 in which the first displacement portion 200 is provided.

By such an inclined surface 232A, it is possible to engage the hook portion S124 with the first object G in the upward direction Z1 of the second portion S112 of the first leg portion S110.

The first guiding wall surface 232B is a surface for engaging the hook portion S124 of the staple S100 with the first object G by controlling a movement direction of a tip end of the hook portion S124 of the staple S100. The first guiding wall surface 232B is a wall surface erected from the inclined surface 232A, and is formed to be inclined toward the rearward direction X2 and slightly the inward direction at the position in the rearward direction X2 with respect to the first object G. Further, the first guiding wall surface 232B is provided to extend in the leftward direction Y2 to at least the vicinity of a position advanced from the first object G in the rearward direction X2 in the top view:

By such a first guiding wall surface 232B, it is possible to reliably move the tip end of the hook portion S124 to a position beyond the first object G.

As illustrated in FIG. 38, the first guiding wall surface 232B may be provided on an outer peripheral surface of the guide holding mechanism 230. According to such a configuration, it is possible to improve positioning accuracy of the guiding wall portion 232 with respect to the first object G.

The second guiding wall surface 232C is a surface for engaging the hook portion S124 of the staple S100 with the first object G by controlling the movement direction of the tip end of the hook portion S124 of the staple S100. The second guiding wall surface 232C is provided to be continuous with the first guiding wall surface 232B, and is formed to be inclined toward the rearward direction X2 and the outward direction at a position in the rearward direction X2 with respect to the first object G. Further, the second guiding wall surface 232C is provided to extend to at least the vicinity of a position advanced from the first object G in the leftward direction Y2 in the top view:

By such a second guiding wall surface 232C, it is possible to displace the tip end of the hook portion S124 to turn around from a position separated to the outside of the first object G, and engage the hook portion S124 with the first object G.

At least a part of the configuration of the guiding wall portion 232 as described above may be applied to the binding machine according to the present embodiment within a reasonable range.

[Inner Fulcrum Member]

Figure 39A:
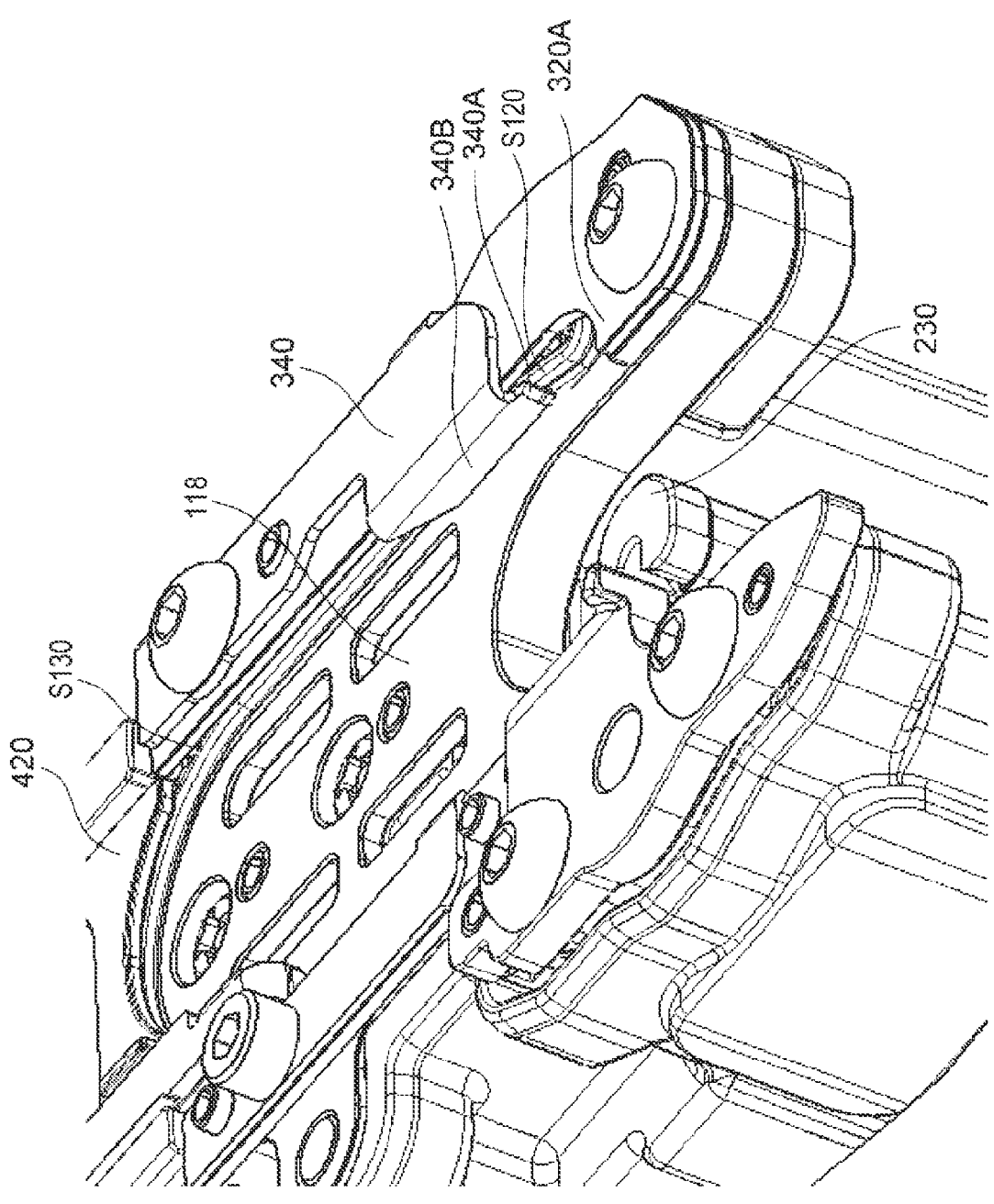
FIG. 39A is an enlarged perspective view illustrating an inner fulcrum member of the binding machine according to the second embodiment.
Figure 39B:
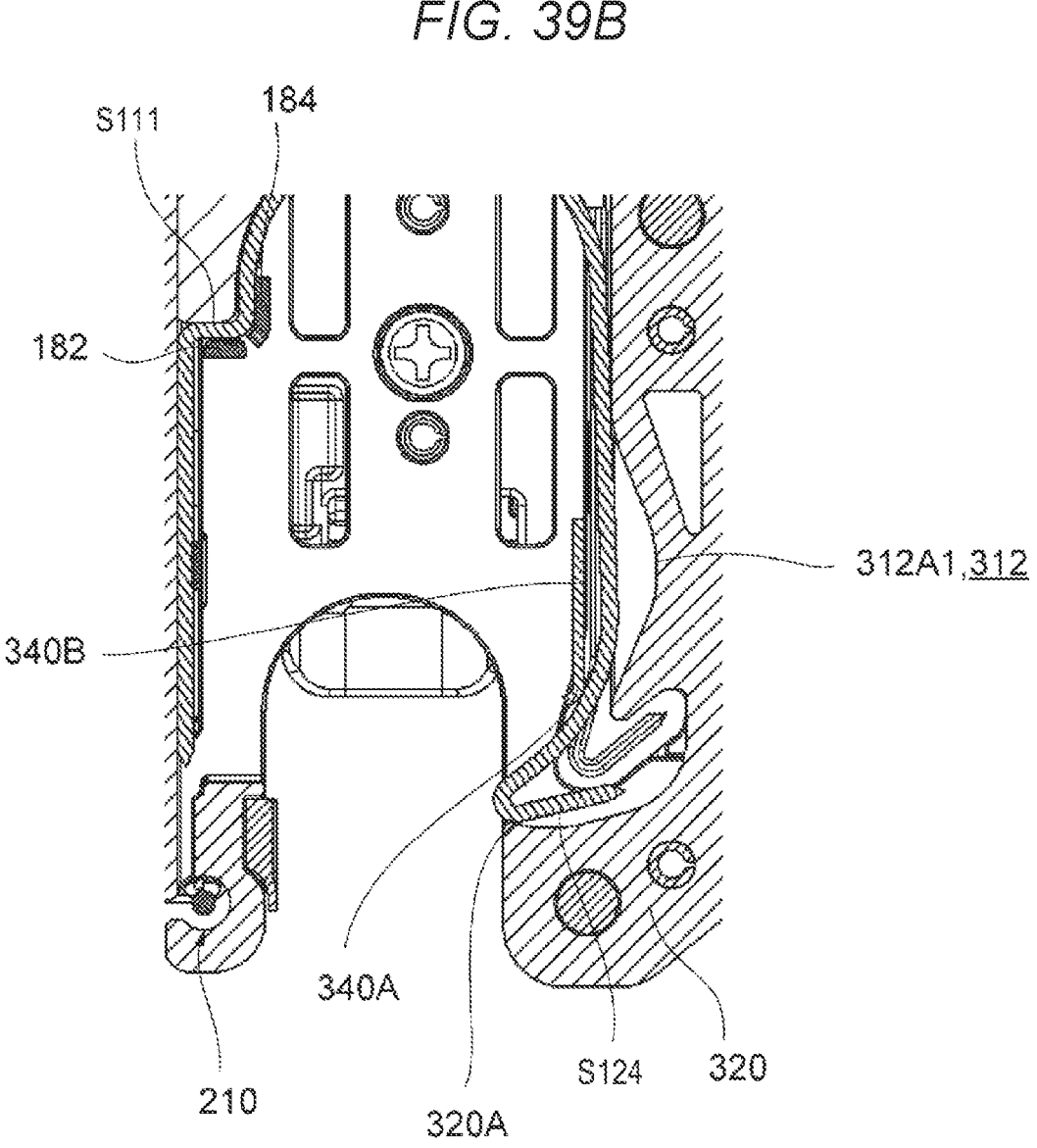
FIG. 39B is a sectional view of a portion including the inner fulcrum member of the binding machine according to the second embodiment in the top view.

The second displacement portion 300 of the binding machine 100 may include an inner fulcrum member 340 for providing a bending fulcrum when the second leg portion S120 is bent in the inward direction of the staple S100. FIG. 39A is a partially enlarged perspective view of the binding machine 100 at a portion including the inner fulcrum member 340, and FIG. 39B is a sectional view in the top view when the second leg portion S120 is bent in the inward direction of the staple S100.

The inner fulcrum member 340 includes a support wall portion 340B that supports an inner side surface of the third portion S123 of the second leg portion S120, and a fulcrum portion 340A that corresponds to an end portion of the support wall portion 340B in the forward direction X1 and provides a bending fulcrum of the third portion S123. As illustrated in FIG. 39B, when the vicinity of a front end of the hook portion S124 comes into contact with the protruded portion 320A, the third portion S123 comes into contact with the fulcrum portion 340A. Therefore, by adjusting a position of the third portion S123 in the front-rear direction, it is possible to adjust a radius of an arc that approximates the bent third portion S123.

The inner fulcrum member 340 may be provided to be movable in the front-rear direction. Further, the binding machine 100 may include a mechanism for moving the inner fulcrum member 340 after the binding. For example, the inner fulcrum member 340 may be configured to include an elastic member such as a plate spring or a compression spring, and the inner fulcrum member 340 may be configured to be interlocked with the driver 420 such that when the driver 420 advances and the binding operation ends, the end portion of the inner fulcrum member 340 in the forward direction X1 moves in the upward direction Z1 with an end portion thereof in the rearward direction X2 as a fulcrum, and when the driver 420 retracts, the end portion in the forward direction X1 returns to a position in the initial state.

[Pushing Member]

Figure 40:
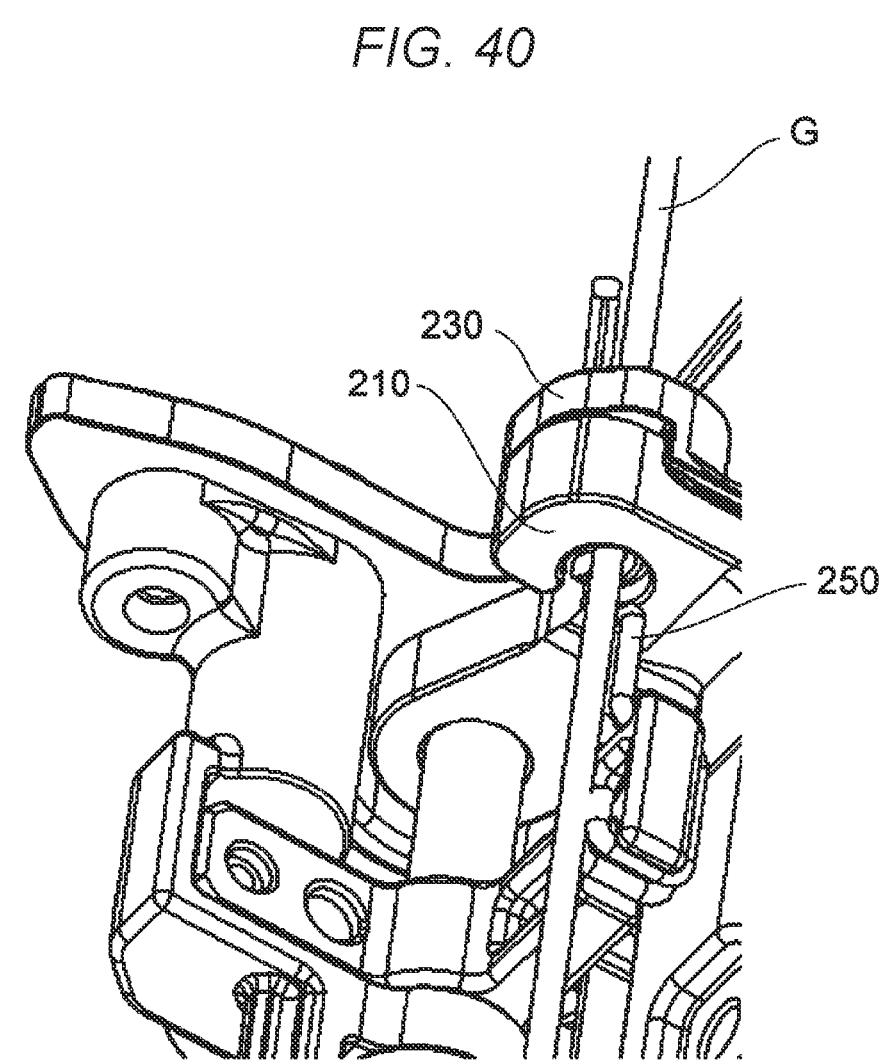
FIG. 40 is an enlarged perspective view illustrating a pushing member of the binding machine according to the second embodiment.

The first displacement portion 200 of the binding machine 100 may include the pushing member 250 that assists the discharge of the tip end portion (Hereinafter, may be referred to as a "spiral portion") of the first leg portion S110 that is engaged in a spiral shape to surround the outer periphery of the first object G. FIG. 40 is a partially enlarged perspective view of the binding machine 100 at a portion including the pushing member 250.

As illustrated in FIG. 40, by being inserted into the hole 210 penetrating through the guide holding mechanism 230 in the up-down direction from the downward direction Z2, the pushing member 250 pushes up a second portion S112 of the first leg portion S110 engaged with the first object G in a spiral shape from the downward direction Z2 and assists the discharge.

The pushing member 250 is configured to be vertically movable at a position that is in the rearward direction X2 or the rightward direction Y1 (the inward direction) with respect to the first object G, and that overlaps with the hole 210 in the top view; for example. It is preferable to form an arc or an inclined surface on an upper end portion of the pushing member 250 so as not to damage the first object G and the spiral portion.

In order to configure the pushing member 250 to be vertically movable, for example, it is preferable to connect the pushing member 250 to the up-down movement part 192 or the lid 170. According to such a configuration, it is possible to push up the spiral portion from the downward direction Z2 and discharge the spiral portion when the lid 170 moves in the upward direction Z1 and the lid 170 is opened.

As described above, according to the present invention, it is possible to provide a binding machine and a binding method that enable binding which is less likely to be released.

Further, various modifications can be made without departing from the gist of the present invention. For example, it is possible to add a part of constituent elements of an embodiment to another embodiment within the scope of the ordinary creativity of a person skilled in the art. In addition, it is possible to replace a part of constituent elements of an embodiment with corresponding constituent elements of another configuration.

For example, the first displacement portion may engage the first leg portion S110 with the first object G by curving the first leg portion S110 in the first rotation direction R1.

Further, the first displacement portion may engage the first leg portion S110 with the first object G by bending the first leg portion S110. For example, the first leg portion S110 may be engaged with the first object G by bending the first leg portion S110 and sandwiching the first object G by using the first leg portion S110.

Further, the second leg portion S120 of the staple may be configured to linearly extend. In this case, when a wall surface through which the tip end portion of the second leg portion S120 passes while being in contact therewith is mounted on the binding machine when the second leg portion is displaced in the first rotation direction, a configuration corresponding to the hook portion S124 may be provided by bending the second leg portion S120 in the first rotation direction and bending the tip end portion thereof in the opposite second rotation direction.

Similarly, the constituent elements disclosed in the present application can be reasonably combined by the exhibition of the ordinary creativity of a person skilled in the art.

The invention according to the present application can be implemented as a binding machine or a binding method described as the following notes in addition to the second embodiment described above.

That is, the present application further discloses binding machines described below:

Note 6

A binding machine for binding a first object and a second object by using a staple that includes a first leg portion, a second leg portion, and a main body portion connecting the first leg portion and the second leg portion, and that has an opening formed between the first leg portion and the second leg portion, the binding machine includes:

a movement portion including a driver configured to move in a forward direction so as to move the staple in the forward direction:

a first displacement portion configured to move the staple in the forward direction by the driver so as to displace the first leg portion to be engageable with the first object: and a second displacement portion configured to move the staple in the forward direction by the driver so as to displace the second leg portion to surround the second object by using the first leg portion, the second leg portion, and the main body portion, and to be engageable with the first object.

Note 6A

The binding machine described in the present application and to which the present configuration is applicable includes the binding machine according to Note 1, in the binding machine according to Note 1, the first displacement portion includes a first insertion portion into which the first object and the first leg portion are to be inserted, and the first insertion portion includes an inner wall configured to engage the tip end portion of the inserted first leg portion with the inserted first object by curving the tip end portion of the inserted first leg portion in an arc shape.

Note 6A1

The binding machine described in the present application and to which the present configuration is applicable includes the binding machine according to Note 6A, the binding machine according to Note 6A includes:

a lid for guiding the staple in a downward direction, and the lid includes a guiding protrusion that is configured to guide the tip end portion of the first leg portion inserted into the first insertion portion in the downward direction.

Note 6A2

The binding machine described in the present application and to which the present configuration is applicable includes the binding machine according to Note 6A1, in the binding machine according to Note 6A1, the inner wall includes a cylindrical surface, and
the lid includes a lower surface that is perpendicular to a
central axis of the cylindrical surface and faces the first
insertion portion.

(Note 6B

The binding machine described in the present application
and to which the present configuration is applicable includes
the binding machine according to Note 6 or 6A1, in the
binding machine according to Note 6 or 6A1,
the main body portion of the staple includes a curved
portion, and the first leg portion includes a first portion
bent and extending in an outward direction and a
second portion bent from the first portion and extending
in an opening direction of the staple, and
the driver includes a curved portion configured to be in
contact with the main body portion and a shoulder
portion configured to be in contact with the first por-
tion.

(Note 6C

The binding machine described in the present application
and to which the present configuration is applicable includes
the binding machine according to any one of Notes 6 to 6B,
in the binding machine according to any one of Notes 6 to
6B,
the second displacement portion includes a first guiding
wall formed on an outer side of the second leg portion
to face an inward direction of the staple such that the
second leg portion of the staple moving in the forward
direction is brought into contact with the first guiding
wall and is curved by moving the staple in the forward
direction by the driver, and a second guiding wall
provided in the forward direction with respect to the
first guiding wall and formed to face a rearward direc-
tion.

Note 6C1

The binding machine described in the present application
and to which the present configuration is applicable includes
the binding machine according to Note 6C, in the binding
machine according to Note 6C,
the first guiding wall includes a recessed portion recessed
in the outward direction.

Note 6C2

The binding machine described in the present application
and to which the present configuration is applicable includes
the binding machine according to Note 6C or 6C1, in the
binding machine according to Note 6C or 6C1,
the second guiding wall includes a protruded portion
protruding in the rearward direction.

Note 7

A binding machine for binding a first object and a second
object by using a staple that includes a first leg portion, a
second leg portion, and a main body portion connecting the
first leg portion and the second leg portion, and that has an
opening formed between the first leg portion and the second
leg portion, the binding machine includes:
a first displacement portion including a movement portion
configured to move in a forward direction and a wall surface provided in the forward direction with respect
to the first leg portion, and configured to engage the
first leg portion with the first object by coming into
contact with the first leg portion of the staple moving in
the forward direction by the movement portion and
displacing the first leg portion: and
a second displacement portion configured to displace the
second leg portion so as to surround the second object
by using the first leg portion, the second leg portion,
and the main body portion, and to be engageable with
the first object by including a second guiding wall that
includes a wall surface provided in the forward direc-
tion with respect to the second leg portion and facing
the rearward direction, and that is configured to bring
the wall surface into contact with the second leg portion
of the staple moving in the forward direction by the
movement portion, and a first guiding wall that
includes a recessed surface provided on an outer side of
the second leg portion and recessed in an outward
direction to face the inward direction of the staple, and
that is configured to bend the second leg portion in
contact with the wall surface of the second guiding
wall.

Note 7A

The binding machine described in the present application
and to which the present configuration is applicable includes
the binding machine according to Note 2A, in the binding
machine according to Note 2A,
the second displacement portion is configured to pass the
tip end portion of the second leg portion through a gap
between the first object and the second object in a top
view:
The present application is based on Japanese Patent
Application No. 2021-117383 filed on Jul. 15, 2021 and
Japanese Patent Application No. 2021-117401 filed on Jul.
15, 2021, and contents thereof are incorporated herein by
reference.

REFERENCE SIGNS LIST 10 binding machine
12 grip
14 magazine
16 pusher
18 separation block
20 first displacement portion
22 first arm
22AX rotation shaft of first arm
22C protruded portion
24 contact member (claw member)
24A recessed portion
24B contact surface
24C corner portion
30 second displacement portion
32 second arm
32AX rotation shaft of second arm
32B rear end portion
32B1 first rear end surface
32B2 second rear end surface
32C tip end portion
32C1 main body portion
32C2 protrusion
42 driver
42S front end surface
42B protruding end portion 42C protruded portion for driver
42G1 first groove
42G2 second groove
42G3 third groove
44 slider
44A1 first front end portion
44A11 first protruded portion
44A12 second protruded portion
44A13 protruding end portion
44A2 second front end portion
44A21 first surface
44A22 second surface
44A23 third surface
44B fixing portion
46 base
46A1 first protrusion
46A2 second protrusion
46A3 third protrusion
48 switching block
48C1 first claw portion
48C2 second claw portion
48C3 third claw portion
50 ball screw
50AX central axis
52 nut part
52A holding portion
54 motor
62 first outer wall portion
62A first region
62B second region
64 first inner wall portion
66 second inner wall portion
68 tip end supporting portion
68A support wall portion
S staple
S1 first leg portion
S1A tip end portion
S1B first portion
α1 bending angle
DS1 first distance
S2 second leg portion
S2A tip end portion
DS2 second distance
S3 main body portion
G first object
P second object
PL plane
X1 forward direction
X2 rearward direction
Y1 rightward direction
Y2 leftward direction
Z1 upward direction
Z2 downward direction
D1 opening direction
R1 first rotation direction
R2 second rotation direction
100 binding machine
112 grip
114 magazine
116 pusher
118 separation block
150 ball screw
152 nut part
154 motor
170 lid
174 front-rear movement part
176 pin 178 link
186 first shaft portion
188 second shaft portion
192 up-down movement part
194 disc spring
200 first displacement portion
210 hole
230 guide holding mechanism
250 pushing member
300 second displacement portion
312 first guiding wall
320 second guiding wall
420 driver
S100 staple
S110 first leg portion
S120 second leg portion
S130 main body portion

The invention claimed is:

1. A binding machine for binding a first object and a second object by using a staple that includes a first leg portion, a second leg portion, and a main body portion connecting the first leg portion and the second leg portion, and that has an opening formed between the first leg portion and the second leg portion, comprising:

a first displacement portion configured to displace the first leg portion so as to be engageable with the first object; and a second displacement portion configured to displace the second leg portion so as to surround the second object by using the first leg portion, the second leg portion, and the main body portion, and to be engageable with the first object, wherein the first displacement portion includes a first insertion portion into which the first object and the first leg portion are to be inserted, and the first insertion portion includes an inner wall surface configured to come into contact with a tip end portion of the first leg portion, and is configured to guide the tip end portion of the inserted first leg portion along the inner wall surface while curving in an arc shape so that the tip end portion surrounds an outer periphery of the first object in a spiral shape to be engaged, wherein, in a top view, the second displacement portion is configured to displace the second leg portion to a position where the second leg portion intersects the first leg portion.

2. The binding machine according to claim 1, further comprising:

a second insertion portion into which the second object is to be inserted, wherein the second displacement portion is configured to displace the second leg portion so as to surround the second object inserted into the second insertion portion.

3. The binding machine according to claim 1, further comprising:

a movement portion configured to move the staple in an opening direction of the staple, wherein the second displacement portion is configured to displace the second leg portion in an inward direction of the staple as the movement portion moves in the opening direction.

4. The binding machine according to claim 3, wherein the second displacement portion is configured to bend the second leg portion in the inward direction of the staple as the movement portion moves in the opening direction.

5. The binding machine according to claim 3, wherein the second displacement portion includes an arm provided outside the second leg portion and configured to bend the second leg portion by being in contact with the movement portion moving in the opening direction.

6. The binding machine according to claim 5, wherein the arm is configured to be pushed by a front end portion of the movement portion moving in the forward direction, so as to rotate in a first rotation direction, and the arm has a rotation shaft inclined such that a front end of the arm moves in an upward direction as the arm rotates in the first rotation direction.

7. The binding machine according to claim 6, wherein the arm includes a rear end portion extending in a rearward direction with respect to the rotation shaft of the arm in a state before rotation, and the rear end portion of the arm includes:

a first rear end surface configured to be in contact with a first surface of the front end portion of the movement portion moving in the forward direction, and a second rear end surface configured to be in contact with a second surface of the front end portion of the movement portion further moving in the forward direction, and formed in the forward direction with respect to the first surface.

8. The binding machine according to claim 7, further comprising:

a wall portion provided inside the second leg portion of the staple and through which a tip end portion of the second leg portion passes while being in contact therewith, the tip end portion of the second leg portion being displaced in the inward direction of the staple due to the rotation of the arm.

9. The binding machine according to claim 3, wherein the second displacement portion is configured to curve the second leg portion in the inward direction of the staple as the movement portion moves in the opening direction.

10. The binding machine according to claim 3, wherein the second displacement portion includes a guiding wall provided outside the second leg portion and configured to curve the second leg portion of the staple by being in contact with the second leg portion, the staple moving in the opening direction by the movement portion.

11. The binding machine according to claim 10, wherein the guiding wall includes a recessed portion recessed in an outward direction of the staple.

12. The binding machine according to claim 10, further comprising:

a second guiding wall provided in a forward direction with respect to the guiding wall and formed to face a rearward direction.

13. The binding machine according to claim 12, wherein the second guiding wall includes a protruded portion protruded in the rearward direction.

\* \* \* \* \*